US007336384B2

(12) United States Patent
Shima et al.

(10) Patent No.: US 7,336,384 B2
(45) Date of Patent: Feb. 26, 2008

(54) PRINTER, PRINT CLIENT, AND PRINT SYSTEM

(75) Inventors: Toshihiro Shima, Nagano-ken (JP); Kazuhito Gassho, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1042 days.

(21) Appl. No.: 10/654,744

(22) Filed: Sep. 3, 2003

(65) Prior Publication Data

US 2004/0125163 A1 Jul. 1, 2004

(30) Foreign Application Priority Data

Sep. 4, 2002 (JP) ............................. 2002-259046

(51) Int. Cl.
*G06F 15/00* (2006.01)
*B41J 29/38* (2006.01)

(52) U.S. Cl. ........................................ 358/1.15; 347/16

(58) Field of Classification Search ................. 358/1.1, 358/1.15; 347/16
See application file for complete search history.

(56) References Cited

U.S. PATENT DOCUMENTS

2002/0051178 A1* 5/2002 Nakayasu et al. ......... 358/1.15
2002/0054330 A1* 5/2002 Jinbo et al. ................ 358/1.15
2003/0035122 A1* 2/2003 Amarger et al. ............. 358/1.1

* cited by examiner

*Primary Examiner*—Alexander Eisen
*Assistant Examiner*—Iriana Cruz
(74) *Attorney, Agent, or Firm*—Martine Penilla & Gencarella, LLP

(57) ABSTRACT

A printer acquires a relative distance between the printer and another printer and holds the relative distance in an alternative printer list table. When selecting a printer to which a request for alternative printing is made, the printer searches relative distances in the alternative printer list table and selects a printer with the shortest relative distance as an alternative printer. Consequently, the printer to which the request for alternative printing is made or the like can be efficiently selected.

57 Claims, 39 Drawing Sheets

TB20: PUBLIC KEY TABLE

D20 D21

| PRINTER | PUBLIC KEY |
|---|---|
| aaa.bbb.ccc.100 | PKEY0 |
| aaa.bbb.ccc.101 | PKEY1 |
| aaa.bbb.ccc.102 | PKEY2 |
| ⋮ | ⋮ |

FIG. 8

TB40: ALTERNATIVE PRINTER LIST TABLE

| NETWORK ADDRESS (D40) | PRINTER MODEL INFORMATION (D41) | RELATIVE DISTANCE (D42) | PUBLIC KEY (D43) |
|---|---|---|---|
| aaa.bbb.ccc.101 | LP-7700 | $\Delta X1, \Delta Y1, \Delta Z1$ | PKEY1 |
| aaa.bbb.ccc.102 | LP-8900 | $\Delta X2, \Delta Y2, \Delta Z2$ | PKEY2 |
| aaa.bbb.ccc.103 | LP-7700 | $\Delta X3, \Delta Y3, \Delta Z3$ | PKEY3 |

FIG. 11

TB60: ALTERNATIVE PRINTER LIST TABLE

| D40 NETWORK ADDRESS | D41 PRINTER MODEL INFORMATION | D42 RELATIVE DISTANCE |
|---|---|---|
| aaa.bbb.ccc.101 | LP-7700 | $\Delta X1, \Delta Y1, \Delta Z1$ |
| aaa.bbb.ccc.102 | LP-8900 | $\Delta X2, \Delta Y2, \Delta Z2$ |
| aaa.bbb.ccc.103 | LP-7700 | $\Delta X3, \Delta Y3, \Delta Z3$ |

FIG. 18

TB100: PRINTER POSITION INFORMATION TABLE

D110 D111 D112 D113 D114

| PRINTER | PRINTER POSITION INFORMATION | | |
|---|---|---|---|
| | LATITUDE | LONGITUDE | ALTITUDE |
| 192.168.1.10 | X1 | Y1 | Z1 |
| 192.168.1.11 | X2 | Y2 | Z2 |
| ⋮ | ⋮ | ⋮ | ⋮ |

FIG. 27

TB80: ALTERNATIVE PRINTER LIST TABLE

| NETWORK ADDRESS (D40) | PRINTER MODEL INFORMATION (D41) | RELATIVE DISTANCE (D42) | PRINTER POSITION INFORMATION (D44) |
|---|---|---|---|
| aaa.bbb.ccc.101 | LP-7700 | $\Delta X1, \Delta Y1, \Delta Z1$ | X1, Y1, Z1 |
| aaa.bbb.ccc.102 | LP-8900 | $\Delta X2, \Delta Y2, \Delta Z2$ | X2, Y2, Z2 |
| aaa.bbb.ccc.103 | LP-7700 | $\Delta X3, \Delta Y3, \Delta Z3$ | X3,Y3, Z3 |

FIG. 29

TB200: ALTERNATIVE PRINTER LIST TABLE

| NETWORK ADDRESS (D40) | PRINTER MODEL INFORMATION (D41) | RELATIVE DISTANCE (D42) |
|---|---|---|
| aaa.bbb.ccc.101 | LP-7700 | $\Delta X1, \Delta Y1, \Delta Z1$ |
| aaa.bbb.ccc.102 | LP-8900 | $\Delta X2, \Delta Y2, \Delta Z2$ |
| aaa.bbb.ccc.103 | LP-7700 | $\Delta X3, \Delta Y3, \Delta Z3$ |

FIG. 35

PRINTER, PRINT CLIENT, AND PRINT SYSTEM

BACKGROUND OF THE INVENTION

1. Field of the Invention

The present invention relates to a printer, a print client, and a print system, and particularly relates to a printer, a print client, and a print system which enable alternative printing while ensuring security of data transmitted to the printer.

2. Description of the Related Art

These days, a print system in which a printer is shared by means of a network has been increasingly used. Namely, by connecting plural computers as print clients to one network and connecting, for example, one printer to this network, one printer can accept print data from the plural print clients and print the print data.

In such a print system by means of the network, various users can transmit print data from their respective print clients to the printer and perform printing.

However, if the print data transmitted from the print clients is printed by the printer unconditionally, a print operation is executed even by the printer which is not installed in a place where the user intends to perform printing. In particular, in the case of the printer which is moved from one place where the printer has been heretofore used to another place, an IP address or the like which is an address on the network sometimes remains unchanged, and hence the transmitted print data may be printed by the printer moved to another place. The above situation is undesirable for users who want to ensure the security of print data.

Moreover, if the print data transmitted from the print clients is printed by the printer unconditionally, even print data transmitted from the print clients which are not duly authorized to perform printing with the printer is printed by the printer. In this case, print clients capable of perform printing with the printer cannot be restricted, which is undesirable as well. Especially when the possibility of the existence of users who transmit a large amount of print data with dishonest intention is considered, it is necessary to provide some print restriction.

Further, in some cases, a printer which has been used in one department of a company is moved to another department and used there. In such a case, even print clients which have heretofore had the authority of perform printing with this printer are not sometimes wanted to be given the authority to perform printing with this printer after the printer has been moved. In the above situation, a need for technology which prevents print data from the print clients from being printed on the printer side is acknowledged.

Furthermore, in some cases, the printer which has received print data from the print client cannot execute a print operation for some reason. For example,the printer cannot sometimes execute a print operation due to a paper jam, a paper empty error, or the like. In such a case, if the print data is printed by an alternative printer capable of printing the print data as an alternative thereto, user-friendliness is increased.

Hence, the present invention is made in view of the aforementioned problem, and an object of the present invention is to provide a printer, a print client, and a print system which can realize alternative printing while ensuring security of print data.

SUMMARY OF THE INVENTION

In order to accomplish the aforementioned and other objects, according to one aspect of the present invention, a printer, comprises:

a printer position information acquisition which acquires printer position information to specify a place where the printer is installed;

a printer position information transmitter which transmits the printer position information acquired by said printer position information acquisition to another printer and causes said another printer to calculate a relative distance between the printer and said another printer;

a relative distance receiver which receives the relative distance from said another printer; and a relative distance storage which stores the relative distance received by said relative distance receiver.

According to another aspect of the present invention, a printer, comprises:

a printer position information acquisition which acquires printer position information to specify a place where the printer is installed;

a printer position information receiver which receives printer position information on another printer from said another printer;

a relative distance calculator which calculates a relative distance between the printer and said another printer based on the printer position information acquired by the printer position information acquisition and the printer position information received by the printer position information receiver; and a relative distance storage which stores the relative distance calculated by said relative distance calculator.

According to another aspect of the present invention, a method of controlling a printer, comprises the steps of:

acquiring printer position information to specify a place where the printer is installed;

transmitting the printer position information to another printer and causing said another printer to calculate a relative distance between the printer and said another printer;

receiving the relative distance from said another printer; and storing the relative distance received in a relative distance storage.

According to another aspect of the present invention, a method of controlling a printer, comprises the steps of:

acquiring first printer position information which is printer position information to specify a place where the printer is installed;

receiving second printer position information which is printer position information on another printer from said another printer;

calculating a relative distance between the printer and said another printer based on the first printer position information and the second printer position information; and storing the calculated relative distance in the relative distance storage.

According to another aspect of the present invention, a print client, comprises:

a print transmitting data generator which generates print transmitting data based on print data;

a first transmitter which transmits the print transmitting data to a printer;

an alternative print notice receiver which receives an alternative print notice from the printer when the printer is not in a state capable of executing a print operation, the alternative print notice containing at least an alternative printer list in which alternative printer candidates are listed, and the alternative printer list containing at least relative distances between the printer and the alternative printer candidates;

an alternative printer selector which selects an alternative printer at least based on the alternative printer list; and a second transmitter which transmits the print transmitting data to the selected alternative printer.

According to another aspect of the present invention, a method of controlling a print client, comprises the steps of:

generating print transmitting data based on print data;

transmitting the print transmitting data to a printer;

receiving an alternative print notice from the printer when the printer is not in a state capable of executing a print operation, the alternative print notice containing at least an alternative printer list in which alternative printer candidates are listed, and the alternative printer list containing at least relative distances between the printer and the alternative printer candidates;

selecting an alternative printer at least based on the alternative printer list; and transmitting the print transmitting data to the selected alternative printer.

According to another aspect of the present invention, a print system, comprises:

a first printer position information acquisition which acquires first printer position information to specify a place where a first printer is installed;

a second printer position information acquisition which acquires second printer position information to specify a place where a second printer is installed;

a relative distance calculator which calculates a relative distance between the first printer and the second printer based on the first printer position information and the second printer position information; and a relative distance storage which stores the calculated relative distance in the first printer.

According to another aspect of the present invention, a method of controlling a print system, comprises the steps of:

acquiring first printer position information to specify a place where a first printer is installed;

acquiring second printer position information to specify a place where a second printer is installed;

calculating a relative distance between the first printer and the second printer based on the first printer position information and the second printer position information; and storing the calculated relative distance in a relative distance storage of the first printer.

BRIEF DESCRIPTION OF THE DRAWINGS

FIG. 8 is a diagram showing an example of the structure of a public key table included in the print client according to the first embodiment of the present invention;

FIG. 11 is a diagram showing an example of the structure of an alternative printer list table held by the printer according to the first embodiment of the present invention;

FIG. 18 is a diagram showing an example of the structure of an alternative printer list table held by a printer according to the second embodiment of the present invention;

FIG. 27 is a diagram showing an example of the structure of a printer position information table included in the print client according to the third embodiment of the present invention;

FIG. 29 is a diagram showing an example of the structure of an alternative printer list table held by the printer according to the third embodiment of the present invention;

FIG. 35 is a diagram showing an example of the structure of an alternative printer list table held by a printer according to the fourth embodiment of the present invention;

DETAILED DESCRIPTION OF THE EMBODIMENTS

First Embodiment

In a print system according to the first embodiment of the present invention, when decrypting received print transmitting data, a printer generates plural passphrases containing not only printer position information indicating a position where the printer is installed but also position information around the printer position information, and executes a print operation only when print transmitting data D10 can be decrypted with any of private keys generated using the passpharses. However, when the printer cannot execute the print operation, for example, due to a paper jam, this printer selects an alternative printer which prints the received print data as an alternative thereto based on a relative distance from this printer and makes a request for alternative printing to the alternative printer. Further details will be given below.

Figure 1:
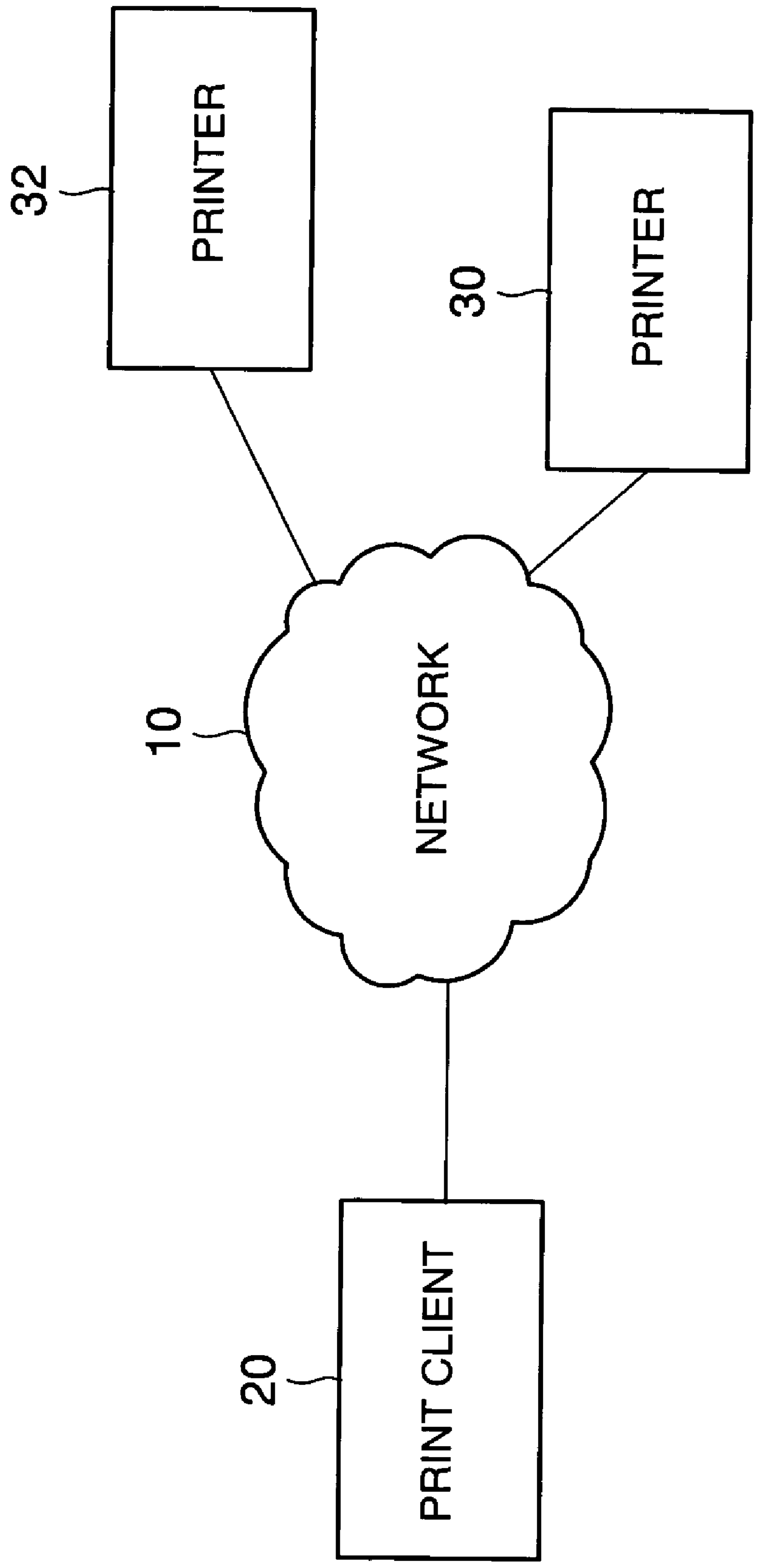
FIG. 1 is a diagram showing an example of the configuration of a print system according to a first embodiment of the present invention.

First, the configuration of the print system according to this embodiment will be explained based on FIG. 1. FIG. 1 is a block diagram showing the hardware configuration of the print system according to this embodiment.

As shown in FIG. 1, the print system according to this embodiment includes a print client 20 connected to a network 10 and printers 30 and 32 also connected to the network 10. In this embodiment, the network 10 is constituted by the Internet using TCP/IP (transmission control protocol/internet protocol). However, the form of the network 10 is not limited to the Internet, and, for example, it may be constituted by a LAN such as Ethernet or by mixing the Internet and the LAN.

The print client 20 is composed of any of various kinds of computers, for example, called a host computer and a personal computer. In this embodiment, in particular, the print client 20 generates print transmitting data by encrypting print data and transmits this print transmitting data to the printer 30 and/or the printer 32 via the network 10. The number of print clients connected to the network 10 is optional, and it may be one or more than one. Moreover, the print client 20 is not limited to a computer, and, for example, it may be a digital camera with a necessity to print a taken image, a content server in which print image data is stored as contents, or the like.

Further, in this embodiment, the printers 30 and 32 are so-called network printers. In this embodiment, particularly when receiving print transmitting data from the print client 20, the printers 30 and 32 each execute a print operation based on print data acquired by decryption only when the print transmitting data can be decrypted. Furthermore, in this embodiment, when the printers 30 and 32 cannot execute the print operation due to a paper jam or the like, the printer 30 and 32 each select an alternative printer which prints decrypted print data as an alternative thereto. When the selected alternative printer is located within a predetermined range, the printer transfers the received print transmitting data as it is to the alternative printer via the network 10. On the other hand, when the selected alternative printer is not located within the predetermined range, the printer generates print transmitting data by encrypting the print data again with a public key of the alternative printer and transmits the generated print transmitting data to the alternative printer via the network 10. The alternative printer which has received the print transmitting data decrypts the print transmitting data, and when the print transmitting data can be decrypted, the alternative printer executes a print operation.

In this embodiment, the printers 30 and 32 are directly connected to the network 10, and each of the printers 30 and 32 has its own peculiar network address. Accordingly, the print client 20 can transmit print transmitting data to the printer 30 or the printer 32 by designating its network address.

Incidentally, the printers 30 and 32 are directly connected to the network 10 in FIG. 1, but the printers 30 and 32 may be connected thereto via a printer server. Moreover, the number of printers connected to the network 10 is optional, and it may be one or more than one.

Figure 2:
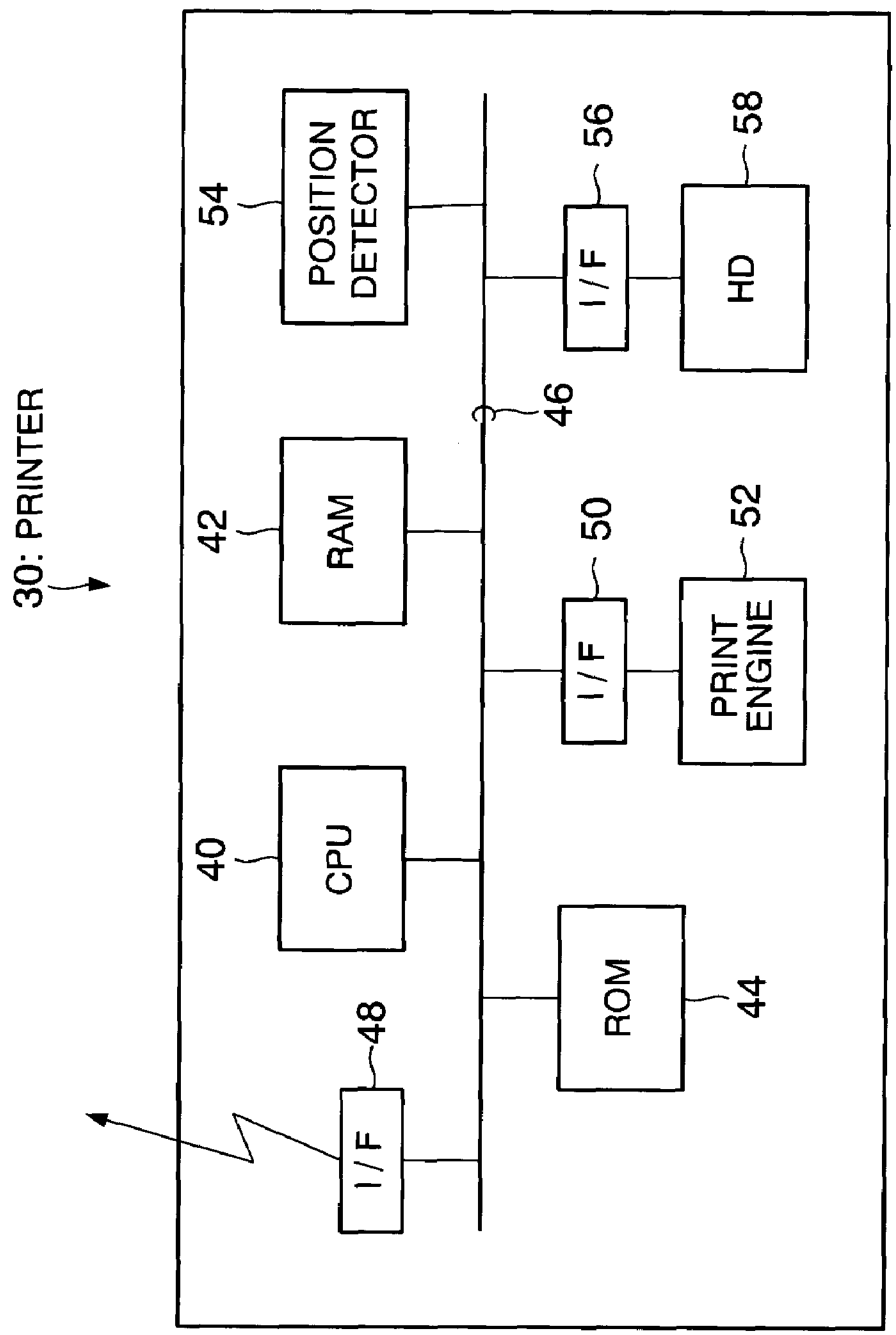
FIG. 2 is a diagram showing an example of the hardware configuration of a printer according to the first embodiment of the present invention.

FIG. 2 is a block diagram explaining the internal configuration of the printer 30. It should be mentioned that the internal configuration of the printer 32 is the same as that of the printer 30. Namely, the printer 30 and the printer 32 are the same printer model.

As shown in FIG. 2, the printer 30 includes a CPU (Central Processing Unit) 40, a RAM (Random Access Memory) 42, and a ROM (Read Only Memory) 44, and they are connected to each other via an internal bus 46. A communication interface 48 is connected to the internal bus 46, and the printer 30 is connected to the aforementioned network 10 via the communication interface 48. In addition, an interface 50 is connected to the internal bus 46, and a print engine 52 is connected to the interface 50.

Moreover, a position detector 54 is connected to the internal bus 46. This position detector 54 has a function of specifying a position where the printer 30 is installed. In this embodiment, the position detector 54 is constituted, for example, by a GPS (global positioning system), and the latitude, longitude, and altitude of the position where the printer 30 is installed can be specified. It is said that the accuracy of the GPS at the present time is approximately ±10 m in the latitude, the longitude, and the altitude (the X-axis, the Y-axis, and the Z-axis), respectively.

However, the constitution of the position detector 54 is not limited to the constitution using the GPS, and, for example, when the printer 30 is connected to the network 10 by a wireless LAN, the position of the printer 30 may be specified based on a wireless base station which accommodates the printer 30. Alternatively, the position of the printer 30 may be specified by using mobile communication technology including the PHS (Personal Handyphone System).

Furthermore, an interface 56 is connected to the internal bus 46 in the printer 30 according to this embodiment, and a hard disk 58 as a rewritable nonvolatile semiconductor memory device is connected thereto via the interface 56. In this embodiment, this hard disk 58 can be replaced, for example, with an EEPROM (Electrically Erasable Programmable ROM) which is a rewritable nonvolatile semiconductor memory device.

Figure 3:
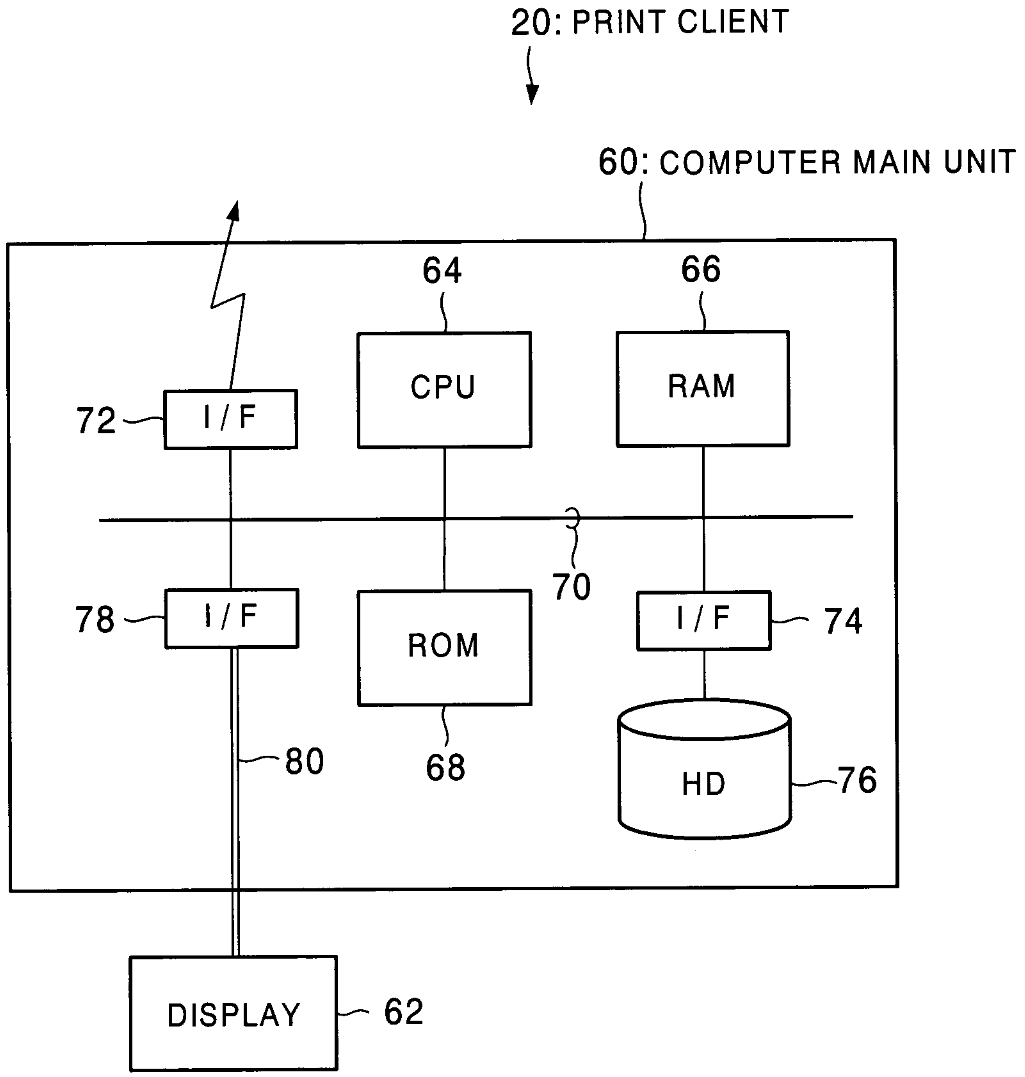
FIG. 3 is diagram showing an example of the configuration of a print client according to the first embodiment of the present invention.

FIG. 3 is a block diagram explaining the internal configuration of the print client 20. As shown in FIG. 3, the print client 20 according to this embodiment includes a computer main unit 60 and a display 62.

The computer main unit 60 includes a CPU 64, a RAM 66, and a ROM 68, and they are connected to each other via an internal bus 70. A communication interface 72 is connected to the internal bus 70, and the print client 20 is connected to the aforementioned network 10 via the communication interface 72.

In addition, an interface 74 is connected to the internal bus 70, and a hard disk 76 which is a large capacity storage is connected to the interface 74. Moreover, an interface 78 is connected to the internal bus 70, and the aforementioned display 62 is connected via a cable 80 which extends from the interface 78.

Figure 4:
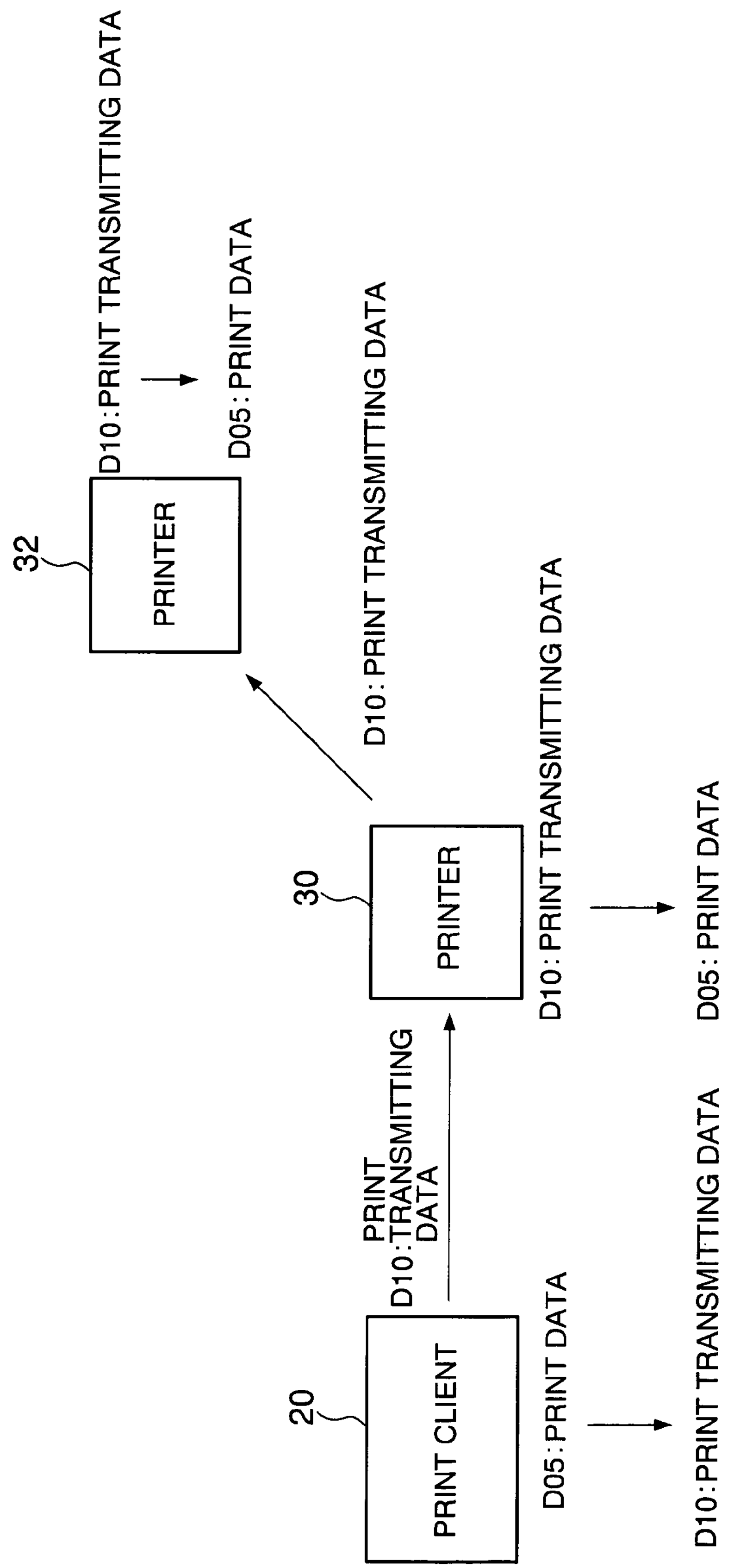
FIG. 4 is a diagram explaining the flow of print data and print transmitting data when alternative printing is performed in the first embodiment of the present invention (when a relative distance between a printer which makes a request for alternative printing and a printer to which the request for alternative printing is made is within a predetermined range)
Figure 5:
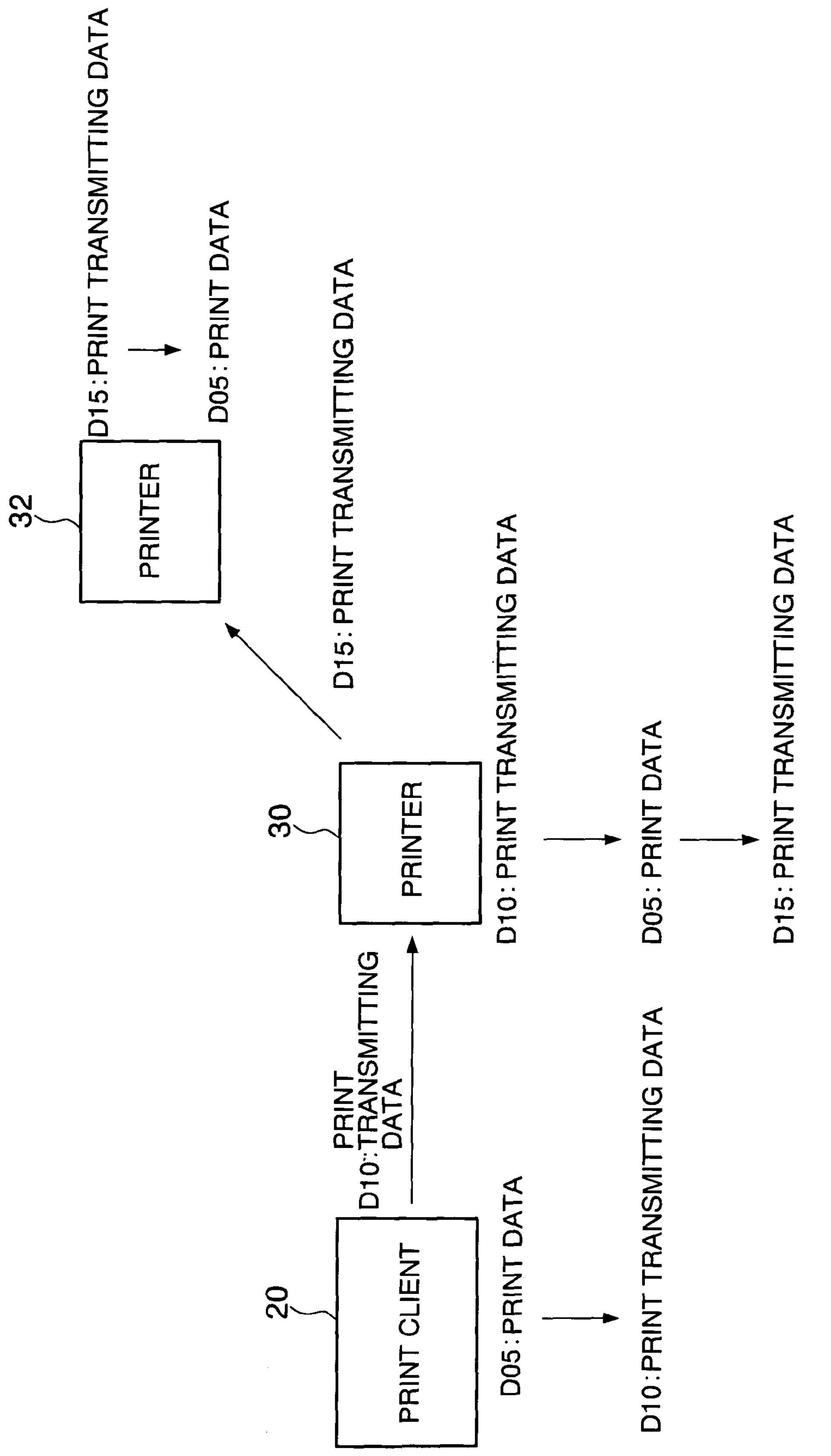
FIG. 5 is a diagram explaining the flow of the print data and the print transmitting data when the alternative printing is performed in the first embodiment of the present invention (when the relative distance between the printer which makes the request for alternative printing and the printer to which the request for alternative printing is made is not within the predetermined range)

Next, a brief explanation of a process, for example, when the print client 20 makes a print request to the printer 30 in the print system according to this embodiment will be given with reference to FIG. 4 and FIG. 5. FIG. 4 is a block diagram explaining the contents of a process when the printer 32 is located within a predetermined range from the printer 30 in a case where the printer 30 which has received print transmitting data makes a request for alternative printing to the printer 32. FIG. 5 is a block diagram explaining the contents of a process when the printer 32 is not located within the predetermined range from the printer 30 in the same case.

First, the print client 20 previously acquires, for example, a public key PKEY0 of the printer 30 from the printer 30. In this embodiment, the public key PKEY0 is acquired via the network 10. Namely, the printer 30 confirms whether the print client which requests the public key PKEY0 has rightful authority, and only when the print client has rightful authority, the printer 30 notifies the print client of the public key PKEY0. However, the printer 30 need not necessarily notify the print client 20 of the public key PKEY0 of the printer 30 via the network 10. For example, if a user of the print client 20 has rightful authority, he or she can go to the installation location of the printer 30 and operate the printer 30, whereby it is also possible that the user operates a control panel of the printer 30 and acquires the public key PKEY0 of the printer 30. In this case, the user is required to record the public key PKEY0 of the printer 30 on a record medium such as a flexible disk and causes the print client 20 to read this public key PKEY0.

Figure 6:
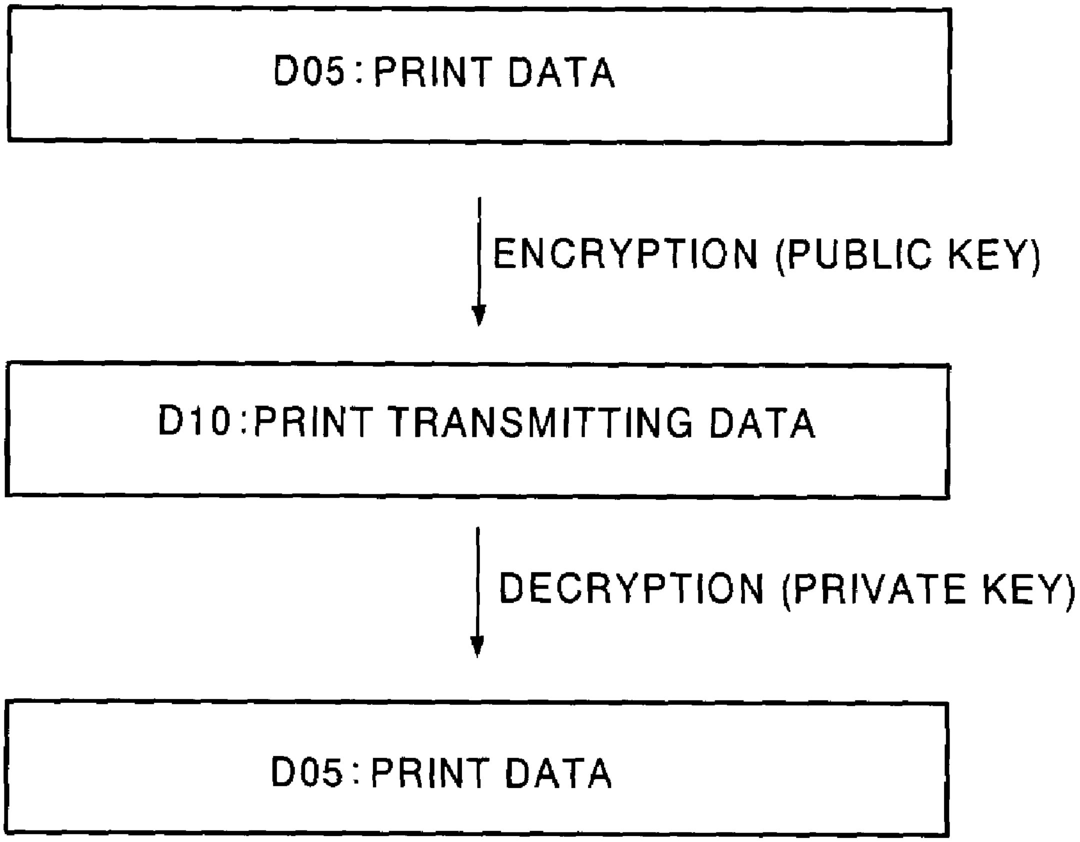
FIG. 6 is a diagram explaining the relation between the print data and the print transmitting data in the first embodiment of the present invention.

Then, the user of the print client 20 generates data to be printed and designates the printer 30 for the print client 20 to execute a print operation. FIG. 6 is a diagram explaining the flow of encryption and decryption of print data D05.

As shown in FIG. 6, the print client 20 encrypts the print data D05 with the acquired public key PKEY0 to generate print transmitting data D10. Here, the print data D05 means original print data needed for a print operation executed by driving the print engine 52 in the printer 30. Incidentally, the print transmitting data D10 may contain data other than the print data D05 shown in FIG. 6.

As shown in FIG. 4 and FIG. 5, the print client 20 then transmits the generated print transmitting data D10 to the printer 30 via the network 10. The printer 30 which has received the print transmitting data D10 temporarily stores the received print transmitting data D10 in the RAM 42 as shown in FIG. 2. The printer 30 then tries to acquire the print data D05 contained in the print transmitting data D10 by decrypting the encrypted print transmitting data D10 with plural predetermined private keys (See FIG. 6). When the print transmitting data D10 can be decrypted with any of the private keys, the print data D05 contained in the print transmitting data D10 is transmitted to the print engine 52 and printed. When the print transmitting data cannot be decrypted with any of the private keys, the print operation is not executed.

Incidentally, in this embodiment, the public key and the private key are generated depending on printer position information indicating positions where the printers 30 and 32 are installed, but its details will be described later. Although the details of an algorithm for decryption will be described later, in this embodiment, the algorithm in which decryption can be performed properly even if the printer position information changes a little in the printers 30 and 32 is used.

It is assumed here that the printer 30 cannot execute the print operation for some reason. Then, the printer 30 searches an alternative printer list table and selects a printer which prints the print data D05 as an alternative thereto. In this case, a printer at the shortest relative distance from the printer 30 is selected as the alternative printer. It is assumed here that the printer 32 is selected as the alternative printer.

Subsequently, the printer 30 judges whether a distance between the printer 30 and the alternative printer 32 is within a predetermined range. When the distance between the printer 30 and the alternative printer 32 is within the predetermined range, as shown in FIG. 4, in this embodiment, it is expected that even if the received print transmitting data D10 is transferred as it is, the print transmitting data D10 will be decrypted by the alternative printer 32, and hence, the print transmitting data D10 is transferred as it is to the alternative printer 32. The alternative printer 32 tries to decrypt the received print transmitting data D10 with plural predetermined private keys. When the print transmitting data D10 can be decrypted with any of the private keys, a print operation is executed, and when the print transmitting data D10 cannot be decrypted with any of the private keys, the print operation is not executed.

On the other hand, when the distance between the printer 30 and the alternative printer 32 is not within the predetermined range, as shown in FIG. 5, it is thought that if the received print transmitting data D10 is transferred as it is, the print transmitting data D10 is not decrypted by the alternative printer 32. Therefore, the printer 30 encrypts the print data D05 with a public key PKEY1 of the alternative printer 32 to generate print transmitting data D15. Then, the printer 30 transmits the print transmitting data D15 to the alternative printer 32. The alternative printer 32 which has received the print transmitting data D15 tries to decrypt the print transmitting data D15 with plural predetermined private keys. When the print transmitting data D15 can be decrypted with any of the private keys, a print operation is executed, and when the print transmitting data D15 cannot be decrypted with any of the private keys, the print operation is not executed.

By so doing, if the user acquires the public key PKEY0 only once after the printer 30 is installed, and holds the public key PKEY0 in the print client 20 after trial printing is performed with the public key PKEY0, the public key PKEY0 is not updated after this, whereby the print operation cannot be executed by the printer 30 when the printer 30 is moved afterward as will be described later. Then, it is reported to the user that the print operation cannot be executed, whereby it is found out that the printer 30 is not in a predetermined place, which prevents the printer 30 from executing the print operation.

Next, processes executed by the print client 20 and the printer 30 or 32 will be explained in detail. First, processes in the print client 20 and the printer 30 or 32 when the print client 20 acquires the public key will be explained in detail.

Figure 7:
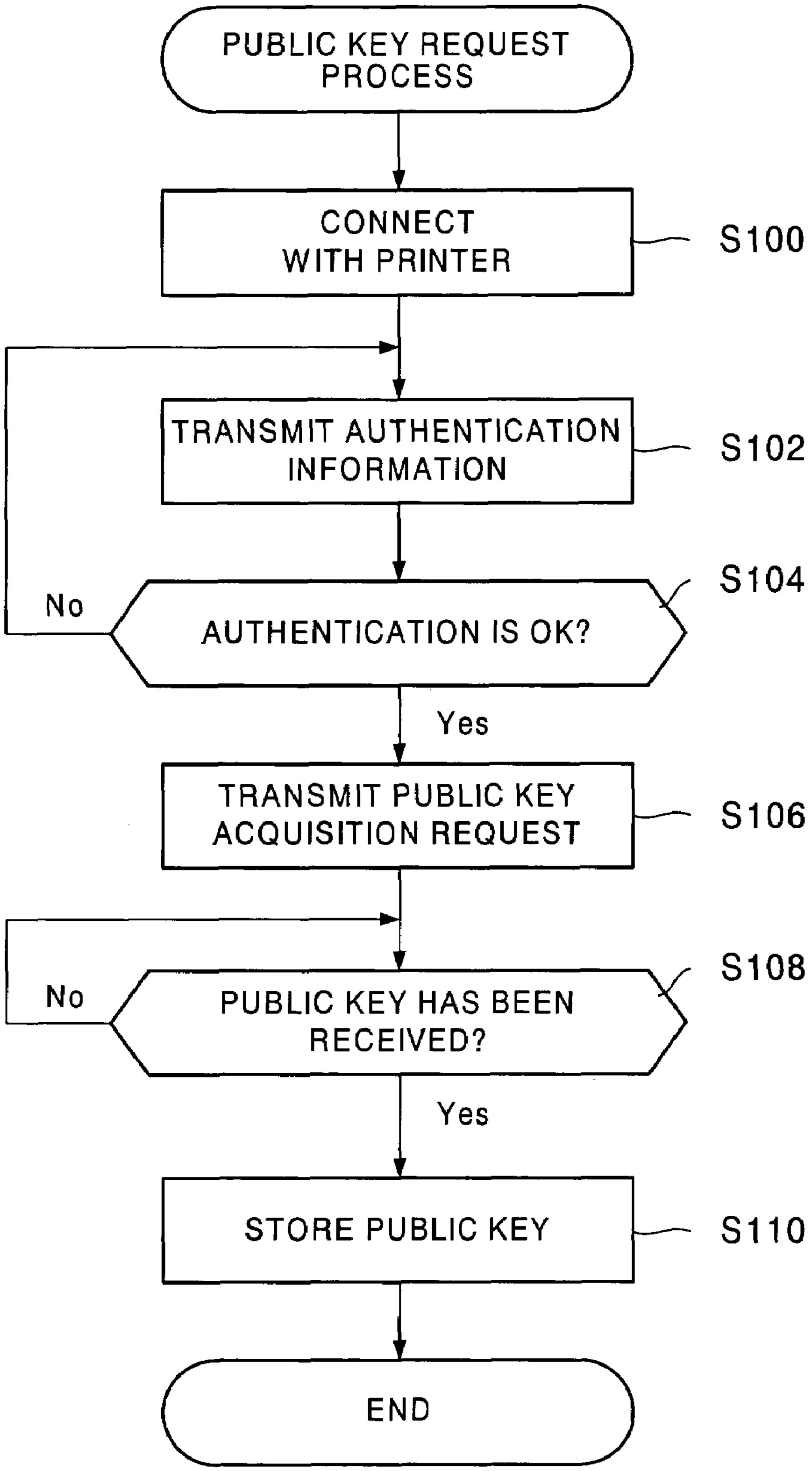
FIG. 7 is a flowchart explaining a public key request process executed by the print client according to the first embodiment of the present invention.

FIG. 7 is a flowchart explaining a public key request process executed by the print client 20. This public key request process is realized by making the CPU 64 read and execute a public key request program stored in the ROM 68 or the hard disk 76 in the print client. Moreover, the public key request process is a process which the user causes the print client 20 to execute as initial setting only once after the printer 30 or 32 is installed. Assuming here a case where the print client 20 makes a request for the public key to the printer 30, the following explanation is given.

As shown in FIG. 7, in the public key request process, the print client 20 first connects with the printer 30 (step S100). In this embodiment, the print client 20 establishes a connection between the print client 20 and the printer 30 by designating the network address of the printer 30.

Thereafter, the print client 20 transmits authentication information to the printer 30 (step S102). In this embodiment, a combination of a client ID to specify the print client and a password is used as the authentication information. Accordingly, the print client 20 transmits the client ID and the password to the printer 30.

Subsequently, the print client 20 receives an authentication result indicating whether authentication is accepted from the printer 30, and judges whether the authentication is accepted by the printer 30 based on the authentication result (step S104). When the authentication is not accepted (step S104: No), the print client 20 repeats the aforementioned process from step S102.

On the other hand, when the authentication is accepted (step S104: Yes), the print client 20 transmits a public key acquisition request to the printer 30 (step S106). Then, the print client 20 judges whether the public key PKEY0 has been received from the printer 30 (step S108). When the public key PKEY0 has not been received from the printer 30 (step S108: No), the print client 20 stands by while repeating step S108.

On the other hand, when the public key PKEY0 has been received from the printer 30 (step S108: Yes), the public key PKEY0 is stored (step S110). In this embodiment, the print client 20 is provided with a public key table TB20 on the hard disk 76, and the acquired public key is stored and held in this public key table TB20.

FIG. 8 is a diagram showing an example of the structure of the public key table TB20. As shown in FIG. 8, the public key table TB20 includes an item D20 which stores information to specify printers and an item D21 which stores acquired public keys corresponding to the printers. As described above, the public key table TB20 can hold public keys concerning plural printers on a printer-by-printer basis in a tabular form. Moreover, by storing the public keys in the public key table TB20 on the hard disk 78 in this manner, even when the print client 20 is powered off and then powered on again, the public key acquired before the power-on can be read from the hard disk 78 and used as it is.

By storing the acquired public key PKEY0 in the public key table TB20, the public key request process shown in FIG. 7 is completed.

Figure 9:
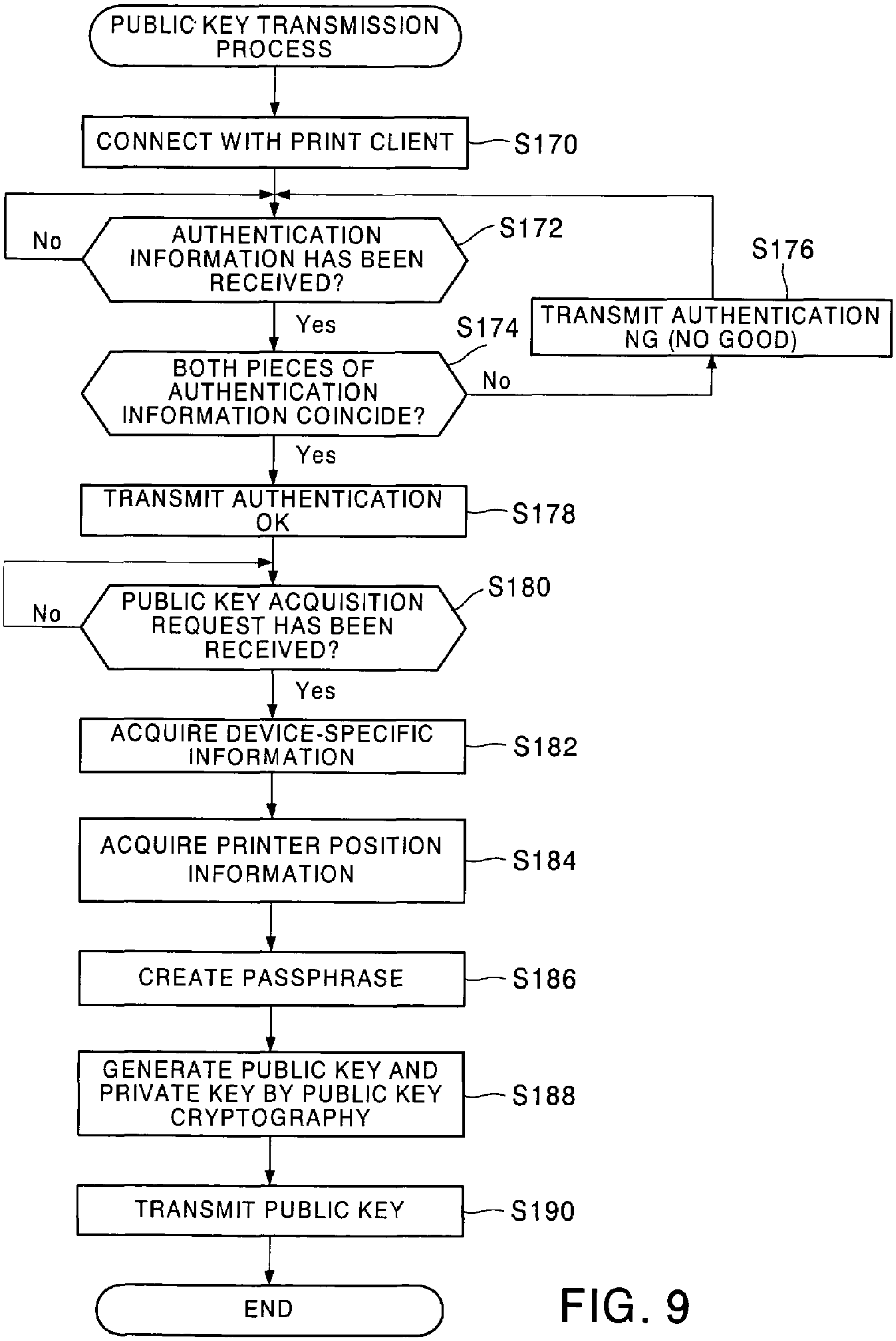
FIG. 9 is a flow chart explaining a public key transmission process executed by the printer according to the first embodiment of the present invention.

Next, a public key transmission process executed by the printer 30 or 32 corresponding to the public key request process in the print client 20 will be explained based on FIG. 9. FIG. 9 is a flowchart explaining the public key transmission process executed by the printer 30 or 32. The public key transmission process is realized by making the CPU 40 read and execute a public key transmission program stored in the ROM 44 or the hard disk 58 in the printer 30 or 32. Also here, similarly to the above, assuming the case where the print client 20 makes the request for the public key to the printer 30, the following explanation is given.

As shown in FIG. 9, first, the printer 30 establishes a connection with the print client 20 (step S170). This corresponds to the aforementioned step S100 on the print client 20 side. Subsequently, the printer 30 judges whether the authentication information has been received from the print client 20 (step S172). When the authentication information has not been received (step S172: No), the printer 30 stands by while repeating the process in step S172.

On the other hand, when the authentication information has been received from the print client 20 (step S172: Yes), the printer 30 judges whether this authentication information coincides with authentication information which is previously registered with the printer 30 (step S174). Specifically, since the client ID and the password are transmitted as the authentication information from the print client 20 as described above, the printer 30 judges whether these client ID and password coincide with a client ID and a password which are previously registered with the printer 30.

When these two pieces of authentication information do not coincide (step S174: No), the printer 30 transmits the authentication result indicating that the authentication is not accepted to the print client 20 (step S176) and returns to the process in step S172. On the other hand, when these two pieces of authentication information coincide (step S174: Yes), the printer 30 transmits the authentication result indicating that the authentication is accepted to the print client 20 (step S178).

Incidentally, the aforementioned authentication process from step S172 to step S178 can be omitted. In this case, step S102 and step S104 in the public key request process in FIG. 7 can be also omitted.

Thereafter, the printer 30 judges whether the public key acquisition request has been received from the print client 20 (step S180). When the public key acquisition request has not been received (step S180: No), the printer 30 stands by while repeating the process in step S180.

On the other hand, when the public key acquisition request has been received from the print client 20 (step S180: Yes), the printer 30 acquires device-specific information on the printer 30 (step S182). Here, the device-specific information is identification information specifically assigned to the printer 30, and it is, for example, a manufacturer's serial number, an MAC address, or the like of the printer 30. However, it is assumed in this embodiment that the printer 30 and the printer 32 use the same device-specific information.

Then, the printer 30 acquires print position information indicating the position of the printer 30 at this point in time from the position detector 54 (step S184). Subsequently, the printer 30 creates a passphrase with the device-specific information and the printer position information (step S186). There are various methods of creating the passphrase. In this embodiment, the passphrase is created by simply joining the printer position information after the device-specific information. Incidentally, the passphrase may contain data other than these device-specific information and printer position information.

Thereafter, the printer 30 generates a public key and a private key with the created passphrase by the public key cryptography (step S188). The public key cryptography has the property that the same public key and private key are generated again if the same passphrase is used. Then, the printer 30 transmits only the public key out of the generated public key and private key to the print client 20 (step S190). Incidentally, the private key is abandoned without being saved. Thus, the public key transmission process according to this embodiment is completed.

Next, a process in which a printer acquires printer information containing a relative distance from another printer and generates an alternative printer list table will be explained.

Figure 10:
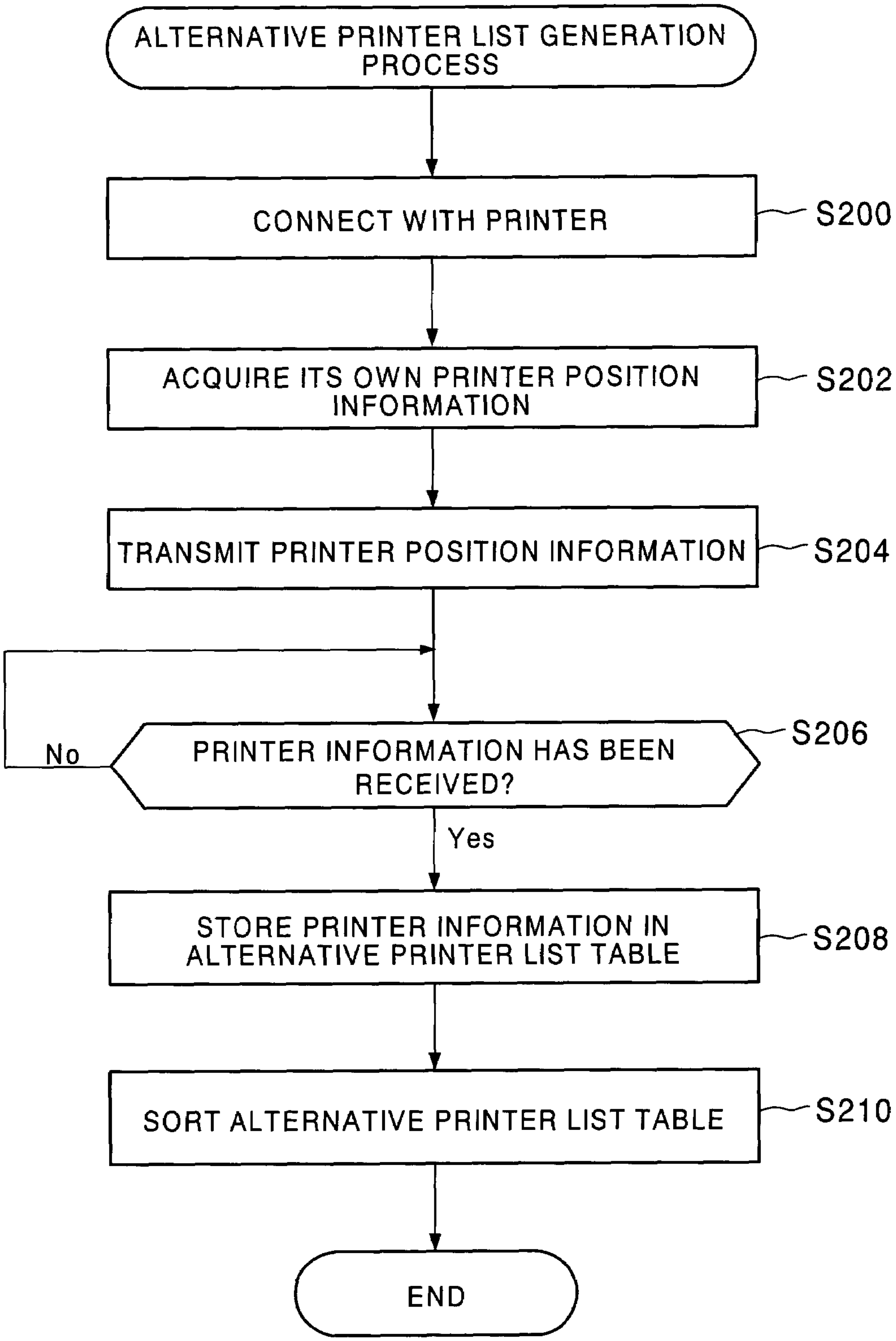
FIG. 10 is a flowchart explaining an alternative printer list generation process executed by the printer according to the first embodiment of the present invention.

FIG. 10 is a flowchart explaining an alternative printer list generation process executed by the printer 30 or 32. This alternative printer list generation process is realized by making the CPU40 read and execute an alternative printer list generation program stored in the ROM 44 or the hard disk 58 in the printer 30 or 32. This alternative printer list generation process is executed at predetermined time intervals, and, for example, executed once a day.

Moreover, this alternative printer list generation process is performed for printers within a predetermined range from a printer which executes this process. For example, when the printer 30 executes this alternative printer list generation process, the printer 30 executes the alternative printer list generation process for all printers in the same network address group as the printer 30. Furthermore, as another example, when the printer 30 is a printer which performs radio communication, the printer 30 executes the alternative printer list generation process for all printers with which the printer 30 can communicate by radio.

As shown in FIG. 10, the printer 30 establishes a connection with the printer 32 from which the printer 30 tries to acquire printer information (step S200). In this embodiment, the printer 30 establishes a connection between the printer 30 and the printer 32 by designating the network address of the printer 32. Moreover, in this embodiment, security of communication between the printer 30 and the printer 32 is ensured by SSL (secure socket layer) communication or the like.

Then, the printer 30 acquires its own printer position information at this point in time from the position detector 54 (step S202). Subsequently, the printer 30 transmits this printer position information to the printer 32 (step S204).

Thereafter, the printer 30 judges whether printer information has been received from the printer 32 (step S206). When the printer information has not been received (step S206: No), the printer 30 stands by while repeating the process in step S206.

On the other hand, when the printer information has been received from the printer 32 (step S206: Yes), the printer 30 stores this printer information in the alternative printer list table (step S208). FIG. 11 is a diagram showing an example of the structure of an alternative printer list table TB40 according to this embodiment. In this embodiment, this alternative printer list table TB40 is formed on the hard disk 58. As shown in FIG. 11, the alternative printer list table TB40 in this embodiment includes a network address D40, printer model information D41, a relative distance D42, and a public key D43 as items.

In the network address D40, network addresses are stored as information to specify printers. In the printer model information D41, information on models of the respective printers is stored. In the relative distance D42, relative distances between the printer 30 and candidates for the alternative printer are stored. In the public key D43, public keys of the candidates for the alternative printer are stored. In this embodiment, information stored in these network address D40, printer model information D41, relative distance D42, and public key D43 is contained in the printer information received in step S206. As described above, in the alternative printer list table TB40, the candidates for the alternative printer are listed including a relative distance on a printer-by-printer basis.

Then, as shown in FIG. 10, the printer 30 sorts the alternative printer list table TB40 (step S210). In this embodiment, the sorting is performed in order of the distance between the printer 30 and the alternative printer candidate from shortest to longest. Specifically, the distance between the printer 30 and each alternative printer candidate is stored as ΔX, ΔY, and ΔZ in relation to the X-axis, the Y-axis, and the Z-axis in the relative distance, and hence, the sorting is performed in order from nearest to the printer 30 based on these ΔX, ΔY, and ΔZ. For example, it is recommended that a linear distance L between the printer 30 and each alternative printer candidate be calculated by the following equation (1), and that the sorting be performed in order from the smallest value of the linear distance L.

$$L=\sqrt{\{(\Delta X)^2+(\Delta Y)^2+(\Delta Z)^2\}} \quad (1)$$

By sorting the alternative printer list table TB40, the alternative printer list generation process according to this embodiment is completed.

Figure 12:
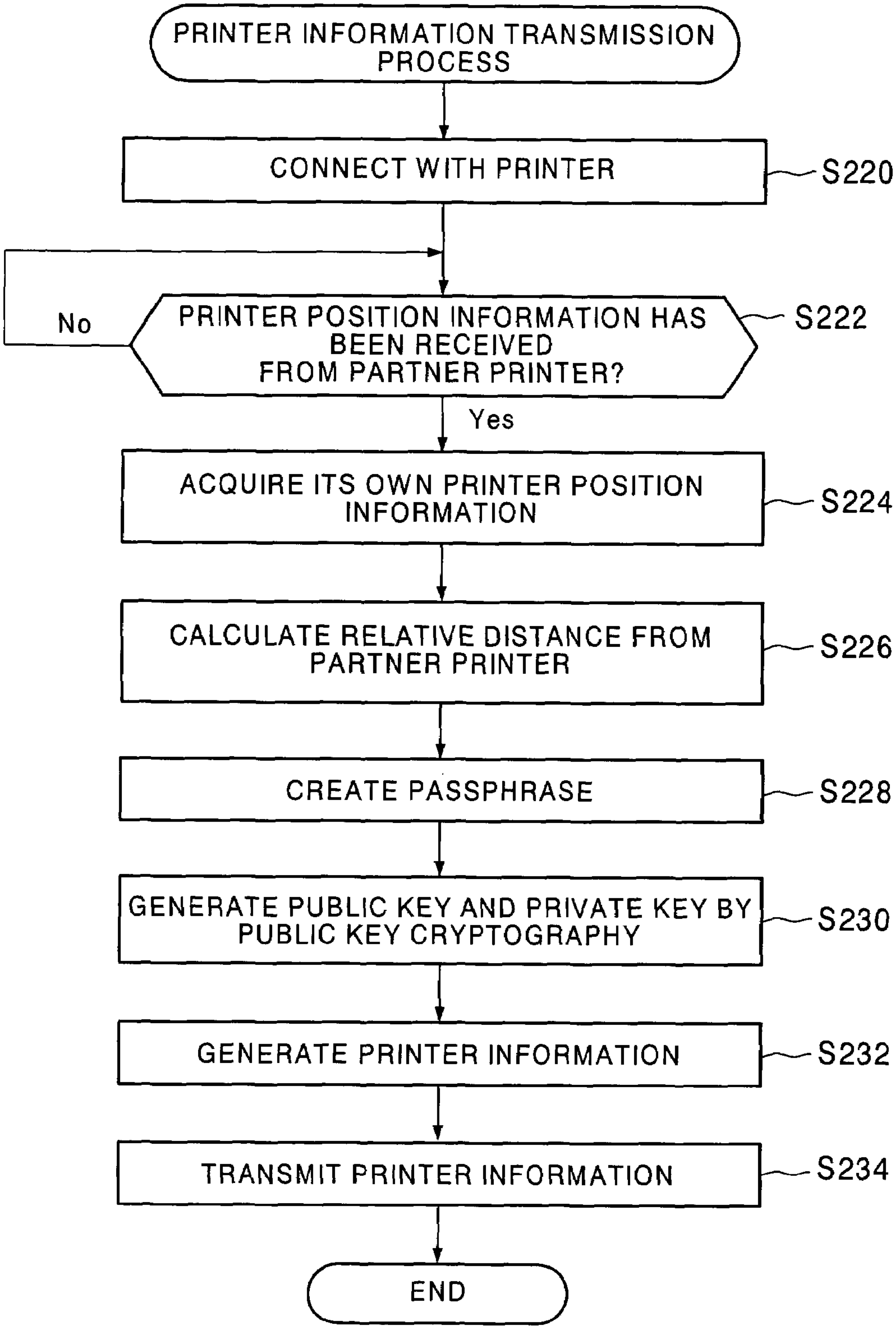
FIG. 12 is a flowchart explaining a printer information transmission process executed by the printer according to the first embodiment of the present invention.

Next, a printer information transmission process executed by another printer corresponding to the alternative printer list generation process will be explained. FIG. 12 is a flowchart explaining the printer information transmission process executed by the printer 30 or 32. This printer information transmission process is realized by making the CPU 40 read and execute a printer information transmission program stored in the ROM 44 or the hard disk 58 in the printer 30 or 32. Here, similarly to the above, assuming the case where the printer 30 makes a request for transmission of printer information to the printer 32, the following explanation is given.

As shown in FIG. 12, the printer 32 establishes a connection with the printer 30 (step S220). This corresponds to the aforementioned step S200. Accordingly, in this embodiment, security of communication between the printer 30 and the printer 32 is ensured by the SSL (secure socket layer) communication or the like.

Then, the printer 32 judges whether the printer position information has been received from the printer 30 which is a partner printer (step S222). When the printer position information has not been received (step S222: No), the printer 32 stands by while repeating the process in step S222.

On the other hand, when the printer position information has been received (step S222: Yes), the printer 32 acquires its own printer position information at this point in time from the position detector 54 (step S224). Subsequently, the printer 32 calculates a relative distance between the printer 30 and the printer 32 based on the printer position information on the printer 30 and the printer position information on the printer 32 (step S226). In this embodiment, the relative distance is calculated by obtaining differences with respect to the X-axis, the Y-axis, and the Z-axis, respectively. Namely, when the latitude, longitude, and altitude of the printer 30 are taken as X1, Y1, and Z1 respectively, and the latitude, longitude, and altitude of the printer position information on the printer 32 are taken as X2, Y2, and Z2 respectively, the relative distance is calculated by $\Delta X=|X1-X2|$, $\Delta Y=|Y1-Y2|$, and $\Delta Z=|Z1-Z2|$.

Thereafter, the printer 32 creates a passphrase based on its own device-specific information and its own printer position information (step S228), and generates a public key and a private key by the public key cryptography (step S230). The aforementioned process in step S228 and S230 is the same as that in step S186 and S188. Moreover, as described above, the device-specific information on the printer 32 used when the passphrase is created is the same as the device-specific information on the printer 30.

Then, the printer 32 generates printer information (step S232). In this embodiment, the printer information containing at least the relative distance calculated in step S226, printer model information on the printer 32, and the public key of the printer 32 generated in step S230 is generated. Subsequently, the printer 32 transmits this printer information to the printer 30 (step S234). Thus, the printer information transmission process according to this embodiment is completed.

Next, processes in the print client 20 and the printer 30 or 32 when the print client 20 wants to perform printing and transmits a print request to the printer 30 or 32 will be explained in detail.

Figure 13:
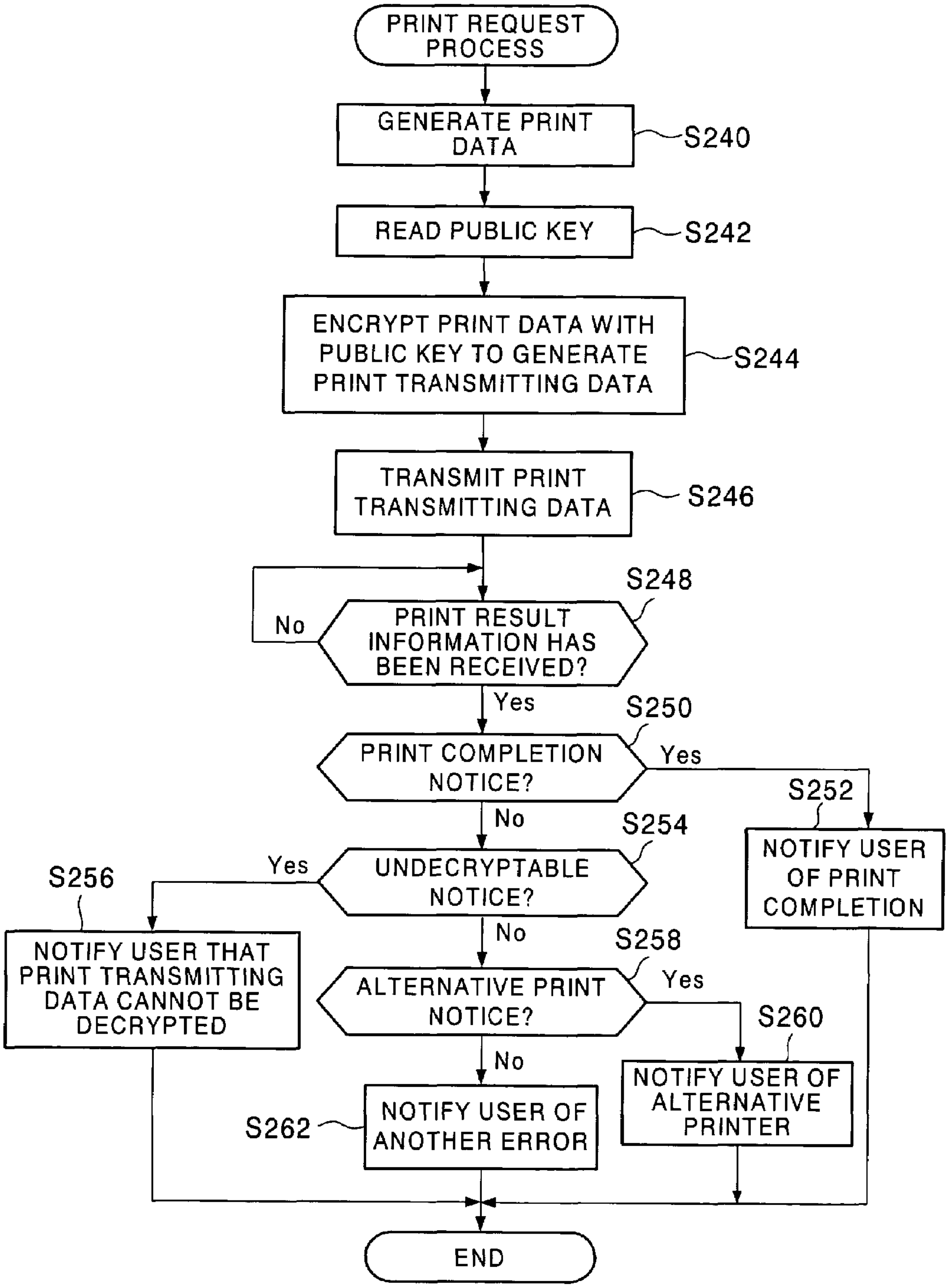
FIG. 13 is a flowchart explaining a print request process executed by the print client according to the first embodiment of the present invention.

FIG. 13 is a flowchart explaining a print request process executed by the print client 20. This print request process is realized by making the CPU64 read and execute a print request program stored in the ROM 68 or the hard disk 76 of the print client. Here, assuming a case where the print client 20 makes a print request to the printer 30, the following explanation is given.

As shown in FIG. 13, the print client 20 generates the print data D05 based on a print request from the user (step S240). The print data D05 is data necessary for an actual print operation when the printer 30 is an ordinary printer.

Then, the print client 20 reads the public key PKEY0 of the printer 30 from the public key table TB20 on the hard disk 76 (step S242). Subsequently, the print client 20 encrypts the print data D05 with the public key PKEY0 of the printer 30 to generate the print transmitting data D10 (step S244). Incidentally, the print transmitting data D10 may contain data other than the print data D05.

Thereafter, the print client 20 transmits the encrypted print transmitting data to the printer 30 (step S246). Specifically, the print client 20 designates the network address of the printer 30 and sends out the print transmitting data D10 to the network 10.

Subsequently, the print client 20 judges whether print result information has been received from the printer 30 (step S248). When the print result information has not been received (step S248: No), the print client 20 stands by while repeating the process in step S248. On the other hand, when the print result information has been received (step S248: Yes), the print client 20 judges whether the print result information is a print completion notice (step S250).

When this print result information is the print completion notice (step S250: Yes), it means that the printer 30 has properly completed the print operation, and hence the print client 20 notifies the user that the printer 30 has completed the print operation (step S252). On the other hand, when the received print result information is not the print completion notice (step S250: No), whether the print result information is an undecryptable notice is judged (step S254).

When the print result information is the undecryptable notice (step S254: Yes), the print client 20 notifies the user that since the print transmitting data D10 cannot be decrypted by the printer 30, the print operation is not executed (step S256). On the other hand, when the print result information is not the undecryptable notice (step S254: No), whether the print result information is an alternative print notice is judged (step S258).

When the print result information is the alternative print notice (step S258: Yes), the print client 20 notifies the user of alternative printing and besides notifies the user of information to specify the alternative printer contained in the alternative print notice (step S260). On the other hand, when the print result information is not the alternative print notice (step S258: No), it is thought that some other error occurs, and hence the print client 20 gives notice according to the type of the error to the user (step S262).

The print request process in the print client 20 is completed by the notice in step S252, step S256, step S260, or step S262.

Figure 14:
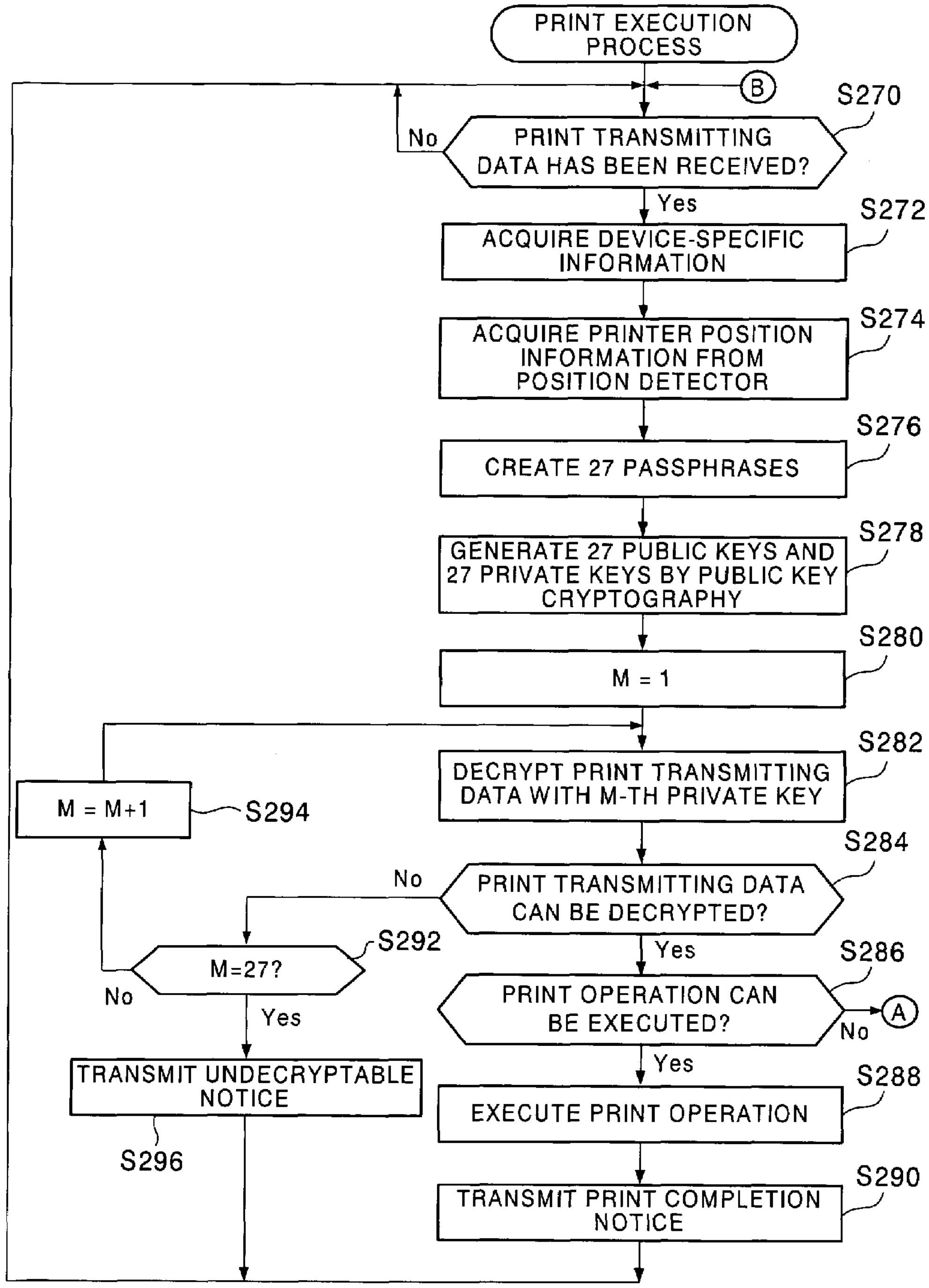
FIG. 14 is a flowchart explaining a print execution process executed by the printer according to the first embodiment of the present invention (First process)
Figure 15:
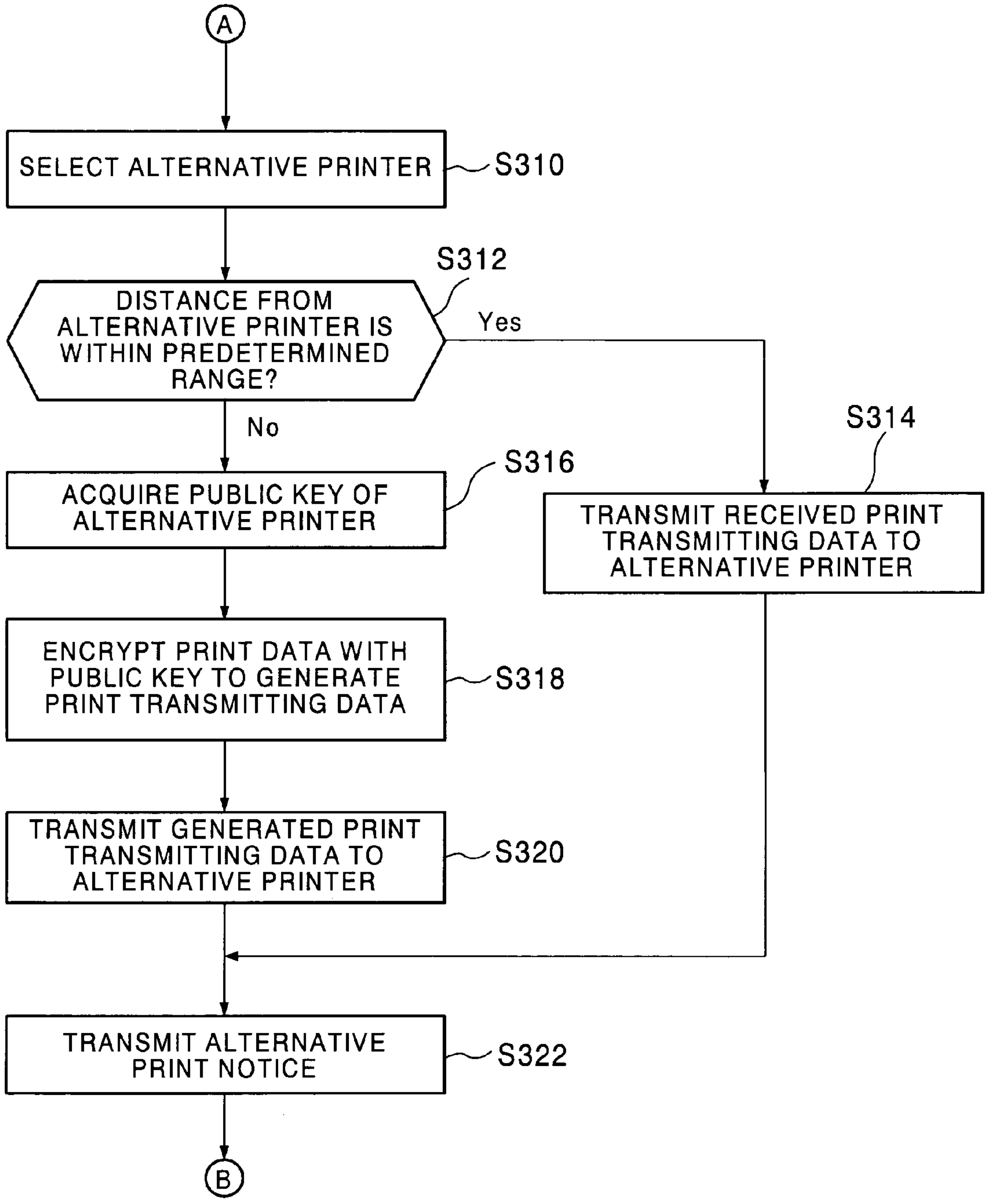
FIG. 15 is a flowchart explaining the print execution process executed by the printer according to the first embodiment of the present invention (Second process)

FIG. 14 and FIG. 15 are flowcharts explaining a print execution process executed by the printer 30 or 32 corresponding to the print request process in the print client 20. This print execution process is realized by making the CPU 40 read and execute a print execution program stored in the ROM 44 or the hard disk 58 in the printer 30 or 32. Also here, similarly to the above, assuming the case where the print client 20 makes the print request to the printer 30, the following explanation is given.

As shown in FIG. 14, the printer 30 judges whether the print transmitting data D10 has been received from the network 10 (step S270). When no print transmitting data D1 has been received (step S270: No), the printer 30 stands by while repeating the process in step S270.

On the other hand, when the print transmitting data D10 has been received (step S270: Yes), the printer 30 acquires its own device-specific information (step S272). Subsequently, the printer 30 acquires printer position information Xnow, Ynow, Znow on the printer 30 at this point in time from the position detector 54 (step S274). The reason why the printer position information Xnow, Ynow, Znow is acquired from the position detector 54 each time as described above is that, when the printer 30 is moved to a different place, there is a possibility that the printer 30 is installed in a place where the user does not intend to perform printing, and in order that in such a case, the print operation cannot be executed by the printer 30.

Then, the printer 30 creates 27 passphrases (step S276). In this embodiment, the passphrase is created by joining printer position information after the device-specific information, and in addition to the printer position information Xnow, Ynow, Znow acquired in step S274, passphrases are also created with position information on its surrounding 26 places as the joined printer position information.

Figure 16:
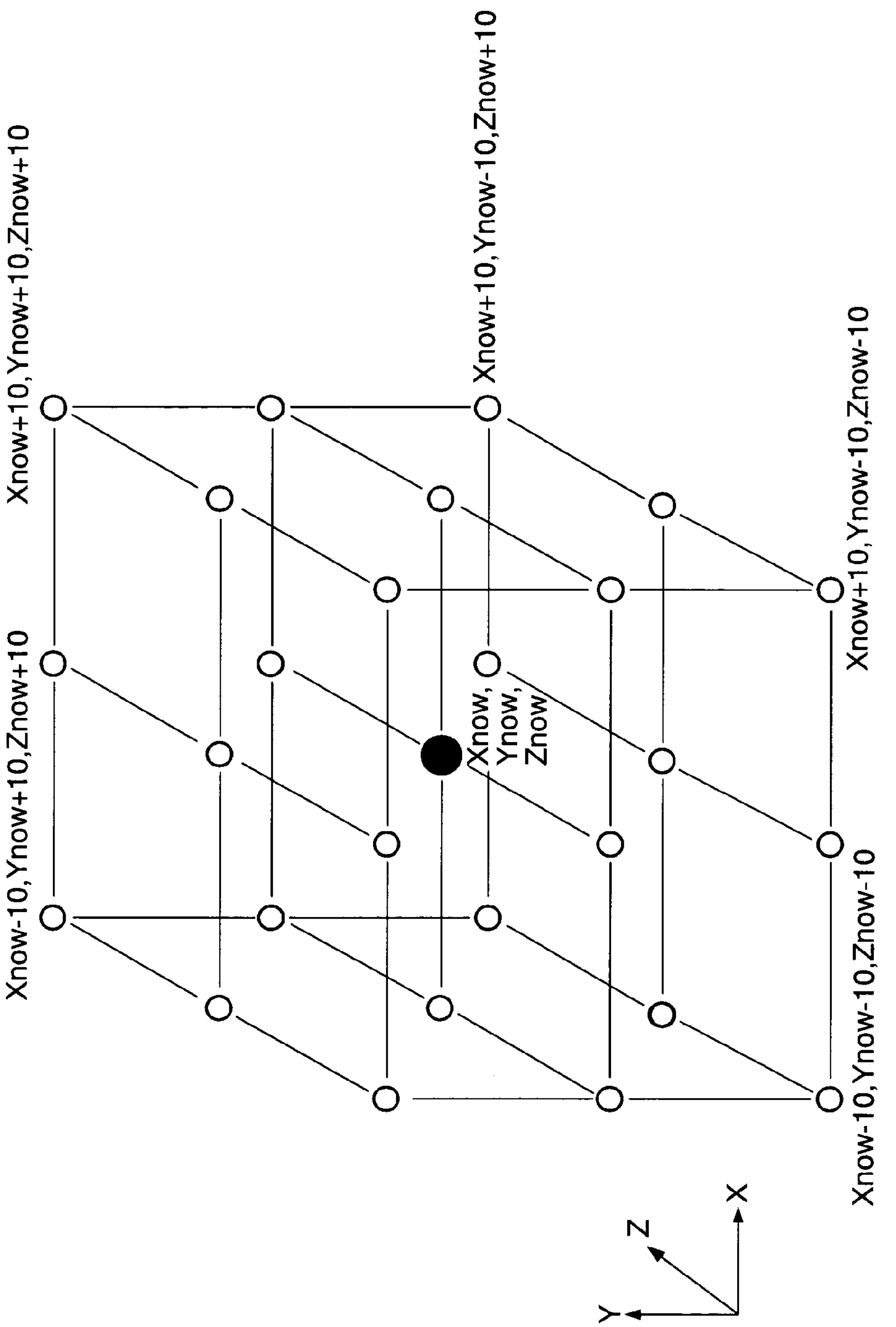
FIG. 16 is a diagram explaining the positional relation among 26 places around printer position information which are selected by the printer according to the first embodiment of the present invention.

FIG. 16 is a conceptual diagram explaining the relation between the printer position information Xnow, Ynow, Znow and the position information on its surrounding 26 places. As shown in FIG. 16, the printer position information Xnow, Ynow, Znow acquired from the position detector 54 in step S274 is set in a central position. In this case, 26 pieces of position information each sifted in a positive or negative direction by one minimum measurement unit of the position detector 54 exist around the printer position information Xnow, Ynow, Znow. Hence, in this embodiment, in order that, even when the printer position information in the position detector 54 differs compared with when a public key is transmitted, a private key capable of decrypting the print transmitting data D10 encrypted based on this public key is found out, the passphrases on places around the printer position information Xnow, Ynow, Znow are also created with the respective places as position information.

In the example in FIG. 16, the minimum measurement unit of the position detector 54 is 10 m. Accordingly, in addition to the printer position information Xnow, Ynow, Znow, the following printer position information on 26 places are set.

(1) printer position information Xnow+10, Ynow, Znow
(2) printer position information Xnow, Ynow+10, Znow
(3) printer position information Xnow, Ynow, Znow+10
(4) printer position information Xnow−10, Ynow, Znow
(5) printer position information Xnow, Ynow−10, Znow
(6) printer position information Xnow, Ynow, Znow−10
(7) printer position information Xnow+10, Ynow+10, Znow
(8) printer position information Xnow+10, Ynow, Znow+10
(9) printer position information Xnow, Ynow+10, Znow+10
(10) printer position information Xnow−10, Ynow−10, Znow
(11) printer position information Xnow−10, Ynow, Znow−10
(12) printer position information Xnow, Ynow−10, Znow−10
(13) printer position information Xnow+10, Ynow−10, Znow
(14) printer position information Xnow+10, Ynow, Znow−10
(15) printer position information Xnow, Ynow+10, Znow−10
(16) printer position information Xnow−10, Ynow+10, Znow
(17) printer position information Xnow−10, Ynow, znow+10
(18) printer position information Xnow, Ynow−10, Znow+10
(19) printer position information Xnow+10, Ynow+10, Znow+10
(20) printer position information Xnow+10, Ynow+10, Znow−10
(21) printer position information Xnow+10, Ynow−10, Znow+10
(22) printer position information Xnow−10, Ynow+10, Znow+10
(23) printer position information Xnow+10, Ynow−10, Znow−10
(24) printer position information Xnow−10, Ynow−10, Znow+10
(25) printer position information Xnow−10, Ynow+10, Znow−10
(26) printer position information Xnow−10, Ynow−10, Znow−10

Thereafter, as shown in FIG. 14, the printer 30 generates public keys and private keys with 27 passphrases generated in step S276 by the public key cryptography (step S278). Accordingly, in this embodiment 27 public keys and 27 private keys are generated. Subsequently, the printer 30 sets a counter M to 1 (step S280).

Then, the printer 30 encrypts the print transmitting data D10 with an M-th private key (step S282). The order of using respective private keys is optional, but in this embodiment, the private key generated with the printer position information Xnow, Ynow, Znow is used first. This is because, under ordinary circumstances, it is thought that the possibility that the print transmitting data D10 can be decrypted using a private key generated with printer position information acquired at this point in time is the highest, although it depends on the repeatability of the position detector 54.

Thereafter, the printer 30 judges whether the print transmitting data D10 can be decrypted with the private key (step S284). When the print transmitting data D10 can be decrypted (step S284: Yes), the printer 30 judges whether the printer 30 itself is in a state capable of executing the print operation (step S286). For example, when a paper jam or a paper empty error occurs in the printer 30, it is judged that the printer 30 is not in the state capable of executing the print operation.

When the printer 30 is in the state capable of executing the print operation (step S286: Yes), the printer 30 executes the print operation by driving the print engine 52 based on the acquired print data D05 (step S288). Specifically, the printer 30 performs a language interpretation of the print data D05 and generates print request data fitting the print engine 52. Then, by transmitting this print request data to the print engine 52, print sheets and so on are printed by the print engine 52.

As can be seen from the above, in this embodiment, the passphrases containing at least printer position information on 27 places are generated in step S276, 27 private keys are generated in step S278 by using these passphrases, and when the print transmitting data D10 can be decrypted with any of these 27 private keys, it is judged that the print transmitting data D10 matches the printer position information.

At a point in time when the print operation has been properly completed, the printer 30 transmits the print completion notice that the print operation has been properly completed as the print result information to the print client 20 (step S290). Then, the printer 30 returns to the aforementioned process in step S270.

Contrary to this, when it is judged in step S284 that the print transmitting data D10 cannot be decrypted (step S284: No), the printer 30 judges whether the counter M is 27 (step S292). When the counter M is not 27 (step S292: No), that is, when the generated private keys are still left, one is added to the counter M (step S294), and the printer 30 repeats the aforementioned process from step S282.

On the other hand, when the counter M is 27 (step S292: Yes), that is, when no generated private key is left, the printer 30 transmits the undecryptable notice as the print result information to the print client 20 (step S296). Namely, the received print transmitting data D10 cannot be decrypted with any of the generated 27 private keys, and hence the printer 30 judges that the print transmitting data D10 does not match the printer position information. Then, the printer 30 returns to the process in step S270.

On the other hand, when it is judged in the aforementioned step S286 that the printer 30 is not in the state capable of executing the print operation (step S286: No), as shown in FIG. 15, the printer 30 selects an alternative printer to perform alternative printing (step S310). Specifically, the printer 30 searches the alternative printer list table TB40 and selects a printer with the shortest relative distance D42. It is assumed here that the printer 32 is selected as the alternative printer.

Then, the printer 30 judges whether a distance between the printer 30 and the printer selected as the alternative printer is within a predetermined range (step S312). In this embodiment, 27 printer positions are set on the basis of 10 m which is a minimum measurement unit, and the predetermined range is correspondingly set at ±10 m in the latitude, the longitude, and the altitude, respectively. This is because it is thought that when ΔX, ΔY, and ΔZ of the relative distance 42 are each within a range of ±10 m, even if the print transmitting data D10 received from the print client 20 is transferred as it is to the printer 32, the print transmitting data D10 can be decrypted with a private key generated by the printer 32. Namely, as described above, the device-specific information on the printer 30 and the device-specific information on its surrounding printers are set identically. Hence, it is thought that if the distance between the printer 30 and the alternative printer 32 is within the predetermined range, the same public key and the same private key are generated, whereby even if the print transmitting data D10 is transferred as it is, the print transmitting data D10 can be decrypted by the printer 32.

Accordingly, when the distance from the printer selected as the alternative printer is within the predetermined range (step S312: Yes), the printer 30 transmits the print transmitting data D10 received from the print client 20 as it is to another printer 32 (step S314).

On the other hand, when the distance from the printer selected as the alternative printer is not within the predetermined range (step S312: No), the printer 30 acquires a public key of the alternative printer (step S316). Specifically, the printer 30 searches the alternative the printer list table TB40 and acquires the public key PKEY1 of the printer 32.

Then, the printer 30 encrypts the print data D05 with the public key PKEY1 to generate the print transmitting data D15 (step S318). Subsequently, the printer 30 transmits the generated print transmitting data D15 to the printer 32 as the alternative printer via the network 10 (step S320).

After these step S314 and step S320, the printer 30 transmits the alternative print notice as the print result information to the print client 20 (step S322). In this embodiment, this alternative print notice contains information to specify the printer to perform alternative printing. Then, the printer 30 returns to the aforementioned step S270 in FIG. 14.

Incidentally, also in the printer 32 which has received the print transmitting data D10 or the print transmitting data D15 from the printer 30, this print execution process is executed. Hence, when the print transmitting data D10 or D15 can be decrypted by the printer 32, a print operation is executed by the printer 32, and when the print transmitting data D10 or D15 cannot be decrypted, the print operation is not executed by the printer 32.

As described above, according to the print system of this embodiment, the print client 20 can limit a printer capable of printing the transmitted encrypted print transmitting data D10 based on printer position information, and hence the execution of a print operation by a printer installed in a position where the user of the print client 20 does not intend to perform printing can be avoided. For example, even if the print transmitting data D10 is transmitted by mistake to the printer 30 from the print client 20 when the printer 30 is moved to a different place but the network address of the printer 30 in the network 10 remains unchanged, the printer position information is changed in the printer 30, whereby the passphrase created in step S276 is different from that before the movement. Hence, the print transmitting data D10 cannot be decrypted with a private key generated with this passphrase, and thereby the print operation cannot be executed by the printer 30. Consequently, the security of the print data D05 can be enhanced.

On the other hand, also on the printer 30 or 32 side, the transmission of print data to the printer 30 or 32 by somebody who is not duly authorized to perform printing with the printer 30 or 32 and the execution of a large print operation by the printer 30 or 32 can be avoided.

Moreover, in this embodiment, the passphrase contains the device-specific information, and hence even if a third party can know the position of the printer 30 for some reason, the passphrase used in the printer 30 cannot be specified unless the device-specific information on the printer 30 is known. Consequently, the possibility that the third party who has no rightful authority performs printing with the printer 30 can be greatly reduced.

Further, according to the printer 30 or 32 of this embodiment, passphrases are created with the printer position information Xnow, Ynow, Znow acquired from the position detector 54 and position information around this printer position information Xnow, Ynow, Znow, plural private keys are generated with the created passphrases, and whether the print transmitting data D10 can be decrypted with any of the generated private keys is tried. Hence, even if, in relation to the detection accuracy of the position detector 54, a discrepancy occurs between the printer position information used when the public key is generated in the public key transmission process and the printer position information used when the private key is generated in the print execution process, it is possible to absorb the discrepancy and generate the private key capable of decrypting the print transmitting data D10. Consequently, the print transmitting data D10 can be decrypted smoothly.

Furthermore, according to the printer 30 or 32 of this embodiment, when the printer is not in the state capable of executing the print operation even if the print transmitting data D10 can be decrypted, the printer 30 or 32 makes a request for alternative printing to another printer. Hence, even if the user cannot perform printing with the printer 30, for example, the user can acquire a print result from the printer 32.

Besides, the printer 30 or 32 knows relative distances between the printer 30 or 32 and its surrounding printers by communicating with its surrounding printers for itself, and generates the alternative printer list table TB40. Hence, when the printer 30 or 32 selects the alternative printer, another printer which is in the nearest position to the printer which has received the print transmitting data D10 first can be selected, whereby the print result of alternative printing can be acquired from the printer in the nearest position to the printer which the user originally intends to use.

Additionally, the surrounding printers have the same device-specific information, and when the relative distance between the printer which has received the print transmitting data D10 and the alternative printer is within the predetermined range, the printer which has received the print transmitting data D10 transfers the print transmitting data D10 as it is to the alternative printer. On the other hand, when the relative distance between the printer which has received the print transmitting data D10 and the alternative printer is not within the predetermined range, the printer which has received the print transmitting data D10 encrypts again the print data D05, which is acquired by decrypting the print transmitting data D10, with the public key of the alternative printer to generate the print transmitting data D15, and transmits this print transmitting data D15 to the alternative printer. Therefore, when the relative distance is within the predetermined range, the process for encryption can be omitted.

Second Embodiment

In the second embodiment of the present invention, a modification is made to the aforementioned first embodiment, and when the printer 30 which has received the print transmitting data from the print client 20 is not in a state capable of executing a print operation, the printer 30 notifies the print client 20 of this state, and the print transmitting data is transmitted again from the print client 20 to the alternative printer. Further details will be given below.

It should be mentioned that the hardware configurations of the printers 30 and 32 are the same as that in FIG. 2 described above, and the hardware configuration of the aforementioned print client 20 is the same as that in FIG. 3. In this embodiment, however, device-specific information on the printer 30 and device-specific information on the printer 32 need not be necessarily the same. Moreover, in this embodiment, the flow of print data when alternative printing is performed is different from that in the aforementioned first embodiment.

Figure 17:
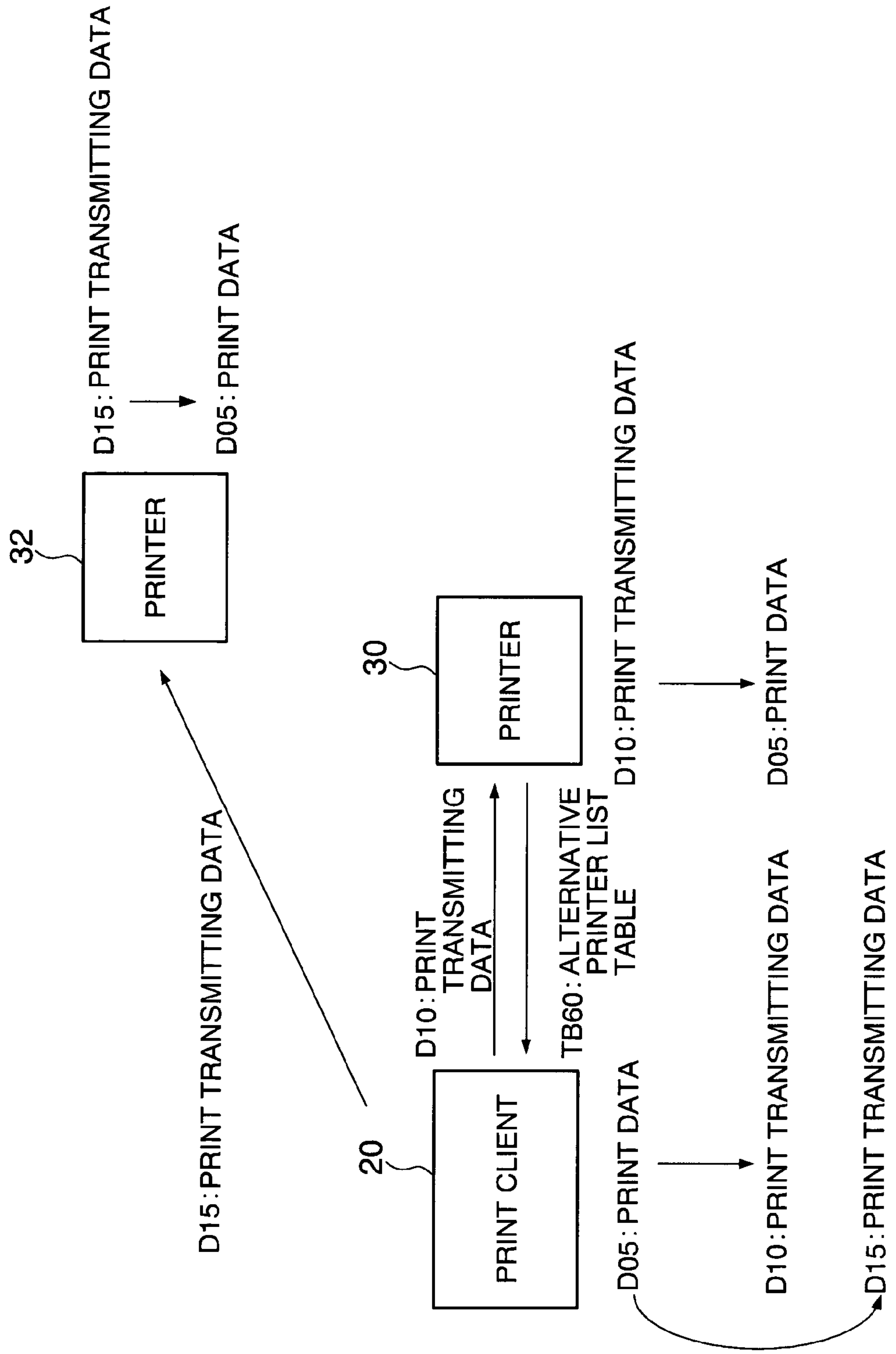
FIG. 17 is a diagram explaining the flow of print data and print transmitting data when alternative printing is performed in a second embodiment of the present invention.

FIG. 17 is a block diagram explaining the contents of a process when alternative printing is performed by the printer 32 in a case where the printer 30 which has received print transmitting data is not in a state capable of executing a print operation in a print system according to this embodiment.

First, the user of the print client 20 generates data to be printed and designates the printer 30 for the print client 20 to execute a print operation. The print client 20 encrypts the print data D05 with the public key PKEY0 of the printer 30 to generate the print transmitting data D10. Subsequently, the print client 20 transmits the generated print transmitting data D10 to the printer 30 via the network 10. The printer 30 which has received the print transmitting data D10 temporarily stores the received print transmitting data D10 in the RAM 42 as shown in FIG. 2. Then, the printer 30 tries to decrypt the encrypted print transmitting data D10 with plural predetermined private keys. When the print transmitting data D10 can be decrypted with any of the private keys, the printer 30 executes the print operation, and when the print transmitting data D10 cannot be decrypted with any of the private keys, the printer 30 does not execute the print operation.

It is assumed here that the printer 30 cannot execute the print operation for some reason. Then, the printer 30 transmits an alternative print notice and an alternative printer list table held by this printer 30 to the print client 20. Based on this alternative printer list table and the public key table TB20, the print client 20 which has received the alternative printer list table selects a printer nearest to the printer 30 out of printers whose public keys are acquired by the print client 20 as the alternative printer. It is assumed here that the printer 32 is selected as the alternative printer.

Then, the print client 20 encrypts the print data D05 with the public key PKEY1 of the alternative printer 32 to generate the print transmitting data D15. Subsequently, the print client 20 transmits the print transmitting data D15 to the alternative printer 32 via the network 10.

The alternative printer 32 which has received the print transmitting data D15 tries to decrypt the print transmitting data D15 with plural predetermined private keys. When the print transmitting data D15 can be decrypted with any of the private keys, the printer 32 executes a print operation, and when the print transmitting data D15 cannot be decrypted with any of the private keys, the printer 32 does not execute the print operation.

Next, as for processes in the print client 20 and the printer 30 or 32 when the print client 20 acquires the public key of each printer, these processes are the same as those in the aforementioned first embodiment. On the other hand, a process in the printer 30 or 32 for generating the alternative printer list table is basically the same as that in the aforementioned first embodiment, but as compared with the alternative printer list table TB40 according to the first embodiment, the alternative printer list table according to this embodiment is different in that the public key D43 is not contained.

FIG. 18 is a diagram showing an example of the structure of an alternative printer list table TB60 according to this embodiment. Also in this embodiment, the alternative printer list table T60 is stored on the hard disk 58 of the printer 30 or 32. As shown in FIG. 18, the alternative printer list table TB60 according to this embodiment contains the network address D40, the printer model information D41, and the relative distance D42 as data items, but does not contain the public key. This is to ensure the security of public keys since the alternative printer list table TB60 is transmitted to the print client 20 when alternative printing is performed.

Figure 19:
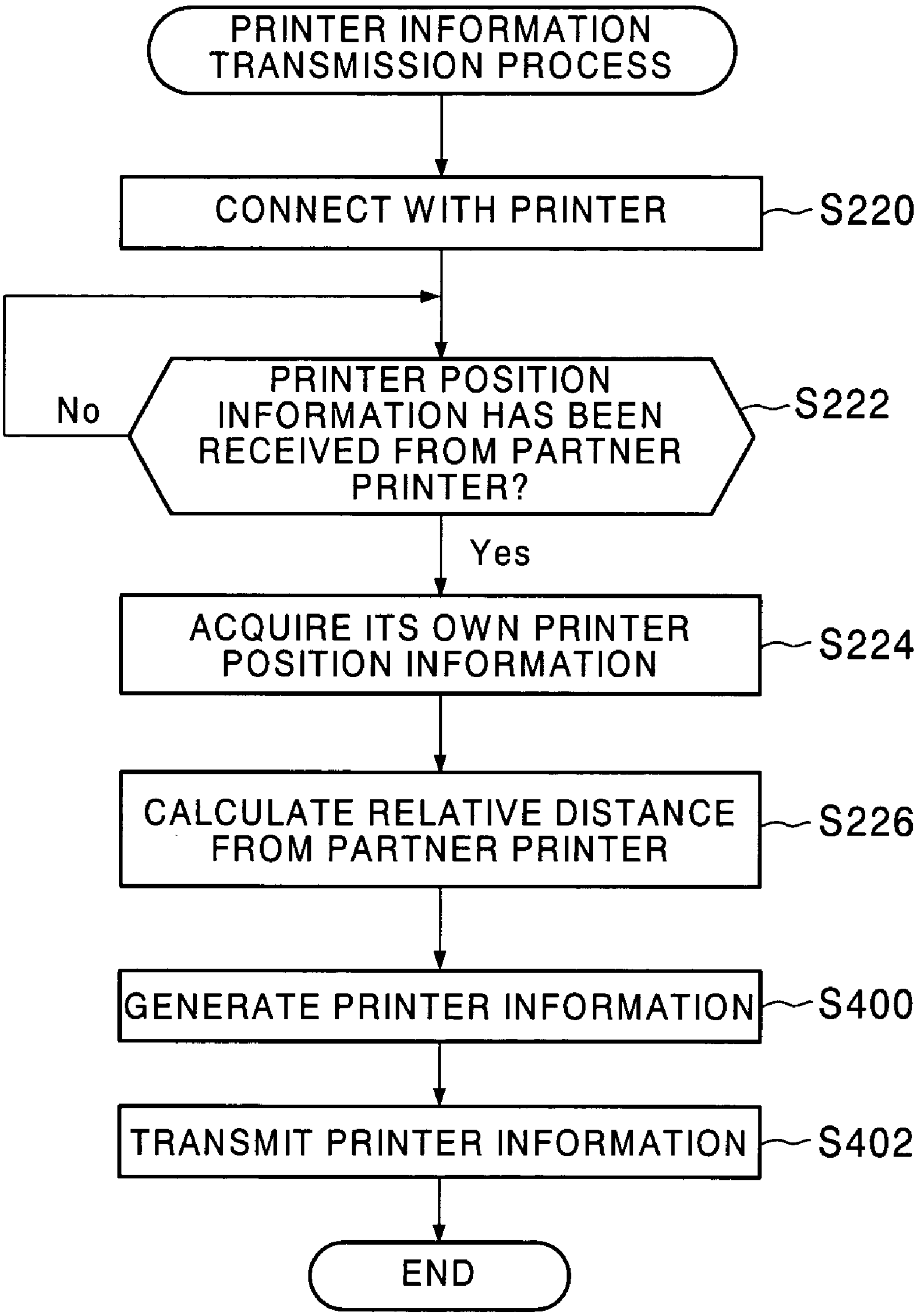
FIG. 19 is a flowchart explaining a printer information transmission process executed by the printer according to the second embodiment of the present invention.

Therefore, a printer information transmission process according to this embodiment is partially different from that in the aforementioned first embodiment. FIG. 19 is a flowchart explaining the printer information transmission process according to this embodiment and corresponds to FIG. 12 described above. The printer information transmission process according to this embodiment is the same as that in the aforementioned first embodiment from step S220 to step S226. However, the process in and after step S400 subsequent to step S226 is different from that in the first embodiment.

Namely, after calculating the relative distance between the printer 32 and the partner printer in step S226, the printer 32 generates printer information (step S400). In this embodiment, this printer information contains at least the network address of the printer 32, its printer model information, and the relative distance calculated in step S226.

Then, the printer 32 transmits the generated printer information to the printer 30 (step S402). Thus, the printer information transmission process according to this embodiment is completed.

Figure 20:
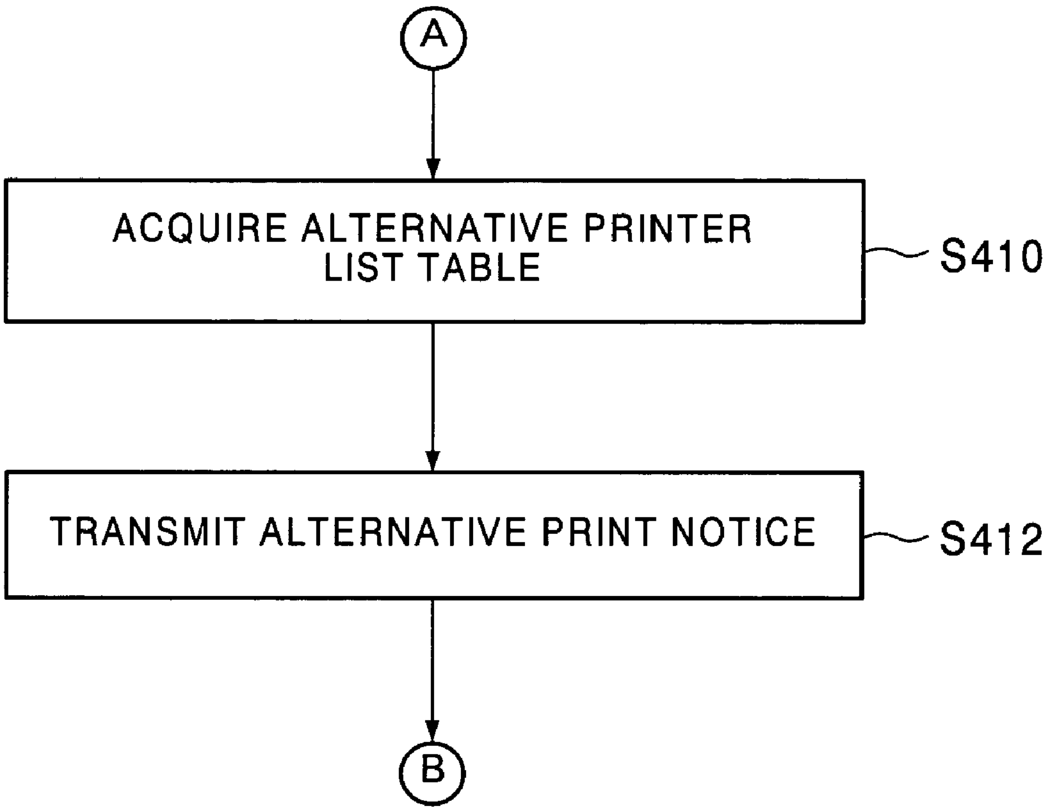
FIG. 20 is a flowchart explaining a print execution process executed by the printer according to the second embodiment of the present invention.

Next, a print execution process according to this embodiment is different from that in the first embodiment in a process when it is judged that the printer 30 is not in the state capable of executing the print operation. FIG. 20 is a flowchart explaining the print execution process when it is judged that the printer 30 is not in the state capable of executing the print operation and corresponds to FIG. 15. Namely, the process corresponding to FIG. 14 is the same as that in the aforementioned first embodiment.

As shown in FIG. 20, when it is judged in step S286 in FIG. 14 that the printer 30 is not in the state capable of printing the decrypted print data D05 (step S286: No), the printer 30 acquires the alternative printer list table TB60 stored on the hard disk 58 (step S410).

Then, the printer 30 transmits an alternative print notice containing the alternative printer list table TB60 to the print client 20 which has transmitted the print transmitting data D10 (step S412). Thereafter, the printer 30 returns to step S270 in FIG. 14. Except for this point, the print execution process is the same as that in the aforementioned first embodiment.

Figure 21:
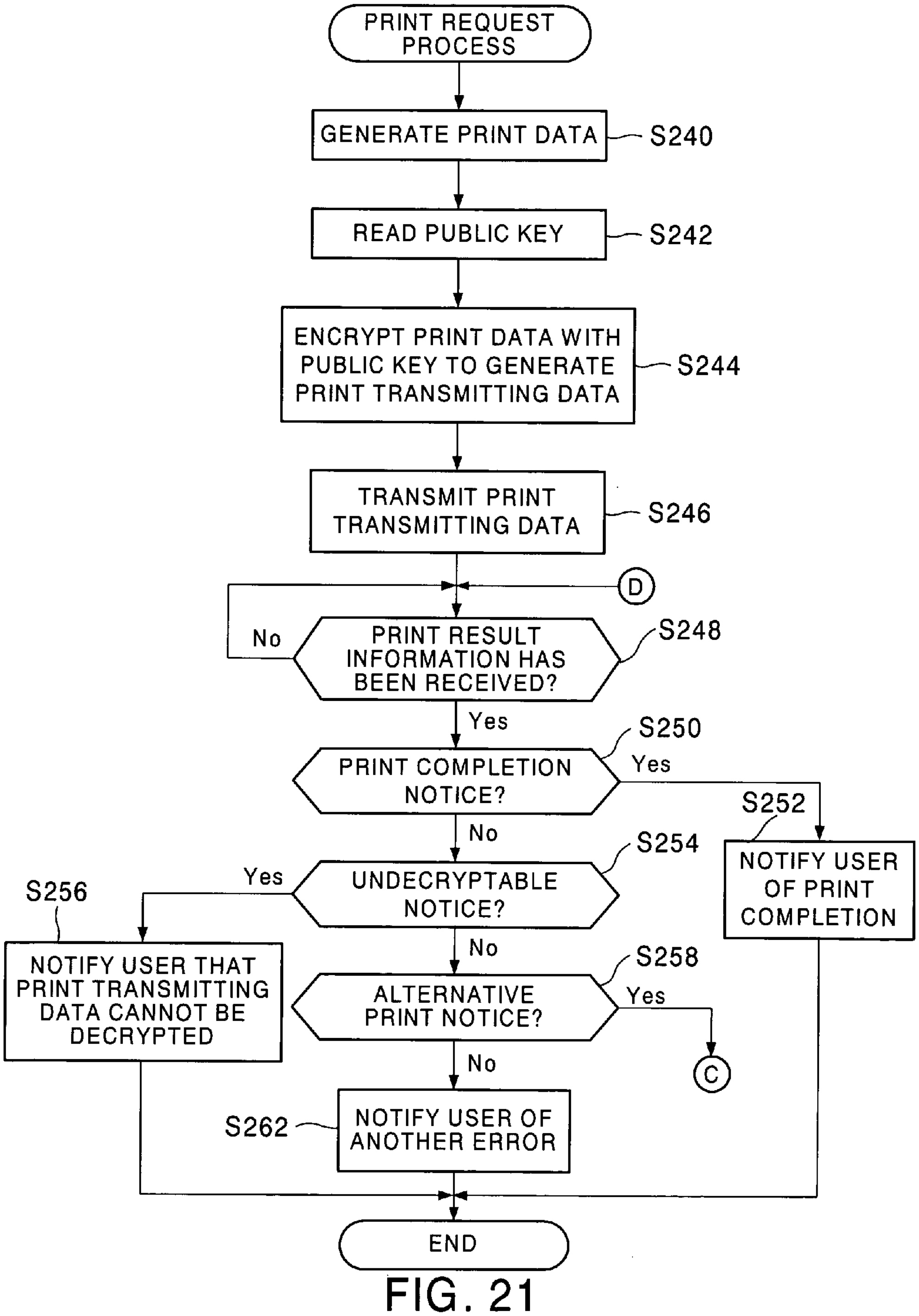
FIG. 21 is a flowchart explaining a print request process executed by a print client according to the second embodiment of the present invention (First process)
Figure 22:
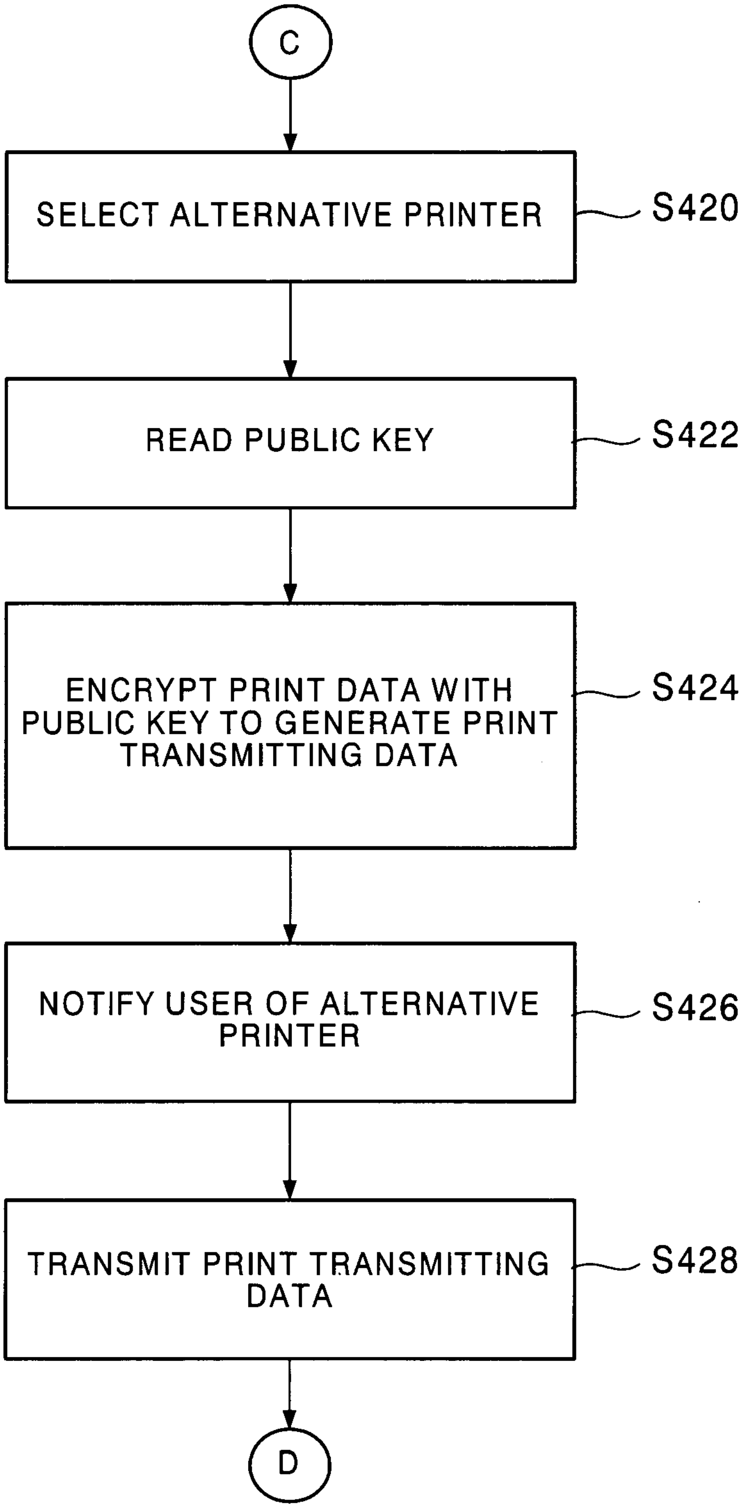
FIG. 22 is a flowchart explaining the print request process executed by the print client according to the second embodiment of the present invention (Second process)

Next, a print request process according to this embodiment will be explained based on FIG. 21 and FIG. 22. FIG. 21 and FIG. 22 are flowcharts explaining the print request process according to this embodiment and correspond to FIG. 13 described above. As shown in FIG. 21, the process when, in step S258, the print client 20 judges that the print result information received from the printer 30 is the alternative print notice is different from that in the aforementioned first embodiment.

Namely, when the received print result information is the alternative print notice (step S258: Yes), as shown in FIG. 22, the print client 20 selects an alternative printer (step S420). In this embodiment, the print client 20 selects a printer which is in the nearest position to the printer 30 out of printers whose public keys are held by the print client 20 as the alternative printer. Specifically, the print client 20 selects a printer with the shortest relative distance D42 in the received alternative printer list table TB60 out of printers registered with the public key table TB20. The linear distance L is calculated from the relative distance D42 with the aforementioned equation (1).

Then, the print client 20 reads a public key of the selected alternative printer from the public key table TB20 (step S422). It is assumed here that the printer 32 is selected as the alternative printer and that the public key PKEY1 is read. Subsequently, the print client 20 encrypts the print data D05 again with the public key PKEY1 to generate the print transmitting data D15 (step S424).

Thereafter, the print client 20 notifies the user of information which specifies the alternative printer (step S426). Subsequently, the print client 20 transmits the print transmitting data D15 generated in step S424 to the printer 32 via the network 10 (step S428). Thus, the print request process according to this embodiment is completed.

As described above, the security of the print data D05 and the printer 30 or 32 can be secured also by the print system according to this embodiment. Moreover, even if, in relation to the detection accuracy of the position detector 54, a discrepancy occurs between the printer position information used when the public key is generated in the public key transmission process and the printer position information used when the private key is generated in the print execution process, it is possible to absorb the discrepancy and generate the private key capable of decrypting the print transmitting data D10.

Moreover, according to the printer 30 or 32 of this embodiment, when the printer is not in the state capable of executing the print operation even if the print transmitting data D10 can be decrypted, the printer 30 or 32 notifies the print client 20 of the alternative printer list table TB60 which is a list of printers capable of performing alternative printing. Hence, the print client 20 can select the alternative printer from this alternative printer list table TB60.

Further, the alternative printer list table TB60 contains the relative distance D42 between the printer to which the print transmitting data D10 has been transmitted and each of candidates for its alternative printer, whereby the print client 20 can selects the alternative printer in the nearest position to the printer to which the print transmitting data D10 has been transmitted out of printers whose public keys are acquired by the print client 20.

Furthermore, the alternative printer list table TB60 in this embodiment does not contain public keys of printers, and hence alternative printing can be performed by only a printer whose public key can be actually acquired rightfully by the print client 20, which prevents users who have no authority from performing printing with the alternative printer.

Third Embodiment

In the third embodiment of the present invention, a modification is made to the method of transmitting the print data D05 in the aforementioned first embodiment, and print transmitting data D100 is generated by joining print position information on a printer, to which the print data D05 is transmitted, to the print data D05. Further details will be given below.

It should be mentioned that the hardware configurations of the printers 30 and 32 are the same as that in FIG. 2 described above, and the hardware configuration of the aforementioned print client 20 is the same as that in FIG. 3. In this embodiment, however, device-specific information on the printer 30 and device-specific information on the printer 32 need not be necessarily the same. Moreover, in this embodiment, the method of generating print transmitting data is different from that in the aforementioned first embodiment.

Figure 23:
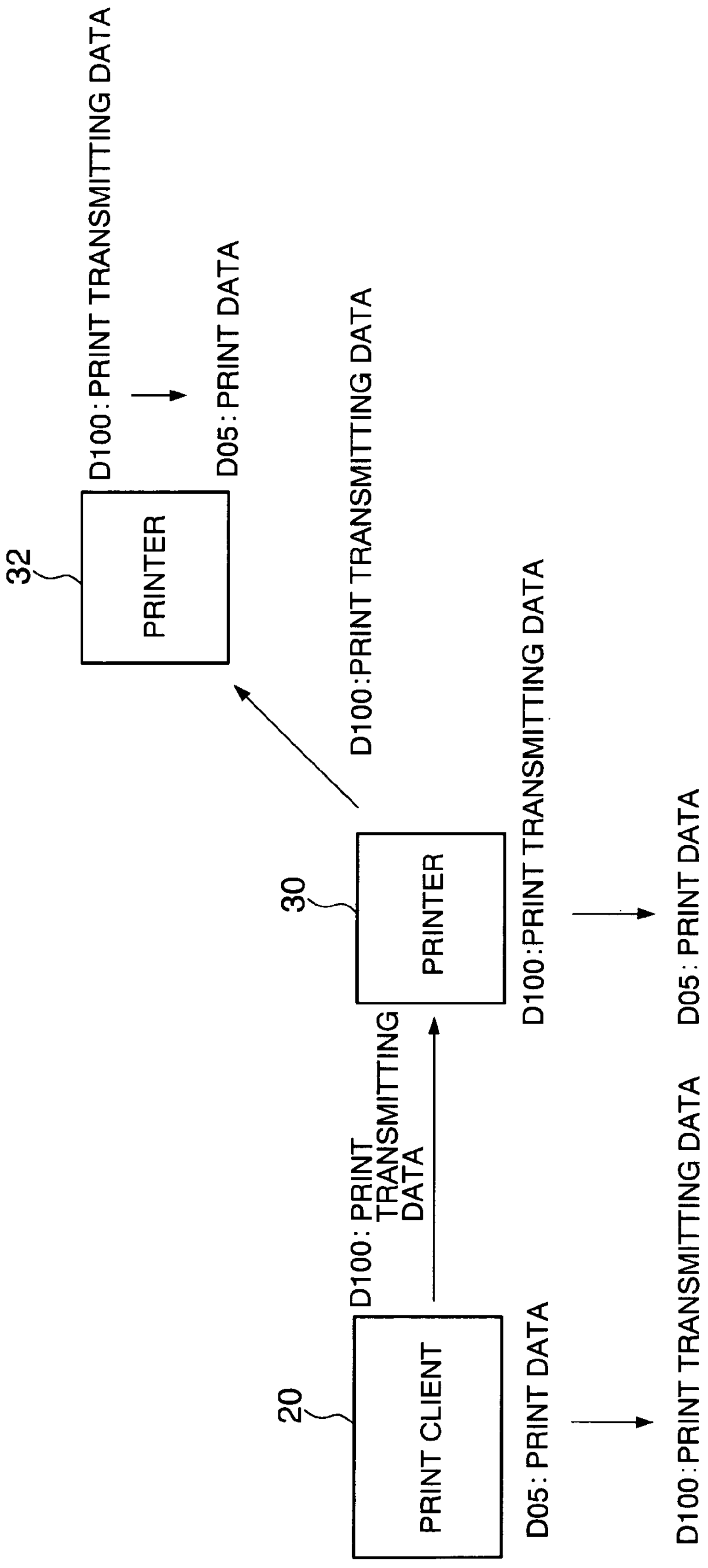
FIG. 23 is a diagram explaining the flow of print data and print transmitting data when alternative printing is performed in a third embodiment of the present invention (when a relative distance between a printer which makes a request for alternative printing and a printer to which the request for alternative printing is made is within a predetermined range)
Figure 24:
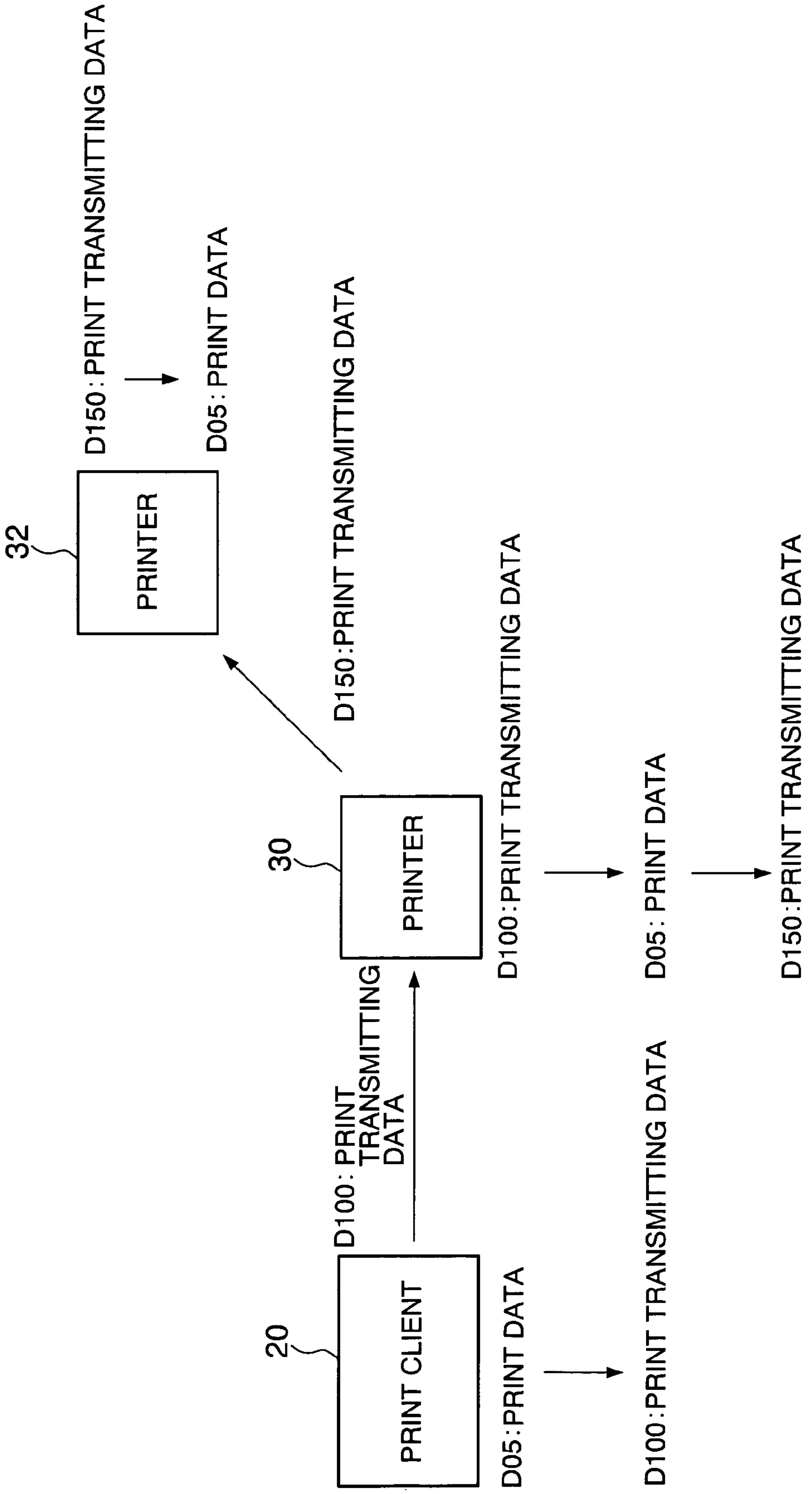
FIG. 24 is a diagram explaining the flow of the print data and the print transmitting data when the alternative printing is performed in the third embodiment of the present invention (when the relative distance between the printer which makes the request for alternative printing and the printer to which the request for alternative printing is made is not within the predetermined range)

FIG. 23 is a block diagram explaining the contents of a process when the printer 30 which has received the print transmitting data D100 makes a request for alternative printing to the printer 32, the printer 32 is located within a predetermined range, and FIG. 24 is a block diagram when the printer 32 is not located within the predetermined range in the same case.

First, the print client 20 previously acquires printer position information, for example, on the printer 30 from the printer 30. In this embodiment, the printer position information is acquired via the network 10. Namely, the printer 30 confirms whether the print client which requests the printer position information has rightful authority, and notifies the print client of the printer position information only when the print client has rightful authority. However, the printer 30 need not necessarily notify the print client 20 of the printer position information on the printer 30 via the network 10. For example, if the user of the print client 20 has rightful authority, he or she can go to the installation location of the printer 30 and operate the printer 30, whereby it is also possible that the user operates a control panel of the printer 30 and acquires the printer position information on the printer 30. In this case, for example, the user is required to record the printer position information on the printer 30 on a record medium such as a flexible disk and causes the print client 20 to read this printer position information.

Figure 25:
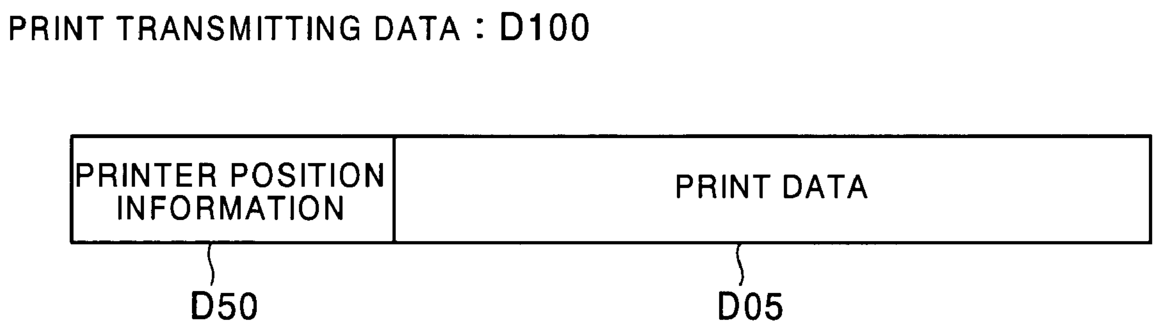
FIG. 25 is a diagram explaining a data format of the print transmitting data according to the third embodiment of the present invention.

Then, the user of the print client 20 generates data to be printed and designates the printer 30 for the print client 20 to execute a print operation. FIG. 25 is a diagram explaining a data format of the print transmitting data D100.

As shown in FIG. 25, the print client 20 generates the print transmitting data D100 by joining the acquired print position information to the generated print data D05. Incidentally, the print transmitting data D100 may contain data other than the print data D05 and printer position information D50 shown in FIG. 25.

As shown in FIG. 23 and FIG. 24, the print client 20 then transmits the generated print transmitting data D100 to the printer 30 via the network 10. The printer 30 which has received the print transmitting data D100 temporarily stores the received print transmitting data D100 in the RAM 42 as shown in FIG. 2. The printer 30 then acquires the printer position information contained in the print transmitting data D100 and judges whether the print transmitting data D100 matches printer position information on the printer 30 at this point in time. Here, when a difference between the printer position information contained in the print transmitting data D100 and the printer position information on the printer 30 at this point in time is within a predetermined range, the printer 30 judges that there is a match between the two.

When there is a match between the two, the printer 30 transmits the print data D05 contained in the print transmitting data D100 to the print engine 52 to execute a print operation, and when there is a mismatch between the two, the printer 30 does not execute the print operation.

It is assumed here that the printer 30 cannot execute the print operation for some reason. Then, the printer 30 searches an alternative printer list table and selects a printer with the shortest relative distance as a printer which prints the print data D05 as an alternative thereto. It is assumed here that the printer 32 is selected as an alternative printer.

Subsequently, the printer 30 judges whether the distance between the printer 30 and the alternative printer 32 is within a predetermined range. When the distance between the printer 30 and the alternative printer 32 is within the predetermined range, as shown in FIG. 23, it is expected that even if the received print transmitting data D100 is transferred as it is, the print transmitting data D100 will be printed by the alternative printer 32, and hence, the print transmitting data D100 is transferred as it is to the alternative printer 32. The alternative printer 32 compares the printer position information contained in the received print transmitting data D100 and printer position information on the alternative printer 32 at this point in time. When a difference between these two pieces of printer position information is within the predetermined range, a print operation is executed, and when the difference between these two pieces of printer position information is not within the predetermined range, the print operation is not executed.

On the other hand, when the distance between the printer 30 and the alternative printer 32 is not within the predetermined range, it is thought that if the received print transmitting data D100 is transferred as it is, the print transmitting data D100 is not printed by the alternative printer 32. Therefore, the printer 30 joins the printer position information on the alternative printer 32 to the print data D05 to generate another print transmitting data D150 as shown in FIG. 24. Then, the printer 30 transmits this print transmitting data D150 to the alternative printer 32. The alternative printer 32 which has received the print transmitting data D150 compares the printer position information contained in the received print transmitting data D150 and the printer position information on the alternative printer 32 at this point in time. When a difference between the printer position information contained in the received print transmitting data D150 and the printer position information on the alternative printer 32 at this point in time is within the predetermined range, a print operation is executed, and when the difference between these two pieces of printer position information is not within the predetermined range, the print operation is not executed.

Next, processes in the print client 20 and the printer 30 or 32 when the print client 20 acquires printer position information on each printer will be explained in detail.

Figure 26:
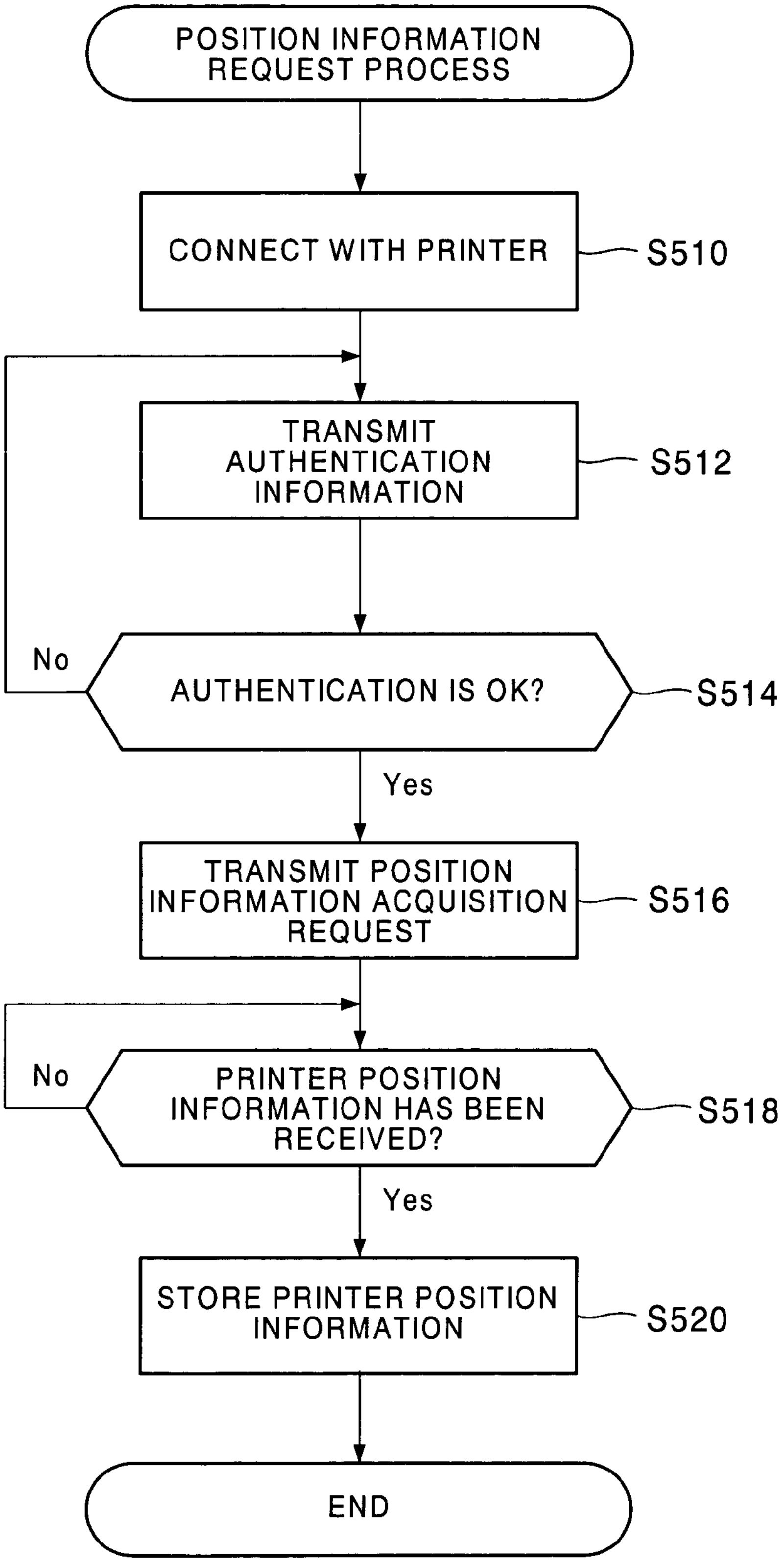
FIG. 26 is a flowchart explaining a position information request process executed by a print client according to the third embodiment of the present invention.

FIG. 26 is a flowchart explaining a position information request process executed by the print client 20. This position information request process is realized by making the CPU 64 read and execute a position information request program stored in the ROM 68 or the hard disk 76 in the print client. Moreover, the position information request process is a process which the user causes the print client 20 to execute as initial setting only once after the printer 30 or 32 is installed. Assuming here a case where the print client 20 makes a request for printer position information to the printer 30, the following explanation is given.

As shown in FIG. 26, in the position information request process, the print client 20 first connects with the printer 30 (step S510). Specifically, the print client 20 establishes a connection between the print client 20 and the printer 30 by designating the network address of the printer 30.

Thereafter, the print client 20 transmits authentication information to the printer 30 (step S512). Here, the authentication information is information necessary for the printer 30 to judge whether the print client 20 or the user who operates the print client 20 has authority to use the printer 30. In this embodiment, a combination of a client ID to specify the print client and a password is used as the authentication information. Accordingly, the print client 20 transmits the client ID and the password to the printer 30.

Subsequently, the print client 20 receives an authentication result indicating whether authentication is accepted from the printer 30, and judges whether the authentication is accepted by the printer 30 based on the authentication result (step S514). When the authentication is not accepted (step S514: No), the print client 20 repeats the aforementioned process from step S512.

On the other hand, when the authentication is accepted (step S514: Yes), the print client 20 transmits a position information acquisition request to the printer 30 (step S516). Then, the print client 20 judges whether the printer position information has been received from the printer 30 (step S518). When the printer position information has not been received from the printer 30 (step S518: No), the print client 20 stands by while repeating step S518.

On the other hand, when the printer position information has been received from the printer 30 (step S518: Yes), the printer position information is stored (step S520). In this embodiment, the print client 20 is provided with a printer position information table TB100 on the hard disk 76, and the acquired printer position information is stored and held in this printer position information table TB100.

FIG. 27 is a diagram showing an example of the structure of the printer position information table TB100. As shown in FIG. 27, the printer position information table TB100 includes an item D110 which stores information to specify printers and an item D111 which stores acquired printer position information corresponding to the printers.

In this embodiment, the item D100 stores network addresses of printers as an example of information to specify the printers. The item D111 includes an item D112 which stores latitude out of printer specification information, an item D113 which stores longitude, and an item D11 which stores altitude. The printer position information table TB100 can hold printer position information on plural printers on a printer-by-printer basis. Moreover, by storing the printer position information in the printer position information table TB100 on the hard disk 78 in this manner, even when the print client 20 is powered off and then powered on again, the printer position information acquired before the power-on can be read from the hard disk 78 and used as it is.

By storing the acquired printer position information in the printer position information table TB100, the position information request process shown in FIG. 26 is completed.

Figure 28:
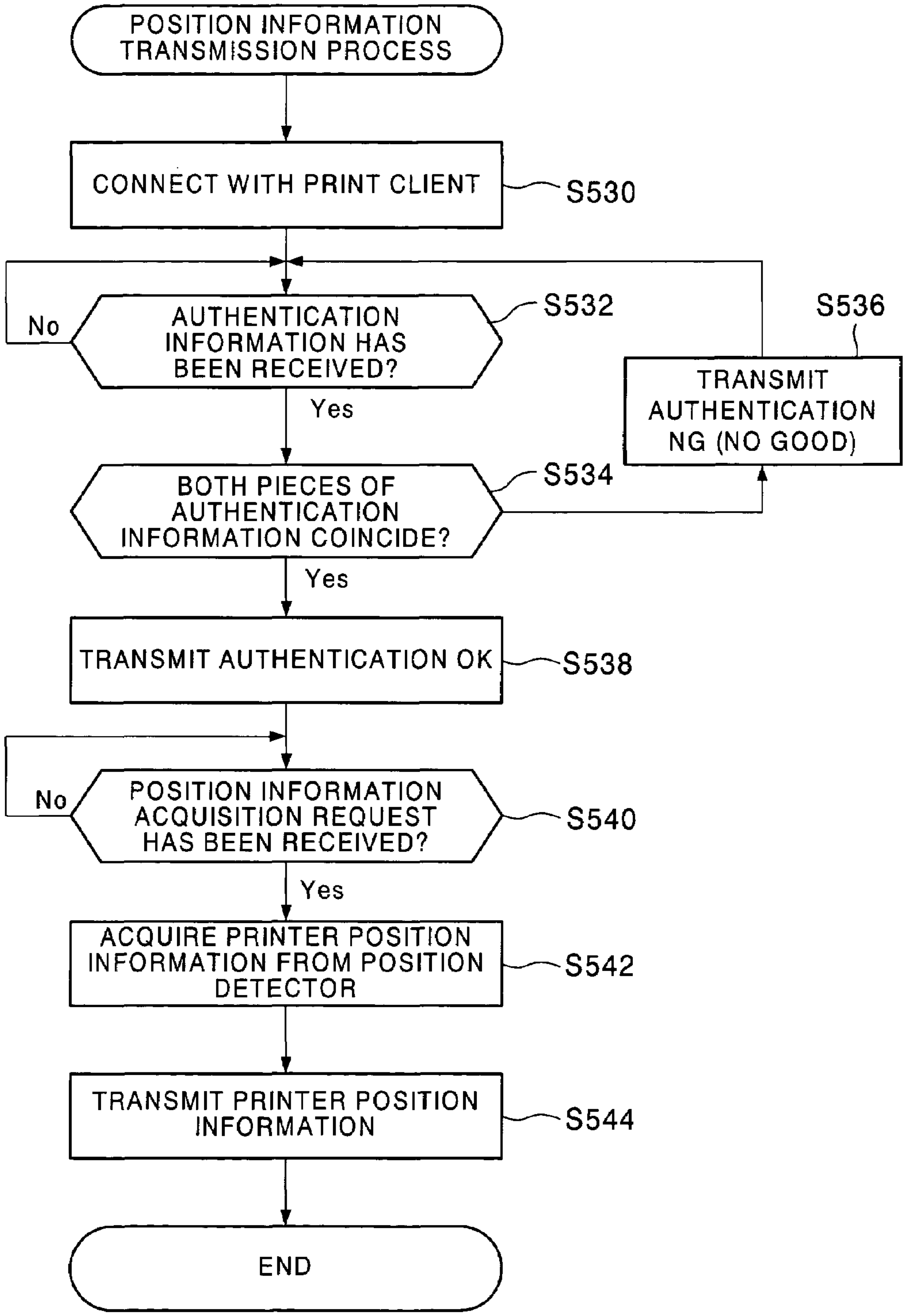
FIG. 28 is a flowchart explaining a position information transmission process executed by the printer according to the third embodiment of the present invention.

Next, a position information transmission process executed by the printer 30 or 32 corresponding to the position information request process in the print client 20 will be explained based on FIG. 28. FIG. 28 is a flowchart explaining the position information transmission process executed by the printer 30 or 32. The position information transmission process is realized by making the CPU 40 read and execute a position information transmission program stored in the ROM 44 or the hard disk 58 in the printer. Also here, similarly to the above, assuming the case where the print client 20 makes the request for the printer position information to the printer 30, the following explanation is given.

As shown in FIG. 28, first, the printer 30 establishes a connection with the print client 20 (step S530). This corresponds to the aforementioned step S510 on the print client 20 side. Subsequently, the printer 30 judges whether the authentication information has been received from the print client 20 (step S532.). When the authentication information has not been received (step S532: No), the printer 30 stands by while repeating the process in step S532.

On the other hand, when the authentication information has been received from the print client 20 (step S532: Yes), the printer 30 judges whether this authentication information coincides with authentication information which is previously registered with the printer 30 (step S534). Specifically, since the client ID and the password are transmitted as the authentication information from the print client 20 as described above, the printer 30 judges whether these client ID and password coincide with a client ID and a password which are previously registered with the printer 30.

When these two pieces of authentication information do not coincide (step S534: No), the printer 30 transmits the authentication result indicating that the authentication is not accepted to the print client 20 (step S536) and returns to the process in step S532. On the other hand, when these two piece of authentication information coincide (step S534: Yes), the printer 30 transmits the authentication result indicating that the authentication is accepted to the print client 20 (step S538).

Incidentally, the aforementioned authentication process from step S532 to step S538 can be omitted. In this case, step S512 and step S514 in the position information request process in FIG. 26 can be also omitted.

Thereafter, the printer 30 judges whether the position information acquisition request has been received from the print client 20 (step S540). When the position information acquisition request has not been received (step S540: No), the printer 30 stands by while repeating the process in step S540.

On the other hand, when the position information acquisition request has been received from the print client 20 (step S540: Yes), the printer 30 acquires printer position information on the printer 30 at this point in time from the position detector 54 (step S542).

Then, the printer 30 transmits this printer position information to the print client 20 (step S544). Thus, the position information transmission process according to this embodiment is completed.

Next, a process in which the printer acquires printer information containing a relative distance from another printer and generates an alternative printer list table will be explained. An alternative printer list generation process executed by the printer which generates the alternative printer list table is the same as that in FIG. 10 according to the aforementioned first embodiment. However, the structure of the alternative printer list table is different from that in the aforementioned first embodiment.

FIG. 29 is a diagram showing an example of the structure of an alternative printer list table TB80 according to this embodiment. As shown in FIG. 29, the alternative printer list table TB80 according to this embodiment includes printer position information D44 in place of the public key D43 of the alternative printer list table TB40 in the aforementioned first embodiment. The printer position information D44 stores printer position information on candidates for the alternative printer contained in printer information transmitted from printers as the alternative printer candidates.

Figure 30:
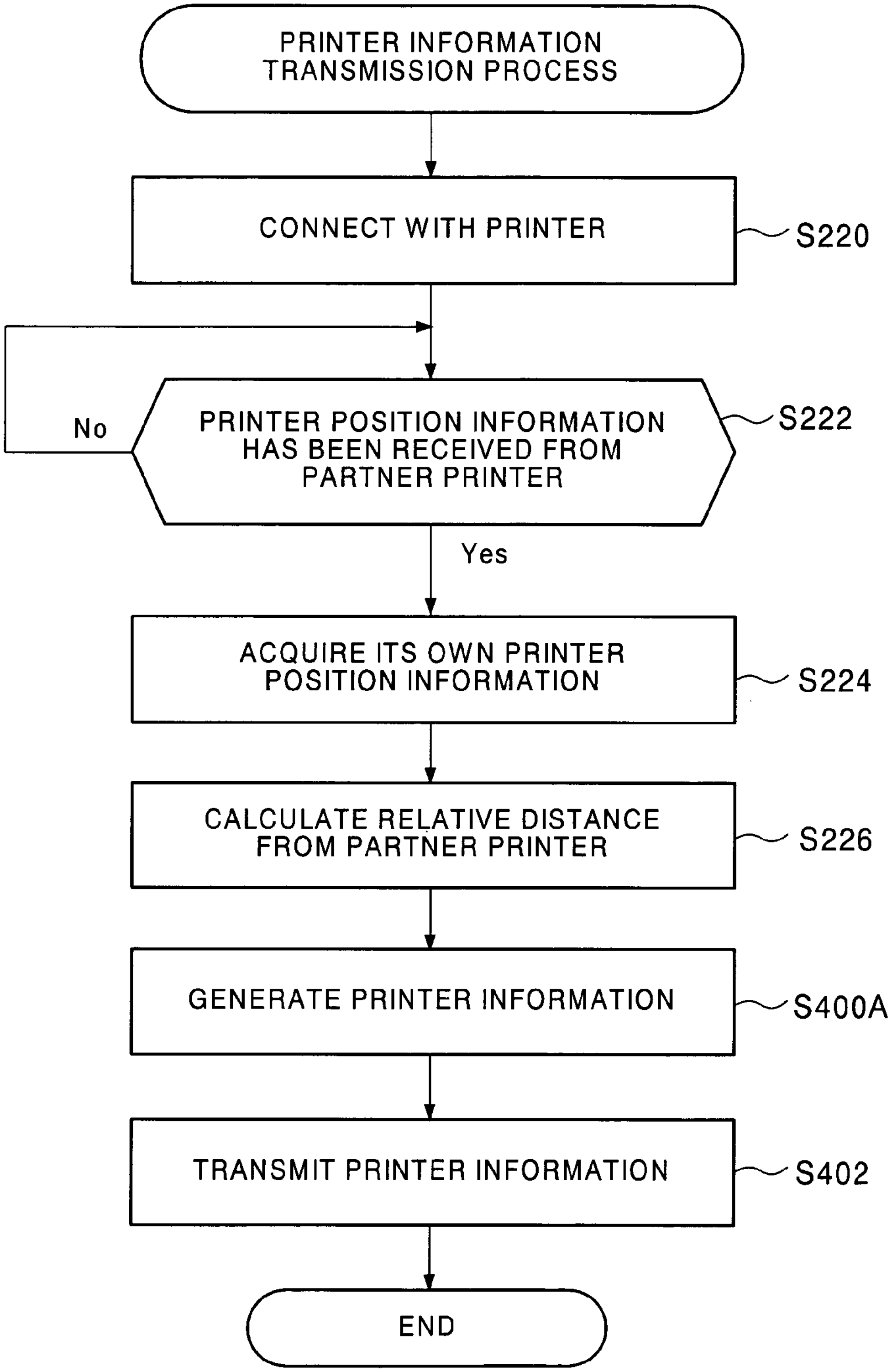
FIG. 30 is a flowchart explaining a printer information transmission process executed by the printer according to the third embodiment of the present invention.

FIG. 30 is a flowchart explaining a printer information transmission process executed by the printer which is a candidate for the alternative printer, and correspond to FIG. 19 described above. This printer information transmission process is different from that in FIG. 19 in step S400. Namely, the printer 32 incorporates the printer model information, relative distance, and printer position information in the printer information (step S400A). Except for this point, the process other is the same as that in FIG. 19.

Incidentally, in this embodiment, the relative distance between the printer which generates the alternative printer list table TB80 and the printer which is a candidate for its alternative printer is calculated by the printer as the alternative printer candidate, and transmitted to the printer which generates the alternative printer list table TB80, but the relative distance may be calculated by the printer which generates the alternative printer list table TB80. In this case, the printer which generates the alternative printer list table TB80 is required to acquire printer position information on the printer as the alternative printer candidate and calculate the relative distance between them.

Next, processes in the print client 20 and the printer 30 or 32 when the print client 20 wants to perform printing and transmits a print request to the printer 30 or 32 will be explained in detail.

Figure 31:
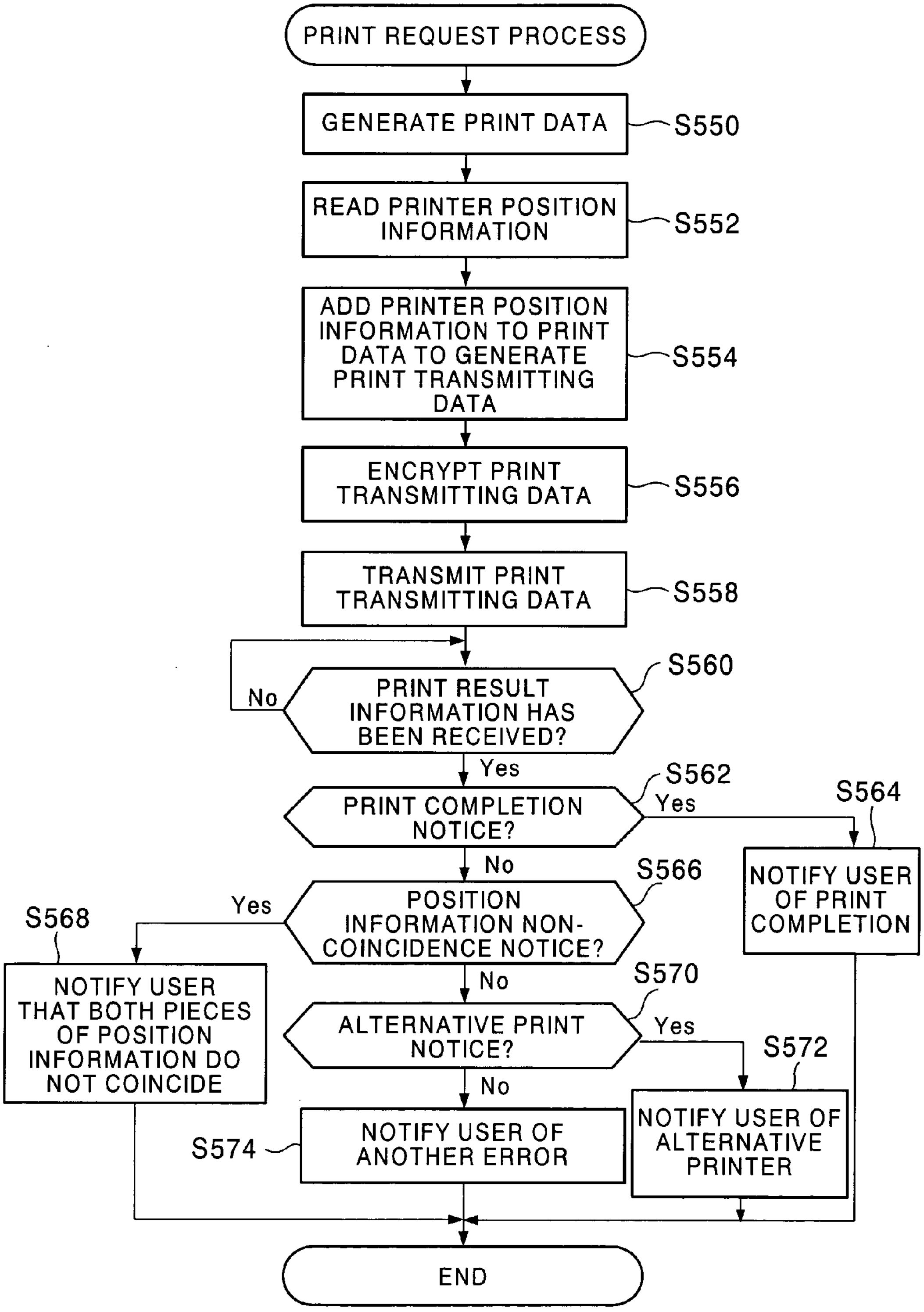
FIG. 31 is a flowchart explaining a print request process executed by the print client according to the third embodiment of the present invention.

FIG. 31 is a flowchart explaining a print request process executed by the print client 20 and corresponds to FIG. 13 described above. This print request process is realized by making the CPU64 read and execute a print request program stored in the ROM 68 or the hard disk 76 of the print client. Here, assuming a case where the print client 20 makes a print request to the printer 30, the following explanation is given.

As shown in FIG. 31, the print client 20 generates the print data D05 based on a print request from the user (step S550). The print data D05 is data necessary for an actual print operation when the printer 30 is an ordinary printer.

Then, the print client 20 reads the printer position information D50 on the printer 30 to which the print client 20 wants to present an output and which is previously registered with the alternative printer list table TB80 on the hard disk 76 (step S552). Subsequently, the print client 20 adds the read printer position information D50 to the print data D05 to generate the print transmitting data D100 (step S554).

Thereafter, the print client 20 encrypts the print transmitting data D100 (step S556). Then, the print client 20 transmits the encrypted print transmitting data D100 to the printer 30 (step S558). Specifically, the print client 20 designates the network address of the printer 30 and sends out the print transmitting data D100 to the network 10.

Subsequently, the print client 20 judges whether print result information has been received from the printer 30 (step S560). When the print result information has not been received (step S560: No), the print client 20 stands by while repeating the process in step S560. On the other hand, when the print result information has been received (step S560: Yes), the print client 20 judges whether the print result information is a print completion notice (step S562).

When this print result information is the print completion notice (step S562: Yes), it means that the printer 30 has properly completed the print operation, and hence the print client 20 notifies the user that the printer 30 has completed the print operation (step S564). On the other hand, when the received print result information is not the print completion notice (step S562: No), whether the print result information is a position information non-coincidence notice is judged (step S556).

When the print result information is the position information non-coincidence notice (step S566: Yes), the print client 20 notifies the user that since the printer position information D50 of the print transmitting data D100 does not coincide with the printer position information at the present time on the printer 30, the print operation is not executed (step S568). Thereby, it is found that the printer 30 has been moved, and the possibility that the printer 30 is stolen or the like arises.

On the other hand, when the print result information is not the position information non-coincidence notice (step S566: No), whether the print result information is an alternative print notice is judged (step S570). When the print result information is the alternative print notice (step S570: Yes), the print client 20 notifies the user that alternative printing is performed and besides notifies the user of information to specify the printer which performs alternative printing (step S572).

On the other hand, when the print result information is not the alternative print notice (step S570: No), it is thought that some other error occurs, and hence the print client 20 gives notice according to the type of the error to the user (step S574).

The print request process in the print client 20 is completed by the notice in step S564, step S568, step S572, or step S574.

Figure 32:
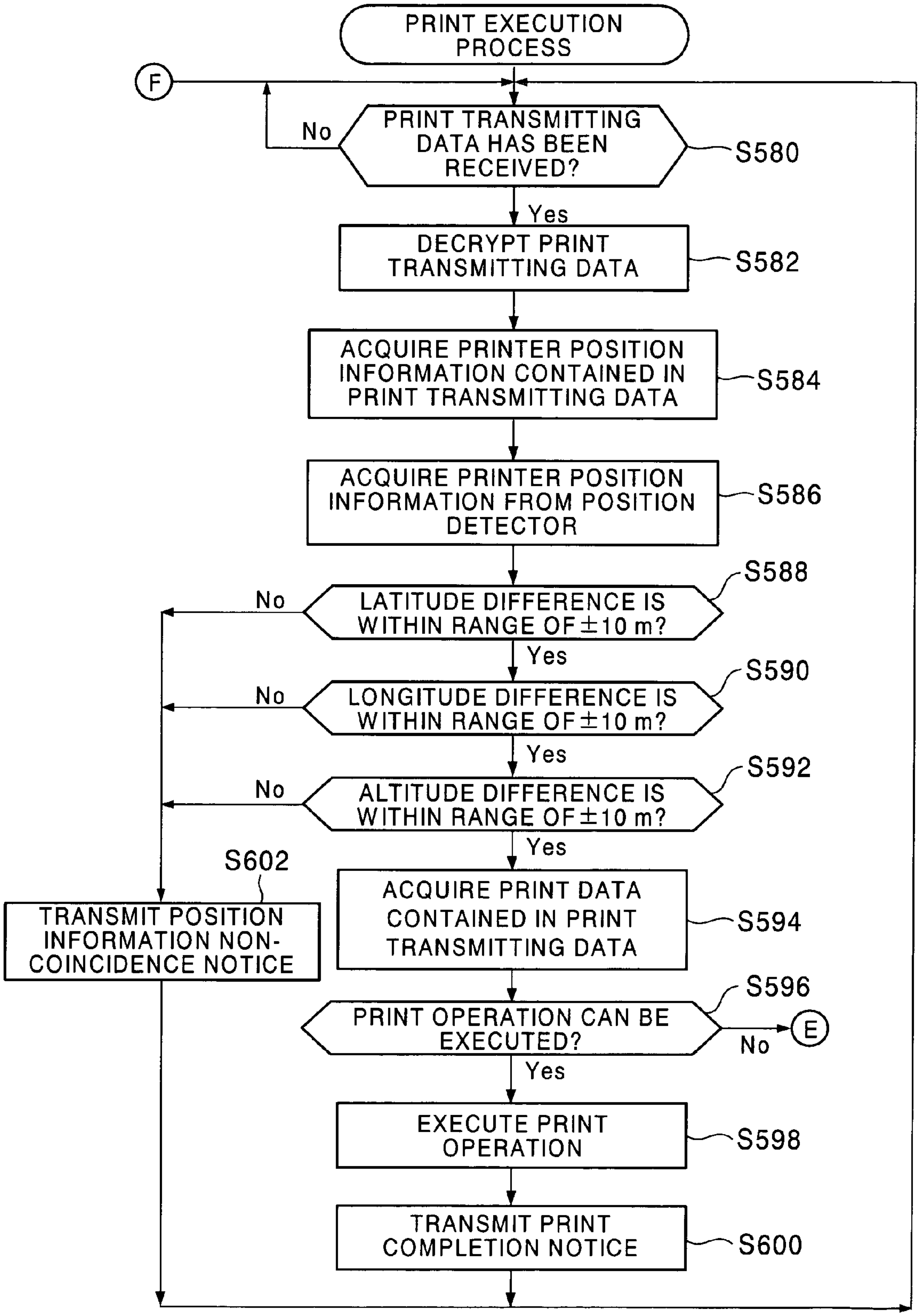
FIG. 32 is a flowchart explaining a print execution process executed by the printer according to the third embodiment of the present invention (First process)
Figure 33:
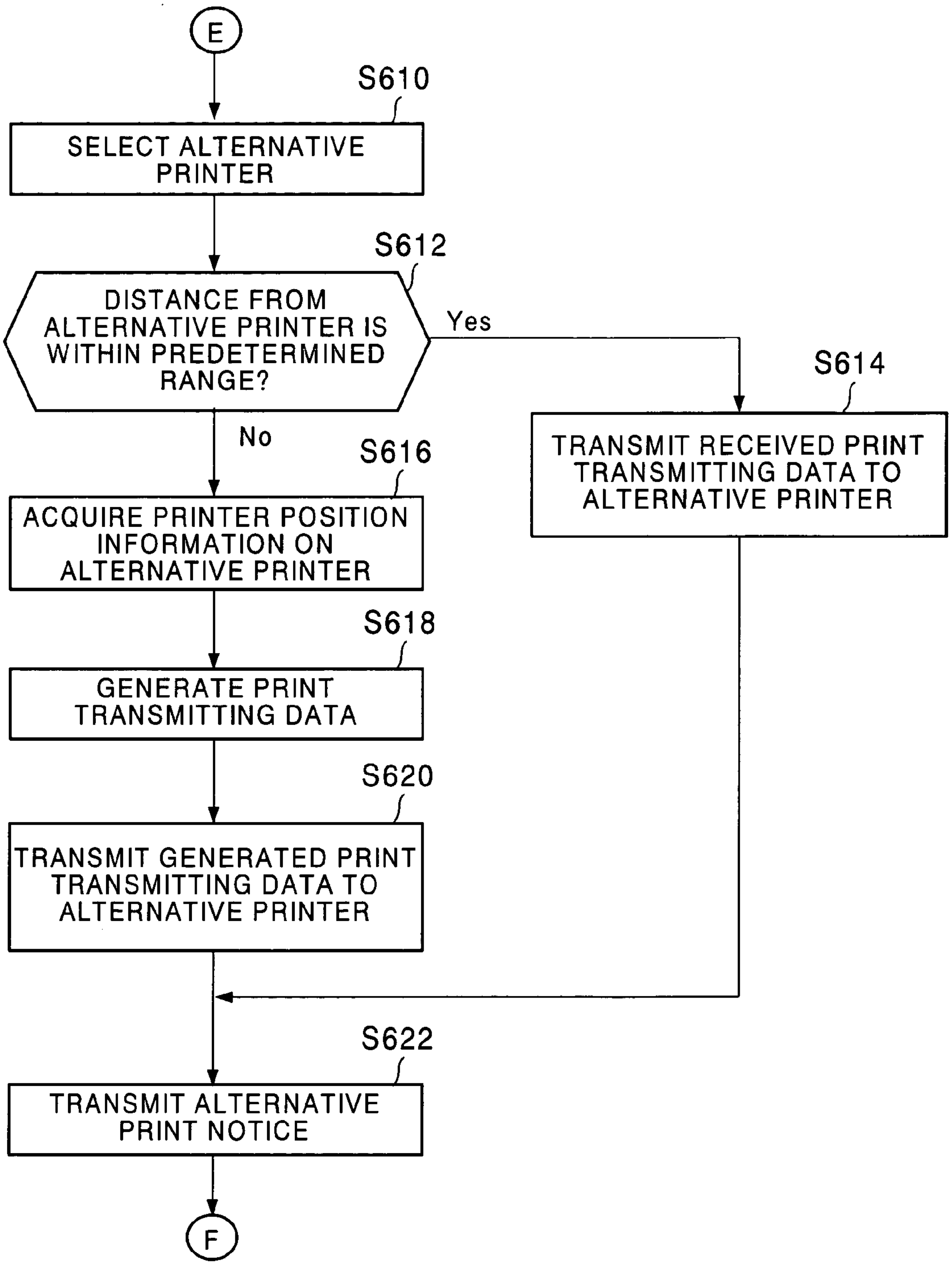
FIG. 33 is a flowchart explaining the print execution process executed by the printer according to the third embodiment of the present invention (Second process)

Next, a print execution process executed by the printer 30 or 32 corresponding to the print request process in the print client 20 will be explained based on FIG. 32 and FIG. 33. FIG. 32 and FIG. 33 are flowcharts explaining the print execution process executed by the printer 30 or 32. This print execution process is realized by making the CPU 40 read and execute a print execution program stored in the ROM 44 of the printer 30 or 32. Also here, similarly to the above, assuming the case where the print client 20 makes the print request to the printer 30, the following explanation is given.

As shown in FIG. 32, the printer 30 judges whether the print transmitting data D100 has been received from the network 10 (step S580). When no print transmitting data D100 has been received (step S580: No), the printer 30 stands by while repeating the process in step S580.

On the other hand, when the print transmitting data D100 has been received (step S580: Yes), the printer 30 decrypts the print transmitting data D100 (step S582). Subsequently, the printer 30 acquires the printer position information D50 contained in the decrypted print transmitting data D100 (step S584).

Then, the printer 30 acquires printer position information on the printer 30 at this point in time from the position detector 54 (step S586). The reason why the printer position information is acquired from the position detector 54 each time as described above is that, when the printer 30 is moved to a different place, there is a possibility that the printer 30 is installed in a place where the user does not intend to perform printing, and in order that in such a case, the print operation cannot be executed by the printer 30.

Then, the printer 30 judges a difference between the latitude of the printer position information D50 contained in the received print transmitting data D100 and the latitude of the printer position information acquired at this point in time is within a predetermined range (for example, ±10 m) (step S588). When the difference between both the latitudes is not within the predetermined range (step S588: No), it means that these two pieces of printer position information do not coincide, and hence the printer 30 transmits the position information non-coincidence notice to the print client 20 (step S602).

On the other hand, when the difference between both the latitudes is within the predetermined range (step S588: Yes), the printer 30 judges whether a difference between the longitude of the printer position information D50 contained in the received print transmitting data D100 and the longitude of the printer position information acquired at this point in time is within a predetermined range (for example, ±10 m) (step S590). When the difference between both the longitudes is not within the predetermined range (step S590: No), it means that these two pieces of printer position information do not coincide, and hence the printer 30 transmits the position information non-coincidence notice to the print client 20 (step S602).

On the other hand, when the difference between both the longitudes is within the predetermined range (step S590: Yes), the printer 30 judges whether a difference between the altitude of the printer position information D50 contained in the received print transmitting data D100 and the altitude of the printer position information acquired at this point in time is within a predetermined range (for example, ±10 m) (step S592). When the difference between both the altitudes is not within the predetermined range (step S592: No), it means that these two pieces of printer position information do not coincide, and hence the printer 30 transmits the printer position non-coincidence notice to the print client 20 (step S602).

On the other hand, when the difference between both the altitudes is within the predetermined range (step S592: Yes), it means that these two pieces of printer position information coincide, and hence the printer 30 acquires the print data D05 contained in the print transmitting data D100 (step S594). Namely, in this embodiment, when the difference between the printer position information D50 contained in the print transmitting data D100 and the printer position information acquired in step S586 is within the predetermined range, it is judged that the print transmitting data D100 matches the printer position information at this point in time.

Then, the printer 30 judges whether the printer 30 itself is in the state capable of executing the print operation (step S596). For example, when a paper jam or a paper empty error occurs in the printer 30, it is judged that the printer 30 is not in the state capable of executing the print operation.

When the printer 30 is in the state capable of executing the print operation (step S596: Yes), the printer 30 executes the print operation by driving the print engine 52 based on the acquired print data D05 (step S598). Specifically, the printer 30 performs a language interpretation of the print data D05 and generates print request data fitting the print engine 52. Then, by transmitting this print request data to the print engine 52, print sheets and so on are printed by the print engine 52.

At a point in time when the print operation has been properly completed, the printer 30 transmits the print completion notice that the print operation has been properly completed as the print result information to the print client 20 (step S600). Then, the printer 30 returns to the aforementioned process in step S580.

Contrary to this, when it is judged in the aforementioned step S596 that the printer 30 is not in the state capable of executing the print operation (step S596: No), as shown in FIG. 33, the printer 30 selects an alternative printer to perform alternative printing (step S610). Specifically, the printer 30 searches the alternative printer list table TB80 and selects a printer at the shortest relative distance D42 from the printer 30 as the alternative printer. It is assumed here that the printer 32 is selected as the alternative printer.

Then, the printer 30 judges whether a distance between the printer 30 and the printer selected as the alternative printer is within a predetermined range (step S612). In this embodiment, the print operation is executed if differences in latitude, longitude, and altitude are each within a range of ±10 m as shown in step S588 to step S592, and correspondingly it is judged whether the relative distances ΔX, ΔY, and ΔZ of the printer selected as the alternative printer are each within the range of ±10 m. This is because it is thought that when ΔX, ΔY, and ΔZ of the relative distance D42 are each within the range of ±10 m, even if the print transmitting data D100 received from the print client 20 is transferred as it is to the printer 32, a print operation is executed by the printer 32.

Accordingly, when the distance between the printer 30 and the printer selected as the alternative printer is within the predetermined range (step S612: Yes), the printer 30 transmits the print transmitting data D100 received from the print client 20 as it is to another printer 32 (step S614).

On the other hand, when the distance between the printer 30 and the printer selected as the alternative printer is not within the predetermined range (step S612: No), the printer 30 acquires printer position information on the alternative printer (step S616). Specifically, the printer 30 searches the alternative the printer list table TB80 and acquires the printer position information on the printer 32.

Then, the printer 30 generates the print transmitting data D150 by joining the print position information acquired in step S616 to the print data D05 (step S618). Subsequently, the printer 30 transmits the generated print transmitting data D150 to the printer 32 as the alternative printer via the network 10 (step S620).

After these step S614 and step S620, the printer 30 transmits the alternative print notice as the print result information to the print client 20 (step S622). In this embodiment, this alternative print notice contains information to specify the printer to perform alternative printing. Then, the printer 30 returns to the aforementioned step S580 in FIG. 32.

Incidentally, also in the printer 32 which has received the print transmitting data D100 or the print transmitting data D150 from the printer 30, this print execution process is executed. Hence, when a difference between the printer position information D50 contained in the print transmitting data D100 or D150 and the printer position information on the printer 32 is within the predetermined range, a print operation is executed by the printer 32, and when the difference is not within the predetermined range, the print operation is not executed by the printer 32.

As described above, the security of the print data D05 and the printer 30 or 32 can be secured also by the print system according to this embodiment. Moreover, even if, in relation to the detection accuracy of the position detector 54, a discrepancy occurs between the printer position information transmitted in the position information transmission process and the printer position information acquired in the print execution process, it is possible to absorb the discrepancy and print the print transmitting data D100.

Moreover, according to the printer 30 or 32 of this embodiment, when the printer is not in the state capable of executing the print operation even if the printer position information of the print transmitting data D100 matches the printer position at that point in time, the printer 30 or 32 makes a request for alternative printing to another printer. Hence, for example, even if the user cannot perform printing with the printer 30, the user can acquire a print result from the printer 32.

Besides, the printer 30 or 32 knows relative distances between the printer 30 or 32 and its surrounding printers by communicating with its surrounding printers for itself , and generates the alternative printer list table TB80. Hence, when the printer 30 or 32 selects the alternative printer, another printer which is in the nearest position to the printer which has received the print transmitting data D100 first can be selected, whereby the print result of alternative printing can be acquired from the printer in the nearest position to the printer which the user originally intends to use.

Additionally, when the relative distance between the printer which has received the print transmitting data D100 and the alternative printer is within the predetermined range, the printer which has received the print transmitting data D100 transfers the print transmitting data D100 as it is to the alternative printer. On the other hand, when the relative distance between the printer which has received the print transmitting data D100 and the alternative printer is not within the predetermined range, the printer which has received the print transmitting data D100 generates the print transmitting data D150 by joining the printer position information on the alternative printer 32 to the print data D05 contained in the print transmitting data D100, and transmits this print transmitting data D150 to the alternative printer 32. Therefore, when the relative distance is within the predetermined range, the process for generating the print transmitting data D150 can be omitted.

Fourth Embodiment

In the fourth embodiment of the present invention, a modification is made to the aforementioned third embodiment, and when the printer 30 which has received print transmitting data from the print client 20 is in a state incapable of executing a print operation, the printer 30 notifies the print client 20 of this state, and the print transmitting data is transmitted again from the print client 20 to the alternative printer. Further details will be given below.

It should be mentioned that the hardware configurations of the printers 30 and 32 are the same as that in FIG. 2 described above, and the hardware configuration of the aforementioned print client 20 is the same as that in FIG. 3. In this embodiment, however, device-specific information on the printer 30 and device-specific information on the printer 32 need not be necessarily the same. Moreover, in this embodiment, the flow of print data when alternative printing is performed is different from that in the aforementioned third embodiment.

Figure 34:
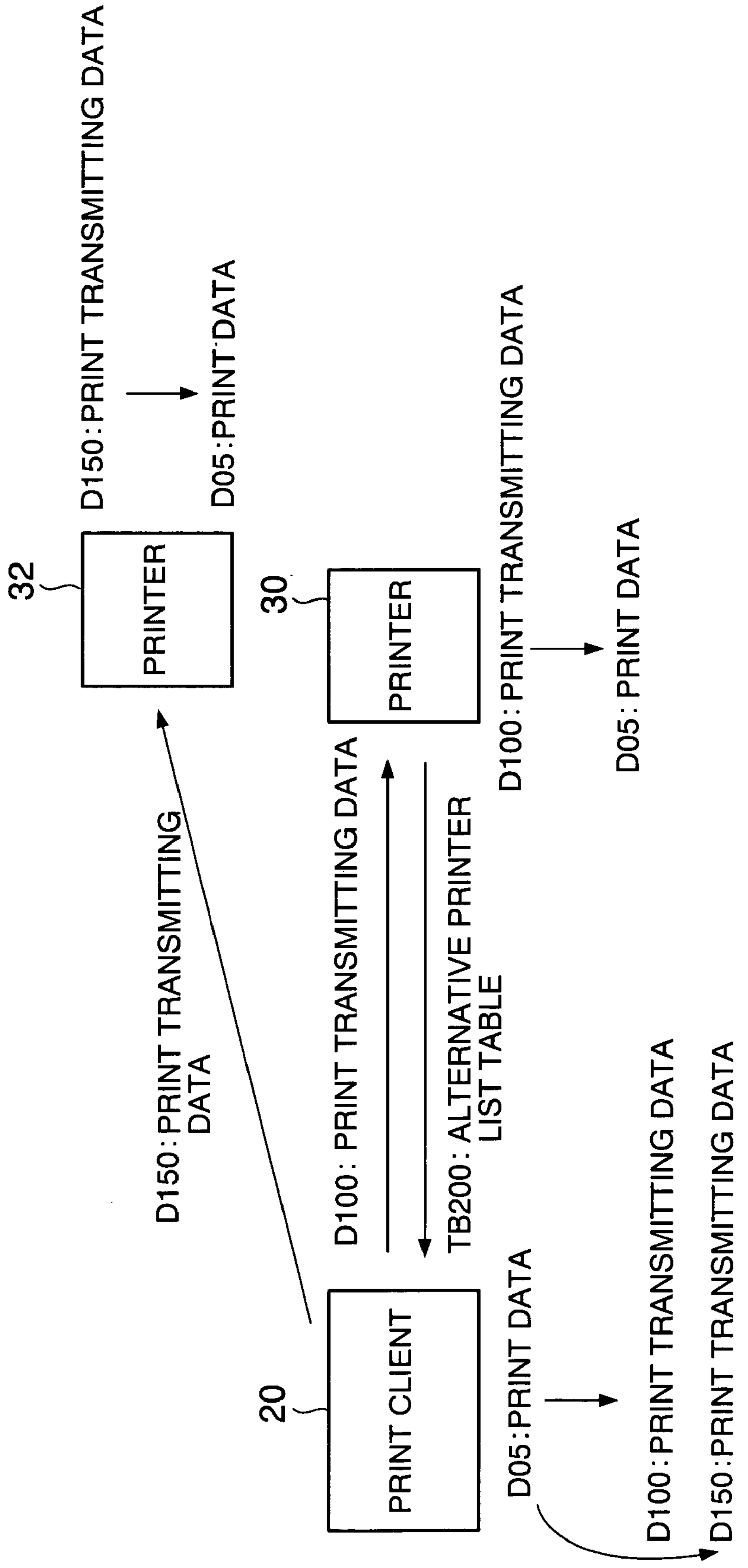
FIG. 34 is a diagram explaining the flow of print data and print transmitting data when alternative printing is performed in a fourth embodiment of the present invention.

FIG. 34 is a block diagram explaining the contents of a process when alternative printing is performed by the printer 32 in a case where the printer 30 which has received the print transmitting data is not in a state capable of executing a print operation in a print system according to this embodiment.

First, the user of the print client 20 generates data to be printed and designates the printer 30 for the print client 20 to execute the print operation. The print client 20 generates the print transmitting data D100 by joining the printer position information D50 on the printer 30 to the print data D05. Subsequently, the print client 20 transmits the generated print transmitting data D100 to the printer 30 via the network 10. The printer 30 which has received the print transmitting data D100 temporarily stores the received print transmitting data D100 in the RAM 42 as shown in FIG. 2. Then, the printer 30 acquires the printer position information D50 from the print transmitting data D100 and judges whether a difference between the printer position information D50 and printer position information on the printer 30 at this point in time is within a predetermined range. When the difference between these two pieces of printer position information is within the predetermined range, the printer 30 transmits the print data D05 contained in the print transmitting data D100 to the print engine 52 to execute the print operation, and when the difference is not within the predetermined range, the printer 30 does not execute the print operation.

It is assumed here that the printer 30 cannot execute the print operation for some reason. Then, the printer 30 transmits an alternative print notice and an alternative printer list table held by this printer 30 to the print client 20. Based on this alternative printer list table and the printer position information table TB100, the print client 20 which has received the alternative printer list table selects a printer nearest to the printer 30 out of printers on which printer position information is acquired by the print client 20 as the alternative printer. It is assumed here that the printer 32 is selected as the alternative printer.

Then, the print client 20 generates the print transmitting data D150 by joining the printer position information D50 on the alternative printer 32 to the print data D05. Subsequently, the print client 20 transmits the print transmitting data D150 to the alternative printer 32 via the network 10.

The alternative printer 32 which has received the print transmitting data D150 acquires the printer position information D50 contained in the print transmitting data D150 and judges whether a difference between the printer position information D50 and printer position information acquired by the printer 32 at this point in time is within the predetermined range. When the difference between these two pieces of printer position information is within the predetermined range, the printer 32 transmits the print data D05 contained in the print transmitting data D150 to the print engine 52 to execute the print operation, and when the difference is not within the predetermined range, the printer 32 does not execute the print operation.

Next, as for processes in the print client 20 and the printer 30 or 32 when the print client 20 acquires printer position information on the printer, these processes are the same as those in the aforementioned third embodiment. Moreover, a process in the printer 30 or 32 for generating the alternative printer list table is basically the same as that in the aforementioned first embodiment, but as compared with the alternative printer list table TB80, the alternative printer list table according to this embodiment is different in that the printer position information D44 is not contained.

FIG. 35 is a diagram showing an example of the structure of an alternative printer list table TB200 according to this embodiment. Also in this embodiment, the alternative printer list table T200 is stored on the hard disk 58 of the printer 30 or 32. As shown in FIG. 35, the alternative printer list table TB200 according to this embodiment contains the network address D40, the printer model information D41, and the relative distance D42 as data items, but does not contain the printer position information. This is in order to ensure the security of printer position information since the alternative printer list table TB200 is transmitted to the print client 20 when alternative printing is performed.

Therefore, in a printer information transmission process according to this embodiment, the printer information is generated by incorporating the printer model information and the relative distance into the printer information in step S400A in FIG. 30 in the aforementioned third embodiment, but the printer position information is not contained. In other respects, this printer information transmission process is the same as that in the aforementioned first embodiment.

Figure 36:
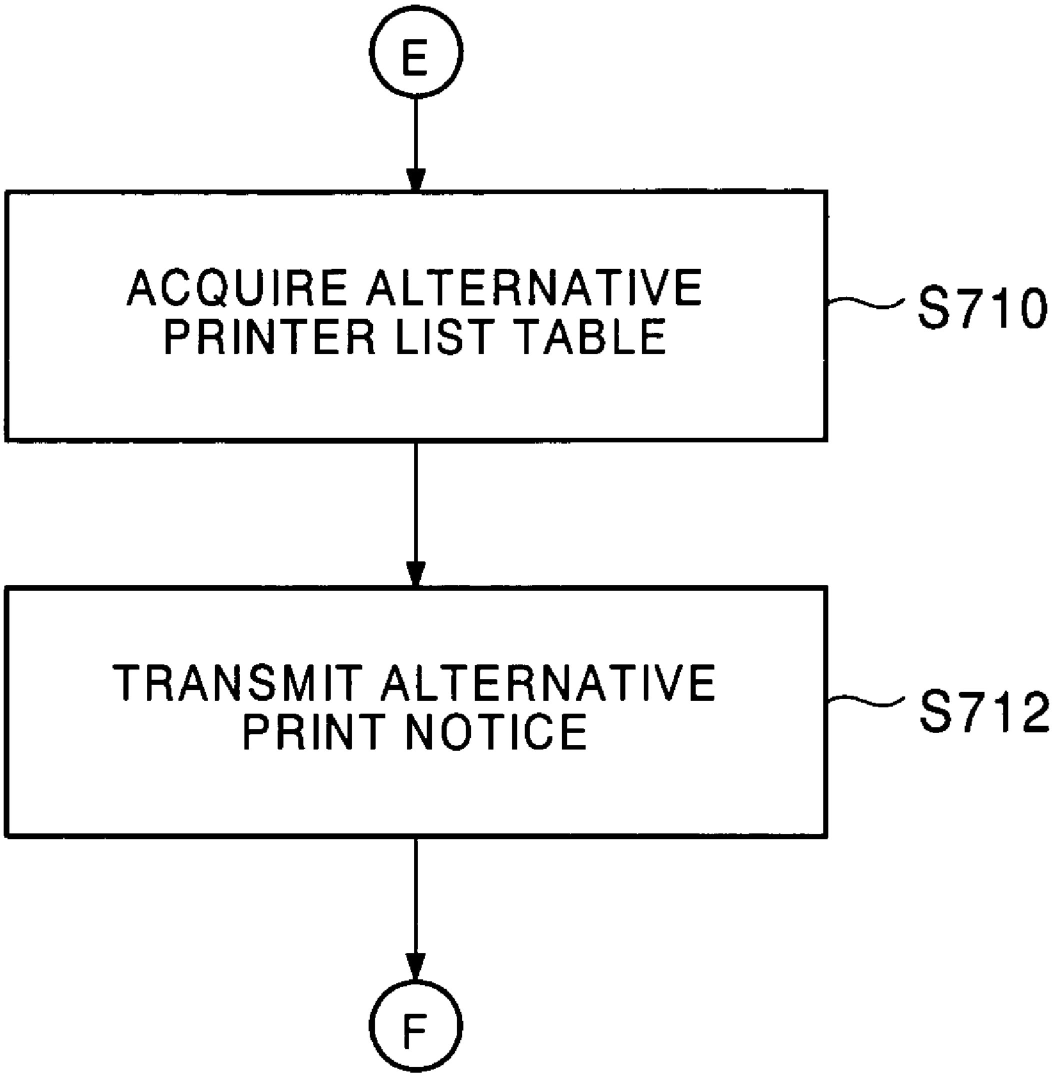
FIG. 36 is a flowchart explaining a print execution process executed by the printer according to the fourth embodiment of the present invention.

Next, a print execution process according to this embodiment is different from that in the third embodiment in a process when it is judged that the printer 30 is not in the state capable of executing the print operation. FIG. 36 is a flowchart explaining the print execution process when it is judged that the printer 30 is not in the state capable of executing the print operation and corresponds to FIG. 33 described above. As shown in FIG. 36, when it is judged in step S596 in FIG. 32 that the printer 30 is not in a state capable of printing the print data D05 (step S596: No), the printer 30 acquires the alternative printer list table TB200 stored on the hard disk 58 (step S710).

Then, the printer 30 transmits the alternative printer list table TB200 to the print client 20 which has transmitted the print transmitting data D100 (step S712). Thereafter, the printer 30 returns to step S580 in FIG. 32. Except for this point, this print execution process is the same as that in the aforementioned third embodiment.

Figure 37:
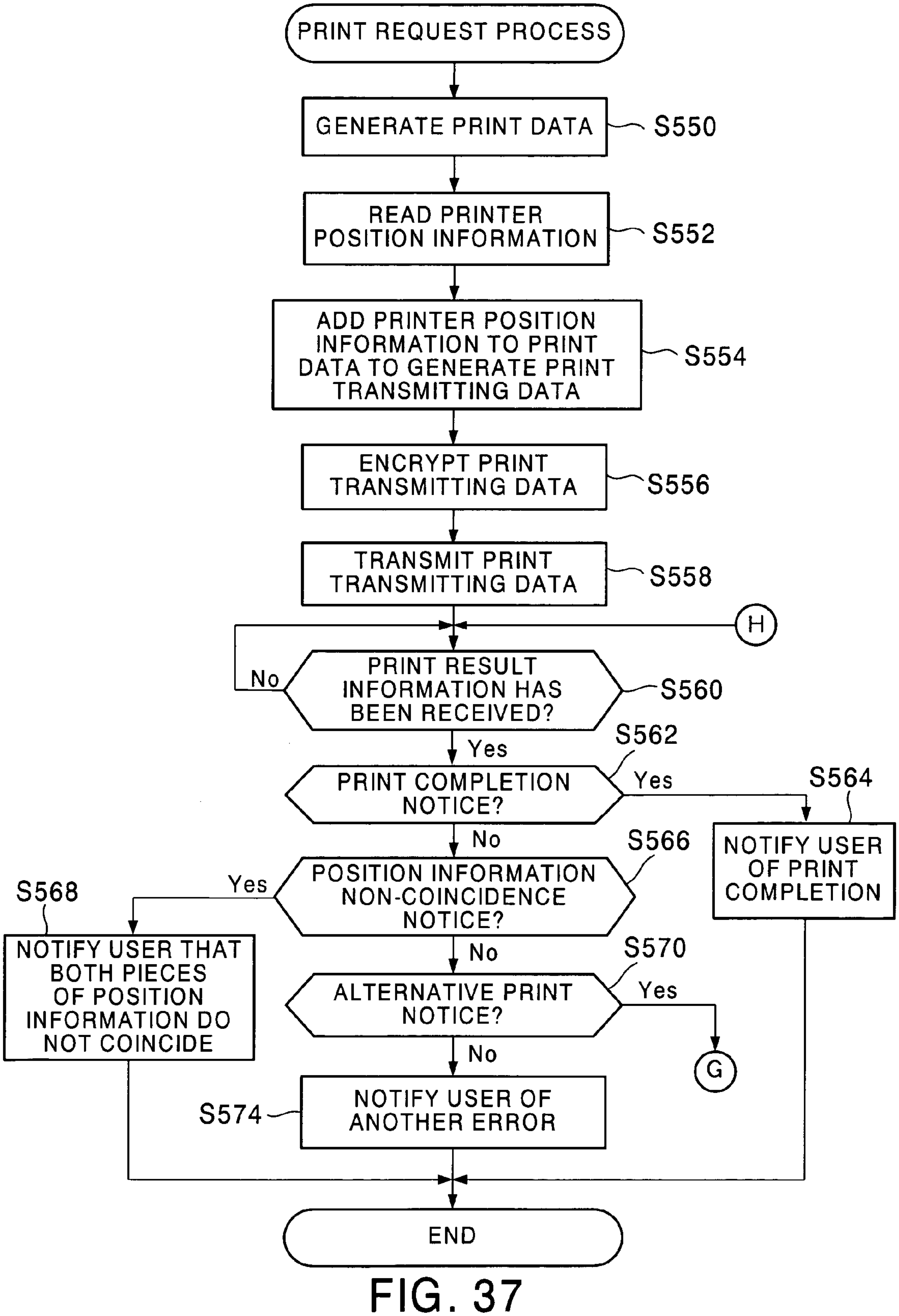
FIG. 37 is a flowchart explaining a print request process executed by a print client according to the fourth embodiment of the present invention (First process)
Figure 38:
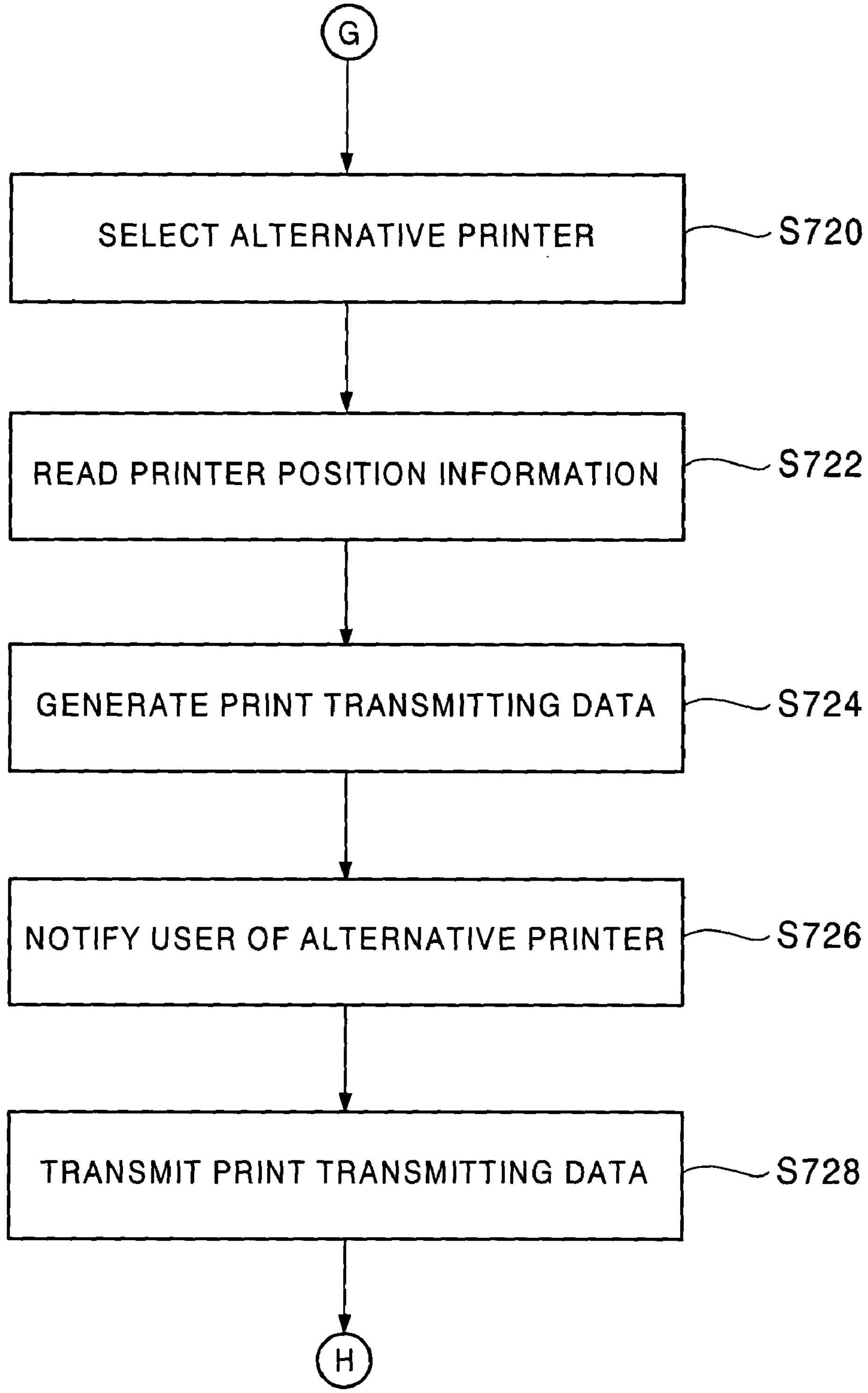
FIG. 38 is a flowchart explaining the print request process executed by the print client according to the fourth embodiment of the present invention (Second process)

Next, a print request process according to this embodiment will be explained based on FIG. 37 and FIG. 38. FIG. 37 and FIG. 38 are flowcharts explaining the print request process according to this embodiment and correspond to FIG. 31 described above. As shown in FIG. 37, the process when, in step S570, the print client 20 judges that print result information received from the printer 30 is an alternative print notice is different from that in the aforementioned third embodiment.

Namely, when the received print result information is the alternative print notice (step S570: Yes), as shown in FIG. 38, the print client 20 selects an alternative printer (step S720). In this embodiment, the print client 20 selects a printer which is in the nearest position to the printer 30 out of printers on which printer position information are held by the print client 20 as the alternative printer. Specifically, the print client 20 selects a printer with the shortest relative distance D42 in the received alternative printer list table TB200 out of printers registered with the printer position information table TB100. The linear distance L is calculated from the relative distance D42 with the aforementioned equation (1).

Then, the print client 20 reads printer position information on the selected alternative printer from the printer position information table TB100 (step S722). It is assumed here that the printer 32 is selected as the alternative printer and that printer position information on the printer 32 is read. Subsequently, the print client 20 generates the print transmitting data D150 by joining the printer position information on the printer 32 to the print data D05 (step S724).

Thereafter, the print client 20 notifies the user of information which specifies the alternative printer (step S726). Subsequently, the print client 20 transmits the print transmitting data D150 generated in step S724 to the printer 32 via the network 10 (step S728). Thus, the print request process according to this embodiment is completed.

As described above, the security of the print data D05 and the printer 30 or 32 can be secured also by the print system according to this embodiment. Hence, even if, in relation to the detection accuracy of the position detector 54, a discrepancy occurs between the printer position information transmitted to the print client 20 in the position information transmission process and the printer position information acquired in the print execution process, it is possible to absorb the discrepancy and print the print transmitting data D100.

Moreover, according to the printer 30 or 32 of this embodiment, when the printer is not in a state capable of executing a print operation even if the printer position information of the print transmitting data D100 matches the printer position at that point in time, the printer 30 or 32 notifies the print client 20 of the alternative printer list table TB200 which is a list of candidates for a printer capable of performing alternative printing. Hence, the print client 20 can select an alternative printer from this alternative printer list table 200.

Further, the alternative printer list table TB200 contains the relative distance 42 between the printer to which the print transmitting data D100 has been transmitted and each of its surrounding printers, whereby the print client 20 can select the alternative printer in the nearest position to the printer to which the print transmitting data D100 has been transmitted.

Furthermore, the alternative printer list table TB200 in this embodiment does not contain printer position information on printers, and hence alternative printing can be performed by only a printer on which printer position information can be actually acquired rightfully by the print client 20, which prevents users who have no authority from performing printing with the alternative printer.

Figure 39:
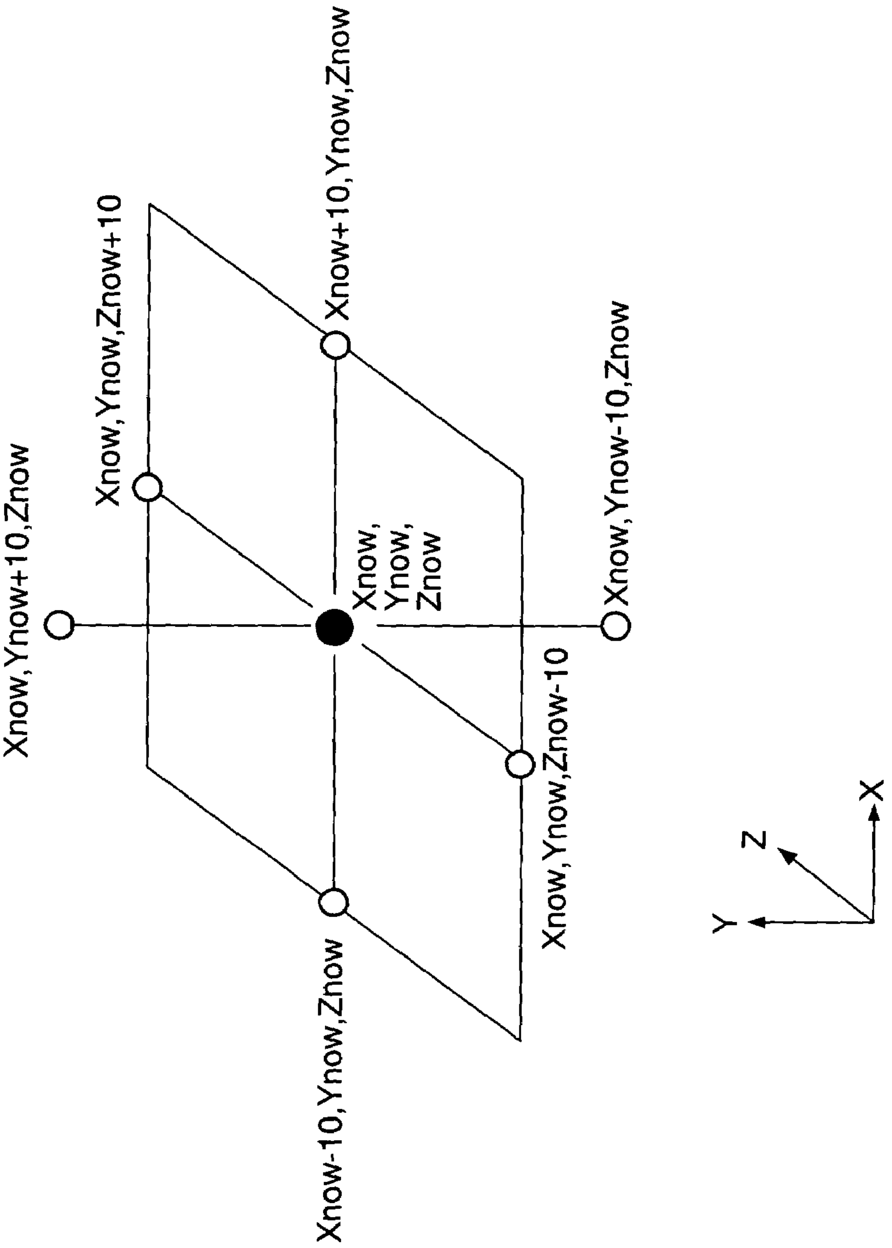
FIG. 39 is a diagram explaining a modification of the first and second embodiments of the present invention.

It should be mentioned that the present invention is not limited to the aforementioned embodiments, and various changes may be made therein. For example, in the aforementioned first and second embodiments, the printer position information Xnow, Ynow, Znow as the center and its surrounding 26 pieces of position information are selected as candidates for generating passphrases, but the manner of selection and number are not limited to the above. For example, as shown in FIG. 39, it is also possible to select the printer position information Xnow, Ynow, Znow as the center and its surrounding 6 pieces of position information as the candidates for generating passphrases.

Moreover, in the aforementioned first and second embodiments, position information contained within a range of ±10 m which corresponds to one minimum measurement unit of the position detector 54 is selected as the candidates for generating passphrases, but it is also possible to select the printer position information Xnow, Ynow, Znow as the center and position information contained within a range corresponding to N minimum measurement units (N is a natural number) as the candidates for generating passphrases.

Further, in the aforementioned respective embodiments, the printer 30 which generates the alternative printer list table transmits the printer position information on the printer 30 to the printer 32 which is a candidate for the alternative printer and the relative distance is calculated by the printer 32, but the relative distance may be calculated by the printer 30. Namely, the printer 30 which generates the alternative printer list table may acquire the printer position information on the printer 32 from the printer 32 via the network 10 and calculate the relative distance.

Furthermore, in the aforementioned embodiments, the relative distances between the printer and other printers in the alternative printer list table are used to select the alternative printer, but may be used for other purposes.

Additionally, the aforementioned embodiments are explained with the case where a print medium for the printer 30 or 32 is a print sheet as an example, but the print medium is not limited to this, and the present invention can be applied to other print media such as an OHP sheet and the like.

Besides, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the print client 20 and/or the printer 30 or 32 read the record medium on which this program is recorded and execute this program.

Moreover, the print client 20 and/or the printer 30 or 32 sometimes has other programs such as an operating system, other application programs, and the like. In this case, by using these other programs in the print client 20 and/or the printer 30 or 32, a command, which calls a program to realize a process equal to that in the aforesaid embodiments out of programs in the print client 20 and/or the printer 30 or 32, may be recorded on the record medium.

Further, such a program can be distributed not in the form of the record medium but in the form of a carrier wave via a network. The program transmitted in the form of the carrier wave over the network is incorporated in the client 20 and/or the printer 30 or 32, and the aforesaid embodiments can be realized by executing this program.

Furthermore, when being recorded on the record medium or transmitted as the carrier wave over the network, the program is sometimes encrypted or compressed. In this case, the print client 20 and/or the printer 30 or 32 which has read the program from the record medium or the carrier wave needs to execute the program after decrypting or expanding it.

What is claimed is:

1. A printer, comprising:

a printer position information acquisition which acquires printer position information to specify a place where the printer is installed;

a printer position information transmitter which transmits the printer position information acquired by said printer position information acquisition to another printer and causes said another printer to calculate a relative distance between the printer and said another printer;

a relative distance receiver which receives the relative distance from said another printer; and a relative distance storage which stores the relative distance received by said relative distance receiver.

2. The printer according to claim 1, further comprising:

a print transmitting data receiver which receives print transmitting data transmitted by a print client; and an alternative print requester which selects another printer with the shortest relative distance as an alternative printer and requests alternative printing of the print transmitting data, when the printer is not in a state capable of executing a print operation based on the print transmitting data.

3. The printer according to claim 2, further comprising a relative distance judgment section which judges whether the relative distance between the alternative printer and the printer is within a predetermined range.

4. The printer according to claim 3, wherein said alternative print requester comprises a transferor which transfers the received print transmitting data to the alternative printer when said relative distance judgment section judges that the relative distance between the alternative printer and the printer is within the predetermined range.

5. The printer according to claim 4, wherein said alternative print requester further comprises an alternative transmitter which generates alternative print transmitting data fitting the alternative printer based on the received print transmitting data and transmits the alternative print transmitting data to the alternative printer when said relative distance judgment section judges that the relative distance between the alternative printer and the printer is not within the predetermined range.

6. The printer according to claim 5, wherein said alternative transmitter acquires print data by decrypting the received print transmitting data and generates the alternative print transmitting data by encrypting the acquired print data again so that the print data is decrypted by the alternative printer.

7. The printer according to claim 6, further comprising a selection print executor which tries to execute the print operation based on the print transmitting data when the print transmitting data is decrypted with any private key generated using a passphrase containing at least the printer position information acquired by said printer position information acquisition or its surrounding position information and which does not execute the print operation based on the print transmitting data when the print transmitting data is not decrypted.

8. The printer according to claim 7, wherein, if the printer is not in the state capable of executing the print operation based on the print transmitting data when the selection print executor tries to execute the print operation based on the print transmitting data, said alternative transmitter encrypts print data acquired by decrypting the print transmitting data with a public key of the alternative printer to generate the alternative print transmitting data.

9. The printer according to claim 5, further comprising a selection print executor which judges whether a difference between printer position information contained in the print transmitting data and the printer position information acquired by said printer position information acquisition is within a predetermined range, tries to execute the print operation based on the print transmitting data when the difference between these two pieces of information is within the predetermined range, and does not execute the print operation based on the print transmitting data when the difference between these two pieces of information is not within the predetermined range.

10. The printer according to claim 9, wherein, if the printer is not in the state capable of executing the print operation based on the print transmitting data when said selection print executor tries to execute the print operation based on the print transmitting data, said alternative transmitter acquires print data from the received print transmitting data and generates the alternative print transmitting data by joining printer position information on the alternative printer to the acquired print data.

11. The printer according to claim 1, further comprising:

a print transmitting data receiver which receives print transmitting data transmitted by a print client; and a list transmitter which transmits an alternative printer list in which the relative distance of said another printer is listed on a printer-by-printer basis to a print client which has transmitted the print transmitting data, when the printer is not in a state capable of executing a print operation based on the print transmitting data.

12. The printer according to claim 11, further comprising a sorter which sorts the alternative printer list in order of the relative distance from shortest to longest.

13. The printer according to claim 12, wherein the alterative printer list contains a network address of said another printer as information to specify said another printer.

14. A printer, comprising:

a printer position information acquisition which acquires printer position information to specify a place where the printer is installed;

a printer position information receiver which receives printer position information on another printer from said another printer;

a relative distance calculator which calculates a relative distance between the printer and said another printer based on the printer position information acquired by the printer position information acquisition and the printer position information received by the printer position information receiver; and a relative distance storage which stores the relative distance calculated by said relative distance calculator.

15. The printer according to claim 14, further comprising:

a print transmitting data receiver which receives print transmitting data transmitted by a print client; and an alternative print requester which selects another printer with the shortest relative distance as an alternative printer and requests alternative printing of the print transmitting data, when the printer is not in a state capable of executing a print operation based on the print transmitting data.

16. The printer according to claim 15, further comprising a relative distance judgment section which judges whether the relative distance between the alternative printer and the printer is within a predetermined range.

17. The printer according to claim 16, wherein said alternative print requester comprises a transferor which transfers the received print transmitting data to the alternative printer when said relative distance judgment section judges that the relative distance between the alternative printer and the printer is within the predetermined range.

18. The printer according to claim 17, wherein said alternative print requester further comprises an alternative transmitter which generates alternative print transmitting data fitting the alternative printer based on the received print transmitting data and transmits the alternative print transmitting data to the alternative printer when said relative distance judgment section judges that the relative distance between the alternative printer and the printer is not within the predetermined range.

19. The printer according to claim 18, wherein said alternative transmitter acquires print data by decrypting the received print transmitting data and generates the alternative print transmitting data by encrypting the acquired print data again so that the print data is decrypted by the alternative printer.

20. The printer according to claim 19, further comprising a selection print executor which tries to execute the print operation based on the print transmitting data when the print transmitting data is decrypted with any private key generated using a passphrase containing at least the printer position information acquired by said printer position information acquisition or its surrounding position information and which does not execute the print operation based on the print transmitting data when the print transmitting data is not decrypted.

21. The printer according to claim 20, wherein, if the printer is not in the state capable of executing the print operation based on the print transmitting data when the selection print executor tries to execute the print operation based on the print transmitting data, said alternative transmitter encrypts print data acquired by decrypting the print transmitting data with a public key of the alternative printer to generate the alternative print transmitting data.

22. The printer according to claim 18, further comprising a selection print executor which judges whether a difference between printer position information contained in the print transmitting data and the printer position information acquired by said printer position information acquisition is within a predetermined range, tries to execute the print operation based on the print transmitting data when the difference between these two pieces of information is within the predetermined range, and does not execute the print operation based on the print transmitting data when the difference between these two pieces of information is not within the predetermined range.

23. The printer according to claim 22, wherein, if the printer is not in the state capable of executing the print operation based on the print transmitting data when said selection print executor tries to execute the print operation based on the print transmitting data, said alternative transmitter acquires print data from the received print transmitting data and generates the alternative print transmitting data by joining printer position information on the alternative printer to the acquired print data.

24. The printer according to claim 14, further comprising:

a print transmitting data receiver which receives print transmitting data transmitted by a print client; and a list transmitter which transmits an alternative printer list in which the relative distance of said another printer is listed on a printer-by-printer basis to a print client which has transmitted the print transmitting data, when the printer is not in a state capable of executing a print operation based on the print transmitting data.

25. The printer according to claim 24, further comprising a sorter which sorts the alternative printer list in order of the relative distance from shortest to longest.

26. The printer according to claim 25, wherein the alterative printer list contains a network address of said another printer as information to specify said another printer.

27. A method of controlling a printer, comprising the steps of:

acquiring printer position information to specify a place where the printer is installed;

transmitting the printer position information to another printer and causing said another printer to calculate a relative distance between the printer and said another printer;

receiving the relative distance from said another printer; and storing the relative distance received in a relative distance storage.

28. A method of controlling a printer, comprising the steps of:

acquiring first printer position information which is printer position information to specify a place where the printer is installed;

receiving second printer position information which is printer position information on another printer from said another printer;

calculating a relative distance between the printer and said another printer based on the first printer position information and the second printer position information; and storing the calculated relative distance in the relative distance storage.

29. A print client, comprising:

a print transmitting data generator which generates print transmitting data based on print data;

a first transmitter which transmits the print transmitting data to a printer;

an alternative print notice receiver which receives an alternative print notice from the printer when the printer is not in a state capable of executing a print operation, the alternative print notice containing at least an alternative printer list in which alternative printer candidates are listed, and the alternative printer list containing at least relative distances between the printer and the alternative printer candidates;

an alternative printer selector which selects an alternative printer at least based on the alternative printer list; and a second transmitter which transmits the print transmitting data to the selected alternative printer.

30. The print client according to claim 29, further comprising a public key table in which public keys corresponding to respective printers are tabulated, wherein said print transmitting data generator generates the print transmitting data by encrypting the print data with a public key corresponding to a printer to which the print data is transmitted.

31. The print client according to claim 30, wherein said alternative printer selector selects a printer with the shortest relative distance out of the printers whose public keys are held in the public key table as the alternative printer based on the alternative printer list and the public key table.

32. The print client according to claim 31, wherein said second transmitter regenerates print transmitting data by encrypting the print data again with a public key of the printer selected as the alternative printer and transmits the regenerated print transmitting data to the alternative printer.

33. The print client according to claim 29, further comprising a printer position information table in which printer position information to specify places where respective printers are installed is tabulated corresponding to the respective printers, wherein said print transmitting data generator generates the print transmitting data by joining printer position information on a printer, to which the print data is transmitted, to the print data.

34. The print client according to claim 33, wherein said alternative printer selector selects a printer with the shortest relative distance out of the printers on which the printer position information is held in the printer position information table as the alternative printer based on the alternative printer list and the printer position information table.

35. The print client according to claim 34, wherein said second transmitter regenerates print transmitting data by joining printer position information on the printer selected as the alternative printer to the print data and transmits the regenerated print transmitting data to the alternative printer.

36. A method of controlling a print client, comprising the steps of:

generating print transmitting data based on print data;

transmitting the print transmitting data to a printer;

receiving an alternative print notice from the printer when the printer is not in a state capable of executing a print operation, the alternative print notice containing at least an alternative printer list in which alternative printer candidates are listed, and the alternative printer list containing at least relative distances between the printer and the alternative printer candidates;

selecting an alternative printer at least based on the alternative printer list; and transmitting the print transmitting data to the selected alternative printer.

37. A print system, comprising:

a first printer position information acquisition which acquires first printer position information to specify a place where a first printer is installed;

a second printer position information acquisition which acquires second printer position information to specify a place where a second printer is installed;

a relative distance calculator which calculates a relative distance between the first printer and the second printer based on the first printer position information and the second printer position information; and a relative distance storage which stores the calculated relative distance in the first printer.

38. The print system according to claim 37, wherein the first printer comprises;

a print transmitting data receiver which receives print transmitting data transmitted by a print client; and an alternative print requester which selects the second printer with the shortest relative distance as an alternative printer and requests alternative printing of the print transmitting data when the first printer is not in a state capable of executing a print operation based on the print transmitting data.

39. The print system according to claim 38, wherein the first printer further comprises a relative distance judgment section which judges whether the relative distance between the alternative printer and the first printer is within a predetermined range.

40. The print system according to claim 39, wherein said alternative printer requester comprises a transferor which transfers the received print transmitting data to the alternative printer when the relative distance judgment section judges that the relative distance between the alternative printer and the first printer is within the predetermined range.

41. The print system according to claim 40, wherein said alternative print requester further comprises an alternative transmitter which generates alternative print transmitting data fitting the alternative printer based on the received print transmitting data and transmits the alternative print transmitting data to the alternative printer, when the relative distance judgment section judges that the relative distance between the alternative printer and the first printer is not within the predetermined range.

42. The print system according to claim 41, wherein said alternative transmitter acquires print data by decrypting the received print transmitting data and generates the alternative print transmitting data by encrypting the acquired print data again so that the print data is decrypted by the alternative printer.

43. The print system according to claim 42, wherein the first printer further comprises a first selection print executor which tries to execute the print operation based on the print transmitting data when the print transmitting data is decrypted with any private key generated using a passphrase containing at least the printer position information acquired by the first printer position information acquisition or its surrounding position information and does not execute the print operation based on the print transmitting data when the print transmitting data is not decrypted, and the alternative printer comprises a second selection print executor which tries to execute a print operation based on the print transmitting data received from the first printer or the alternative print transmitting data when the print transmitting data or the alternative transmitting data is decrypted with any private key generated using a passphrase containing at least the printer position information acquired by the second printer position information acquisition or its surrounding position information and does not execute the print operation based on the print transmitting data or the alternative print transmitting data when the print transmitting data or the alternative print transmitting data is not decrypted.

44. The print system according to claim 43, wherein, if the first printer is not in the state capable of executing the print operation based on the print transmitting data when the selection print executor tries to execute the print operation based on the print transmitting data, the alternative transmitter encrypts print data acquired by decrypting the print transmitting data with a public key of the alternative printer to generate the alternative print transmitting data.

45. The print system according to claim 41, wherein the first printer further comprises a first selection print executor which judges whether a difference between printer position information contained in the print transmitting data and the printer position information acquired by the first printer position information acquisition is within a predetermined range, tries to execute the print operation based on the print transmitting data when the difference between these two pieces of information is within the predetermined range, and does not execute the print operation based on the print transmitting data when the difference between these two pieces of information is not within the predetermined range, and the alternative printer further comprises a second selection print executor which judges whether a difference between printer position information contained in the print transmitting data or the alternative print transmitting data and the printer position information acquired by the second printer position information acquisition is within a predetermined range, tries to execute a print operation based on the print transmitting data or the alternative print transmitting data when the difference between these two pieces of information is within the predetermined range, and does not execute the print operation based on the print transmitting data or the alternative print transmitting data when the difference between these two pieces of information is not within the predetermined range.

46. The print system according to claim 45, wherein, if the first printer is not in the state capable of executing the print operation based on the print transmitting data when the selection print executor tries to execute the print operation based on the print transmitting data, said alternative transmitter acquires print data from the received print transmitting data and generates the alternative print transmitting data by joining printer position information on the alternative printer to the acquired print data.

47. The print system according to claim 37, wherein the first printer further comprises:

a print transmitting data receiver which receives print transmitting data transmitted by a print client; and a list transmitter which transmits an alternative printer list in which the relative distance of the second printer is listed on a printer-by-printer basis to the print client which has transmitted the print transmitting data, when the first printer is not in a state capable of executing a print operation based on the print transmitting data.

48. The print system according to claim 42, wherein the first printer further comprises a sorter which sorts the alternative printer list in order of the relative distance from shortest to longest.

49. The print system according to claim 48, wherein the alterative printer list contains a network address of the second printer as information to specify the second printer.

50. The print system according to any one of claim 49, wherein the print client comprises:

an alternative printer selector which selects an alternative printer at least based on the alternative printer list; and a retransmitter which transmits the print transmitting data to the selected alternative printer.

51. The print system according to claim 50, wherein the print client further comprises:

a public key table in which public keys corresponding to respective printers are tabulated, and a print transmitting data transmitter which generates the print transmitting data by encrypting print data with a public key corresponding to a printer to which print data is transmitted and transmits the print transmitting data to the first printer.

52. The print system according to claim 51, wherein the alternative printer selector selects a printer with the shortest relative distance out of the printers whose public keys are held in the public key table as the alternative printer based on the alternative printer list and the public key table.

53. The print system according to claim 52, wherein the retransmitter regenerates print transmitting data by encrypting the print data again with a public key of the printer selected as the alternative printer and transmits the regenerated print transmitting data to the alternative printer.

54. The print system according to claim 50, wherein the print client further comprises:

a printer position information table in which printer position information to specify places where respective printers are installed is tabulated corresponding to the respective printers, and a print transmitting data transmitter which generates the print transmitting data by joining printer position information on a printer to which print data is transmitted to the print data.

55. The print system according to claim 54, wherein the alternative printer selector selects a printer with the shortest relative distance out of the printers on which the printer position information is held in the printer position information table as the alternative printer based on the alternative printer list and the printer position information table.

56. The print system according to claim 55, wherein the retransmitter regenerates print transmitting data by joining printer position information on the printer selected as the alternative printer to the print data and transmits the regenerated print transmitting data to the alternative printer.

57. A method of controlling a print system, comprising the steps of:

acquiring first printer position information to specify a place where a first printer is installed;

acquiring second printer position information to specify a place where a second printer is installed;

calculating a relative distance between the first printer and the second printer based on the first printer position information and the second printer position information; and storing the calculated relative distance in a relative distance storage of the first printer.

* * * * *